(12) United States Patent
Boon et al.

(10) Patent No.: US 8,340,175 B2
(45) Date of Patent: Dec. 25, 2012

(54) DYNAMIC IMAGE ENCODING DEVICE, DYNAMIC IMAGE DECODING DEVICE, DYNAMIC IMAGE ENCODING METHOD, DYNAMIC IMAGE DECODING METHOD, DYNAMIC IMAGE ENCODING PROGRAM, AND DYNAMIC IMAGE DECODING PROGRAM

(75) Inventors: Choong Seng Boon, Yokohama (JP); Akira Fujibayashi, Yokosuka (JP); Sadaatsu Kato, Yokosuka (JP); Tsutomu Horikoshi, Kamakura (JP)

(73) Assignee: NTT DoCoMo, Inc., Tokyo (JP)

( * ) Notice: Subject to any disclaimer, the term of this patent is extended or adjusted under 35 U.S.C. 154(b) by 1202 days.

(21) Appl. No.: 11/911,543

(22) PCT Filed: Apr. 6, 2006

(86) PCT No.: PCT/JP2006/307362
§ 371 (c)(1),
(2), (4) Date: Mar. 28, 2008

(87) PCT Pub. No.: WO2006/112272
PCT Pub. Date: Oct. 26, 2006

(65) Prior Publication Data
US 2009/0067501 A1    Mar. 12, 2009

(30) Foreign Application Priority Data

Apr. 13, 2005  (JP) ............................... P2005-115951
Dec. 2, 2005   (JP) ............................... P2005-349870

(51) Int. Cl.
  *H04N 7/12*    (2006.01)
(52) U.S. Cl. ............................... 375/240.05
(58) Field of Classification Search ............. 375/240.05, 375/246, 244
See application file for complete search history.

(56) References Cited

U.S. PATENT DOCUMENTS 5,543,848 A    8/1996   Murakami et al.
(Continued)

FOREIGN PATENT DOCUMENTS

AU    2003-290895 A1    8/2004
(Continued)

OTHER PUBLICATIONS

Extended European Search Report issued Feb. 10, 2011, in Patent Application No. / Patent No. 10168683.0-1522 / 2234405.
(Continued)

*Primary Examiner* — Chandrahas Patel
(74) *Attorney, Agent, or Firm* — Oblon, Spivak, McClelland, Maier & Neustadt, L.L.P.

(57) ABSTRACT

A moving image encoding device measures a band of a target image to be encoded and a band of a reference image by a band analyzer, and generates band-related information representing these bands. A prediction signal generator generates a prediction signal such that the signal matches the band of the target image, from the reference image, based on the band-related information. A difference unit obtains a difference between the target image and the prediction signal to generate a differential signal. A converter and a quantizer each encode the differential signal to generate an encoded differential signal. An inverse quantizer and an inverter each decode the encoded differential signal to generate a decoded differential signal. An adder adds the prediction signal to the decoded differential signal to generate a reproduced image. An output terminal outputs at least the encoded differential signal and the band-related information.

36 Claims, 22 Drawing Sheets

U.S. PATENT DOCUMENTS

| | | | |
|---|---|---|---|
| 6,266,370 | B1 | 7/2001 | Kamikura et al. |
| 6,895,050 | B2 * | 5/2005 | Lee .................. 375/240.03 |
| 2001/0014125 | A1 | 8/2001 | Endo |
| 2004/0233991 | A1 | 11/2004 | Sugimoto et al. |

FOREIGN PATENT DOCUMENTS

| | | |
|---|---|---|
| BR | 2003-16963 | 10/2005 |
| EP | 0 603 878 A2 | 6/1994 |
| EP | 1 124 380 B1 | 8/2001 |
| EP | 1 568 222 A2 | 8/2005 |
| JP | 5-328326 | 12/1993 |
| JP | 6-311506 | 11/1994 |
| JP | 6-327002 | 11/1994 |
| JP | 10-136371 | 5/1998 |
| JP | 10-136385 | 5/1998 |
| JP | 2001-231045 | 8/2001 |
| JP | 2006-509467 | 3/2006 |
| MX | 2005-5988 | 8/2005 |
| RU | 2 093 968 C1 | 10/1997 |
| RU | 2 162 280 C2 | 1/2001 |
| WO | WO 2004/054225 A2 | 6/2004 |

OTHER PUBLICATIONS

Sang Hyun Kim, et al., "Fast Local Motion-Compensation Algorithm for Video Sequences With Brightness Variations", IEEE Transactions on Circuits and Systems for Video Technology, vol. 13, No. 4, XP011096132, Apr. 1, 2003, pp. 289-299.

Madhukar Budagavi, "Video Compression using Blur Compensation", Image Processing, ICIP, IEEE International Conference, vol. 2, XP010851195, Sep. 11-14, 2005, 4 pages.

Tatsuto Takeuchi et al "Sharpening Image Motion Based on the Spatio-Temporal Characteristics of Human Vision", Human Vision and Electronic Imaging X, Proceedings Electronic Imaging Science and Technology, vol. 5666, 2005, pp. 83-94, a cover page and end page.

\* cited by examiner

Fig.4

| | INTEGER PRECISION MOTION VECTOR | HALF-PIXEL PRECISION MOTION VECTOR | QUARTER-PIXEL PRECISION MOTION VECTOR |
|---|---|---|---|
| GENERATOR 101 | – | $[u_h \ u_h]$ | $[u_q \ u_q \ u_q \ u_q]$ |
| GENERATOR 102 | $[W_1 \ W_2 \ W_3]$ | $[W_{h1} \ W_{h2} \ W_{h3} \ W_{h4}]$ | $[W_{q1} \ W_{q2} \ W_{q3} \ W_{q4} \ W_{q5} \ W_{q6}]$ |
| GENERATOR 103 | $[V_1 \ V_2 \ V_3]$ | $[V_{h1} \ V_{h2} \ V_{h3} \ V_{h4}]$ | $[V_{q1} \ V_{q2} \ V_{q3} \ V_{q4} \ V_{q5} \ V_{q6}]$ |

Fig.15

| | | FREQUENCY BAND (Hz) | | | |
|---|---|---|---|---|---|
| | ... | f~f+x | f+x~f+2x | f+2x~f+3x | ... |
| 95-100 | | α1 | α11 | α21 | ... |
| | | | | | |
| . | ... | . | . | . | ... |
| . | ... | . | . | . | ... |
| . | ... | . | . | . | ... |
| | | | | | |
| 15-20 | ... | α2 | α12 | α22 | ... |
| 10-15 | ... | α3 | α13 | α23 | ... |
| 5-10 | ... | α4 | α14 | α24 | ... |
| 0-5 | ... | α5 | α15 | α25 | ... |

RATIO (%)

DYNAMIC IMAGE ENCODING DEVICE, DYNAMIC IMAGE DECODING DEVICE, DYNAMIC IMAGE ENCODING METHOD, DYNAMIC IMAGE DECODING METHOD, DYNAMIC IMAGE ENCODING PROGRAM, AND DYNAMIC IMAGE DECODING PROGRAM

TECHNICAL FIELD

The present invention relates to encoding and decoding of moving-image data.

BACKGROUND ART

A compression encoding technology has been conventionally used in order to transfer and accumulate image data efficiently. Particularly, the systems of MPEG 1 through 4 and of H.261 through H.264 are widely used for moving-image data. When encoding a moving image, in order to realize reduction of data amount, there is sometimes adopted a method of producing a prediction signal of a target image to be encoded, by means of other images that are adjacent to each other on the time base, encoding the difference between the target image and the prediction signal (see, for example, the following Patent literature 1). This method is called "inter-frame encoding."

In H.264, for example, the encoding device divides one frame of image into block areas, each of which is composed of 16×16 pixels, and performs encoding processing of the image in units of blocks. In inter-frame encoding, motion prediction is performed on a target block of an image to be encoded, on the basis of a reference image of another frame that has been encoded and then decoded, whereby a prediction signal is produced. Next, the difference value between the target block and the prediction signal is obtained, and discrete cosine transformation and quantization processing are performed to produce encoded data.

On the other hand, the quantized conversion coefficient is inversely quantized and thereafter inverted, as a result of which a reproduced conversion coefficient is generated. Then, the prediction signal is added to the reproduced conversion coefficient, and a reproduced image is decoded. The decoded reproduced image is stored temporarily as a reference image to be used for encoding and decoding the next image.

Also, the following technologies can be included as another background art. A moving image is constituted by continuously arranging a "frame" which is a single static image. The magnitude of the amplitude of spatial frequency components (called "spatial frequency amplitude" hereinafter) indicates the contrast of the image, and thus is involved in evaluation of the quality of the moving image.

If a major change occurs in the contrast of the image in a short period of time throughout the moving image, blinking might occur. Also, since the human eye has a sensitivity to the contrast, the contrast is considered important in evaluation of the quality of the moving image.

In some moving images, generally, the image contrast changes as time advances. The best example of such moving images or the like is that the image contrast gradually becomes clear or blurry when taking a long time to change the scenes.

Even in the case of an image in which the contrast of each frame is low, when the flames are displayed as a moving image in which the frames are arranged continuously, a person who views this moving image might experience an optical illusion phenomenon where the moving image appears as a clear moving image having the contrast higher than that of a static image, as described in non-patent literature 1. This optical illusion phenomenon is called "motion sharpening phenomenon."

The above non-patent literature 1 explains the experimental result in which, according to this motion sharpening phenomenon, even when filters were periodically used in the original image to insert frames in which spatial frequency bands or contrasts were changed, the moving image was perceived to have a high quality as a result of evaluation of the moving image with the original image when the original image was viewed as the moving image.

On the other hand, a compression encoding technology is used in order to transfer and accumulate moving-image data efficiently. The systems of MPEG 1 through 4 and of ITU (International Telecommunication Union) H.261 through H.264 are widely used for moving images. When encoding a moving image, a prediction signal of a target image to be encoded is produced by means of other images that are adjacent to each other on the time base, and the difference between the target image and the prediction signal is encoded to thereby realize reduction of data amount. This method is called "inter-frame encoding."

The encoding device for realizing the processing defined by the ITU H.264 divides one frame of image into block areas, each of which is composed of 16×16 pixels, and performs encoding processing on the image in units of blocks. In inter-frame prediction encoding, this encoding device performs motion prediction on a target block of an image to be encoded, on the basis of a reference image of another frame that has been encoded and then decoded, and thereby produces a prediction signal. Then, the encoding device obtains the difference value between the target block and the prediction signal, performs discrete cosine transformation and quantization processing on this difference value, and produces encoded data as a quantized conversion coefficient, on the basis of this difference value.

Thereafter, the encoding device performs inverse quantization and then inversion on the quantized conversion coefficient to generate a reproduced conversion coefficient (difference value). Then, the encoding device adds the prediction signal to the reproduced conversion coefficient to decode a reproduced image. The decoded reproduced image is stored temporarily as a reference image to be used for encoding and decoding the next image.

In such moving image compression encoding, with regard to a moving image in which the spatial frequency amplitude of each image is generally low and the contrast is blurry, the conversion coefficient (difference value) is small, thus the amount of data to be encoded can be reduced. For this reason, when encoding a moving image that contains the image having blurry contrast or the low-contrast image in which the motion sharpening effect is expected, high encoding efficiency is expected.

[Patent Literature 1] Japanese Patent Laid-open No. H10-136371

[Non-Patent Literature 1] Tekeuchi, T. & De Valois, K. K. (2005) Sharpening image motion based on spatio-temporal characteristics of human vision. (San Jose, USA), URL: http://www.brl.ntt.co.jp/people/takeuchi/takeuchi-EI2005.pdf, <searched on Jun. 2, 2005>

However, in the conventional image encoding/decoding technology described above, a moving image cannot be compressed efficiently if images having different signal bands exist in the moving image]. For example, a moving image in which images having different signal bands exist is sometimes produced in image capturing performed by a consumer video camera. This is because the bands of adjacent images fluctuate because the focus is automatically adjusted by the auto-focusing function of the camera during image capturing, and thereby an image having a wide signal bandwidth and an image having a narrow signal bandwidth are recorded adjacent to each other.

In this case, when the encoding device predicts a first image having narrow signal bandwidth with reference to a second image having wide signal bandwidth, high-frequency components contained in the second image are contained in a differential signal of the first image. Therefore, there is a problem that the prediction signal becomes a signal having a band wider than that of the first image, increasing the amount of information and reducing the compression rate.

Moreover, another problem is that, in the conventional moving image encoding/decoding method, a moving image cannot be compressed efficiently if it has images having very different contrasts, i.e., the spatial frequency amplitudes. When a first image having low spatial frequency amplitudes is predicted with reference to a second image having high spatial frequency amplitudes, a target to be predicted cannot be searched well, or the difference between spatial frequency amplitudes contained in the second image will be contained in differential signals of the first image, whereby the amount of information is increased and the compression rate is reduced. Also, when a third image having high spatial frequency amplitudes is predicted with reference to the first image having low spatial frequency amplitudes, similarly, a target to be predicted cannot be searched well, or the difference between spatial frequency amplitudes contained in the third image will be required as a differential signal, thus, in this case as well, the problem is that the amount of information is increased and the compression rate is reduced.

DISCLOSURE OF THE INVENTION

In order to solve the problems described above, an object of the present invention is to efficiently compress a moving image when encoding/decoding the moving image.

A moving image encoding device of the present invention has: input means for inputting a target image to be encoded, from among a plurality of images configuring a moving image; storage means for storing a reference image that is used for generating a prediction signal for the target image; frequency characteristic analyzing means for measuring a frequency characteristic of the target image and a frequency characteristic of the reference image, and generating frequency characteristic-related information that represents the frequency characteristic of the target image and the frequency characteristic of the reference image; prediction signal generating means for generating the prediction signal such that the signal matches the frequency characteristic of the target image, from the reference image, on the basis of the frequency characteristic-related information; difference means for obtaining a difference between the target image and the prediction signal to generate a differential signal; encoding means for encoding the differential signal to generate an encoded differential signal; decoding means for decoding the encoded differential signal to generate a decoded differential signal; adding means for adding the prediction signal to the decoded differential signal to generate a reproduced image, the adding mean being connected, at a post-stage thereof, to the storage means storing the reproduced image; and output means for outputting at least the encoded differential signal and the frequency characteristic-related information.

In the moving image encoding device of the present invention, preferably, the prediction signal generating means derives a method of generating a prediction signal corresponding to the frequency characteristic-related information, to generate the prediction signal from the reference image, and the frequency characteristic-related information contains information on the method of generating the prediction signal.

In the moving image encoding device of the present invention, preferably, the prediction signal generating means selects, from at least two types of prediction signal generation methods, a method of generating a prediction signal corresponding to the frequency characteristic-related information, to generate the prediction signal from the reference image, and the frequency characteristic-related information contains information on the method of generating the prediction signal.

It is preferred that the moving image encoding device of the present invention further have memory means for storing frequency characteristic information that is measured when the reference image is decoded, and that the prediction signal generating means generate a prediction signal on the basis of the frequency characteristic information stored in the memory means.

A moving image decoding device of the present invention has: input means for inputting compressed data that contains an encoded differential signal obtained by predictively encoding a moving image and frequency characteristic-related information; decoding means for decoding the encoded differential signal to generate a decoded differential signal; prediction signal generating means for generating a prediction signal for the decoded differential signal; adding means for adding the prediction signal to the decoded differential signal to generate a reproduced image; and storage means for storing a reference image that is used for generating the prediction signal, wherein the frequency characteristic-related information represents a frequency characteristic of the reproduced image and a frequency characteristic of the reference image, and the prediction signal generating means generates the prediction signal such that the signal matches a frequency characteristic of a target image to be decoded, from the reference image, on the basis of the frequency characteristic-related information.

In the moving image decoding device of the present invention, preferably, the frequency characteristic-related information contains prediction signal generation-related information that is related to a method of generating the prediction signal, and the prediction signal generating means generates the prediction signal from the reference image, on the basis of the prediction signal generation-related information.

In the moving image decoding device of the present invention, preferably, the frequency characteristic-related information contains prediction signal generation-related information that is related to a method of generating the prediction signal, and the prediction signal generating means selects, from at least two types of prediction signal generation methods, a method of generating the prediction signal, on the basis of the prediction signal generation-related information, and generates the prediction signal from the reference image.

In the moving image decoding device of the present invention, preferably, the frequency characteristic-related information contains prediction signal generation-related information that is related to a method of generating the prediction signal, and the prediction signal generating means selects, from at least two types of prediction signal generation methods that are prepared in advance, a method of generating the prediction signal, on the basis of the prediction signal generation-related information, and generates the prediction signal from the reference image.

It is preferred that the moving image decoding device of the present invention further have memory means for storing frequency characteristic information that is measured when decoding the reference image, and that the prediction signal generating means generate the prediction signal on the basis of the frequency characteristic information stored in the memory means.

A moving image encoding method of the present invention has: an input step of inputting a target image to be encoded, from among a plurality of images configuring a moving image; a storing step of storing in storage means a reference image that is used for generating a prediction signal for the target image; a frequency characteristic analyzing step of measuring a frequency characteristic of the target image and a frequency characteristic of the reference image, and generating frequency characteristic-related information that represents the frequency characteristic of the target image and the frequency characteristic of the reference image; a prediction signal generating step of generating the prediction signal such that the signal matches the frequency characteristic of the target image, from the reference image, on the basis of the frequency characteristic-related information; a difference step of obtaining a difference between the target image and the prediction signal to generate a differential signal; an encoding step of encoding the differential signal to generate an encoded differential signal; a decoding step of decoding the encoded differential signal to generate a decoded differential signal; an adding step of adding the prediction signal to the decoded differential signal to generate a reproduced image, the adding step being connected, at a post-stage thereof, to the storage means storing the reproduced image; and an output step of outputting at least the encoded differential signal and the frequency characteristic-related information.

A moving image decoding method of the present invention has: an input step of inputting compressed data that contains an encoded differential signal obtained by predictively encoding a moving image and frequency characteristic-related information; a decoding step of decoding the encoded differential signal to generate a decoded differential signal; a prediction signal generating step of generating a prediction signal for the decoded differential signal; an adding step of adding the prediction signal to the decoded differential signal to generate a reproduced image; and a storing step of storing in storage means a reference image that is used for generating the prediction signal, wherein the frequency characteristic-related information represents a frequency characteristic of the reproduced image and a frequency characteristic of the reference image, and in the prediction signal generating step the prediction signal is generated such that the signal matches a frequency characteristic of a target image to be decoded, from the reference image, on the basis of the frequency characteristic-related information.

A moving image encoding program of the present invention causes a computer to execute: input processing of inputting a target image to be encoded, from among a plurality of images configuring a moving image; storage processing of storing in storage means a reference image that is used for generating a prediction signal for the target image; frequency characteristic analyzing processing of measuring a frequency characteristic of the target image and a frequency characteristic of the reference image, and generating frequency characteristic-related information that represents the frequency characteristic of the target image and the frequency characteristic of the reference image; prediction signal generation processing of generating the prediction signal such that the signal matches the frequency characteristic of the target image, from the reference image, on the basis of the frequency characteristic-related information; difference processing of obtaining a difference between the target image and the prediction signal to generate a differential signal; encoding processing of encoding the differential signal to generate an encoded differential signal; decoding processing of decoding the encoded differential signal to generate a decoded differential signal; adding processing of adding the prediction signal to the decoded differential signal to generate a reproduced image, the adding processing being connected, at a post-stage thereof, to the storage means storing the reproduced image; and output processing of outputting at least the encoded differential signal and the frequency characteristic-related information.

A moving image decoding program of the present invention causes a computer to execute: input processing of inputting compressed data that contains an encoded differential signal obtained by predictively encoding a moving image and frequency characteristic-related information; decoding processing of decoding the encoded differential signal to generate a decoded differential signal; prediction signal generation processing of generating a prediction signal for the decoded differential signal; adding processing of adding the prediction signal to the decoded differential signal to generate a reproduced image; and storage processing of storing in storage means a reference image that is used for generating the prediction signal, wherein the frequency characteristic-related information represents a frequency characteristic of the reproduced image and a frequency characteristic of the reference image, and the in prediction signal generation processing the prediction signal is generated such that the signal matches a frequency characteristic of a target image to be decoded, from the reference image, on the basis of the frequency characteristic-related information.

The moving image encoding device of the present invention has: input means for inputting a target image to be encoded, from among a plurality of images configuring a moving image; storage means for storing a reference image that is used for generating a prediction signal for the target image; band analyzing means for measuring a band of the target image and a band of the reference image, and generating band-related information that represents the band of the target image and the band of the reference image; prediction signal generating means for generating the prediction signal such that the signal matches the band of the target image, from the reference image, on the basis of the band-related information; difference means for obtaining a difference between the target image and the prediction signal to generate a differential signal; encoding means for encoding the differential signal to generate an encoded differential signal; decoding means for decoding the encoded differential signal to generate a decoded differential signal; adding means for adding the prediction signal to the decoded differential signal to generate a reproduced image, the adding mean being connected, at a post-stage thereof, to the storage means storing the reproduced image; and output means for outputting at least the encoded differential signal and the band-related information.

In the moving image encoding device of the present invention, the prediction signal generating means may derive a method of generating a prediction signal in accordance with the band-related information, to generate the prediction signal from the reference image, and the band-related information may contain information on the method of generating the prediction signal (for example, a filter coefficient that is used for generating the prediction signal).

In the moving image encoding device of the present invention, the prediction signal generating means can select, from at least two types of prediction signal generation methods, a method of generating a prediction signal in accordance with the band-related information, to generate the prediction signal from the reference image, and the band-related information can contain information on the method of generating the prediction signal (for example, an identifier of the selected optimal generating method).

The moving image decoding device of the present invention has: input means for inputting compressed data that contains an encoded differential signal obtained by predictively encoding a moving image and band-related information; decoding means for decoding the encoded differential signal to generate a decoded differential signal; prediction signal generating means for generating a prediction signal for the decoded differential signal; adding means for adding the prediction signal to the decoded differential signal to generate a reproduced image; and storage means for storing a reference image that is used for generating the prediction signal, wherein the band-related information represents a band of the reproduced image and a band of the reference image, and the prediction signal generating means generates the prediction signal such that the signal matches a band of a target image to be decoded, from the reference image, on the basis of the band-related information.

In the moving image decoding device of the present invention, the band-related information may contain prediction signal generation-related information that is related to the method of generating the prediction signal, and the prediction signal generating means may generate the prediction signal from the reference image, on the basis of the prediction signal generation-related information.

In the moving image decoding device of the present invention, the band-related information can contain the prediction signal generation-related information that is related to the method of generating the prediction signal, and the prediction signal generating means can select, from at least two types of prediction signal generation methods, the method of generating the prediction signal, on the basis of the prediction signal generation-related information, and generate the prediction signal from the reference image.

The moving image encoding method of the present invention has: an input step of inputting a target image to be encoded, from among a plurality of images configuring a moving image; a storing step of storing in storage means a reference image that is used for generating a prediction signal for the target image; a band analyzing step of measuring a band of the target image and a band of the reference image, and generating band-related information that represents the band of the target image and the band of the reference image; a prediction signal generating step of generating the prediction signal such that the signal matches the band of the target image, from the reference image, on the basis of the band-related information; a difference step of obtaining a difference between the target image and the prediction signal to generate a differential signal; an encoding step of encoding the differential signal to generate an encoded differential signal; a decoding step of decoding the encoded differential signal to generate a decoded differential signal; an adding step of adding the prediction signal to the decoded differential signal to generate a reproduced image; a storing step of storing the reproduced image in the storage means; and an output step of outputting at least the encoded differential signal and the band-related information.

The moving image decoding method of the present invention has: an input step of inputting compressed data that contains an encoded differential signal obtained by predictively encoding a moving image and band-related information; a decoding step of decoding the encoded differential signal to generate a decoded differential signal; a prediction signal generating step of generating a prediction signal for the decoded differential signal; an adding step of adding the prediction signal to the decoded differential signal to generate a reproduced image; and a storing step of storing in storage means a reference image that is used for generating the prediction signal, wherein the band-related information represents a band of the reproduced image and a band of the reference image, and in the prediction signal generating step the prediction signal is generated such that the signal matches a band of a target image to be decoded, from the reference image, on the basis of the band-related information.

The moving image encoding program of the present invention causes a computer to execute: input processing of inputting a target image to be encoded, from among a plurality of images configuring a moving image; storage processing of storing in storage means a reference image that is used for generating a prediction signal for the target image; band analyzing processing of measuring a band of the target image and a band of the reference image, and generating band-related information that represents the band of the target image and the band of the reference image; prediction signal generation processing of generating the prediction signal such that the signal matches the band of the target image, from the reference image, on the basis of the band-related information; difference processing of obtaining a difference between the target image and the prediction signal to generate a differential signal; encoding processing of encoding the differential signal to generate an encoded differential signal; decoding processing of decoding the encoded differential signal to generate a decoded differential signal; adding processing of adding the prediction signal to the decoded differential signal to generate a reproduced image; storage processing of storing the reproduced image in the storage means; and output processing of outputting at least the encoded differential signal and the band-related information.

The moving image decoding program of the present invention causes a computer to execute: input processing of inputting compressed data that contains an encoded differential signal obtained by predictively encoding a moving image and band-related information; decoding processing of decoding the encoded differential signal to generate a decoded differential signal; prediction signal generation processing of generating a prediction signal for the decoded differential signal; adding processing of adding the prediction signal to the decoded differential signal to generate a reproduced image; and storage processing of storing in storage means a reference image that is used for generating the prediction signal, wherein the band-related information represents a band of the reproduced image and a band of the reference image, and in the prediction signal generation processing the prediction signal is generated such that the signal matches a band of a target image to be decoded, from the reference image, on the basis of the band-related information.

According to these inventions, the prediction signal for the target image is generated from the reference image so as to match the band of the target image, thus the band of the target image and the band of the prediction signal become nearly equal to each other. Accordingly, a high-frequency component of the reference image is prevented from being shifted to the prediction signal, thus highly efficient compression is realized on a moving image in which images having different signal bands exist. The present invention is effective particularly when the moving image is an image in which the reference image has a wide signal band and the target image has a narrow signal band.

In order to solve the above problems, the moving image encoding device of the present invention has: input means for inputting a target image to be encoded, from among a plurality of images configuring a moving image; storage means for storing a reference image that is used for generating a prediction signal for the target image input by the input means; spatial frequency amplitude analyzing means for generating spatial frequency amplitude-related information for adjusting a difference between an amplitude of a spatial frequency component of the target image input by the input means and an amplitude of a spatial frequency component of the reference image stored in the storage means, on the basis of the amplitude of the spatial frequency component of the target image and the amplitude of the spatial frequency component of the reference image; prediction signal generating means for adjusting the amplitude of the spatial frequency component of the reference image on the basis of the spatial frequency amplitude-related information generated by the spatial frequency amplitude analyzing means, and generating the prediction signal for the target image on the basis of the adjusted reference image; difference means for generating a differential signal on the basis of a difference between the target image input by the input means and the prediction signal generated by the prediction signal generating means; encoding means for encoding the differential signal generated by the difference means, to generate an encoded differential signal; output means for outputting the encoded differential signal encoded by the encoding means and the spatial frequency amplitude-related information generated by the spatial frequency amplitude analyzing means; decoding means for decoding the encoded differential signal generated by the encoding means, to generate a decoded differential signal; and reproduced image generating means for adding the prediction signal generated by the prediction signal generating means to the decoded differential signal generated by the decoding means, and storing the generated reproduced image in the storage means as the reference image.

The moving image encoding method of the present invention has: an input step of inputting a target image to be encoded, from among a plurality of images configuring a moving image; a spatial frequency amplitude analyzing step of generating spatial frequency amplitude-related information for adjusting a difference between an amplitude of a spatial frequency component of the target image input by the input step and an amplitude of a spatial frequency component of a reference image that is used for generating a prediction signal for the target image input by the input step, on the basis of the amplitude of the spatial frequency component of the target image and the amplitude of the spatial frequency component of the reference image; a prediction signal generating step of adjusting the amplitude of the spatial frequency component of the reference image on the basis of the spatial frequency amplitude-related information generated in the spatial frequency amplitude analyzing step, and generating the prediction signal for the target image on the basis of the adjusted reference image; a difference step of generating a differential signal on the basis of a difference between the target image input in the input step and the prediction signal generated in the prediction signal generating step; an encoding step of encoding the differential signal generated in the difference step, to generate an encoded differential signal; an output step of outputting the encoded differential signal encoded in the encoding step and the spatial frequency amplitude-related information generated in the spatial frequency amplitude analyzing step; a decoding step of decoding the encoded differential signal generated by the encoding step, to generate a decoded differential signal; and a reproduced image generating step of adding the prediction signal generated in the prediction signal generating step to the decoded differential signal generated in the decoding step, to generate a reproduced image, and storing the generated reproduced image as the reference image.

The moving image encoding program of the present invention has: an input module for inputting a target image to be encoded, from among a plurality of images configuring a moving image; a storage module for storing a reference image that is used for generating a prediction signal for the target image input by the input module; a spatial frequency amplitude analyzing module for generating spatial frequency amplitude-related information for adjusting a difference between an amplitude of a spatial frequency component of the target image input by the input module and an amplitude of a spatial frequency component of the reference image stored in the storage module, on the basis of the amplitude of the spatial frequency component of the target image and the amplitude of the spatial frequency component of the reference image; a prediction signal generating module for adjusting the amplitude of the spatial frequency component of the reference image on the basis of the spatial frequency amplitude-related information generated by the spatial frequency amplitude analyzing module, and generating the prediction signal for the target image on the basis of the adjusted reference image; a difference module for generating a differential signal on the basis of a difference between the target image input by the input module and the prediction signal generated by the prediction signal generating module; an encoding module for encoding the differential signal generated by the difference module, to generate an encoded differential signal; a decoding module for decoding the encoded differential signal generated by the encoding module, to generate a decoded differential signal; a reproduced image generating module for adding the prediction signal generated by the prediction signal generating module to the decoded differential signal generated by the decoding module, to generate a reproduced image, and storing the generated reproduced image in the storage module as the reference image; and an output module for outputting the encoded differential signal encoded by the encoding module and the spatial frequency amplitude-related information generated by the spatial frequency amplitude analyzing module.

According to the present invention, a target image to be encoded is input from among a plurality of images configuring a moving image, and a reference image that is used for generating a prediction signal for the input target image is stored. Then, there is generated spatial frequency amplitude-related information for adjusting a difference between an amplitude of a spatial frequency component of the input target image and an amplitude of a spatial frequency component of the reference image on the basis of the amplitude of the spatial frequency component of the target image and the amplitude of the spatial frequency component of the reference image.

The amplitude of the spatial frequency component of the reference image is adjusted on the basis of the generated spatial frequency amplitude-related information, the prediction signal for the target image is generated based on the adjusted reference image, and a differential signal is generated based on the difference between the input target image and the generated prediction signal. The generated differential signal is encoded to generate an encoded differential signal, and the generated encoded differential signal is decoded to generate a decoded differential signal.

The prediction signal is added to the decoded differential signal to generate a reproduced image, and the reproduced image and the reference image are stored. On the other hand, the encoded differential signal and the spatial frequency amplitude-related information are output.

Accordingly, the spatial frequency amplitudes of the target image and of the prediction signal become nearly equal to each other, and excess and deficiency of spatial frequency components of the reference image do not influence the prediction signal, thus compression can be performed efficiently.

The moving image decoding device of the present invention has: storage means for storing a reproduced image that is a reference image for use in decoding; input means for inputting encoded data, which contains an encoded differential signal obtained by predictively encoding a moving image and spatial frequency amplitude-related information of an image; extraction means for extracting the spatial frequency amplitude-related information and the encoded differential signal from the encoded data input by the input means; prediction signal generating means for adjusting an amplitude of the reproduced image stored in the storage means, on the basis of the spatial frequency amplitude-related information extracted by the extraction means, and generating a prediction signal; decoding means for decoding the encoded differential signal extracted by the extraction means, to acquire a decoded differential signal; adding means for adding the prediction signal generated by the prediction signal generating means to the decoded differential signal acquired by the decoding means, to generate the reproduced image; and output means for outputting the reproduced image generated by the adding means to an output terminal and the storage means.

The moving image decoding method of the present invention has: an input step of inputting encoded data, which contains an encoded differential signal obtained by predictively encoding a moving image and spatial frequency amplitude-related information of an image; an extraction step of extracting the spatial frequency amplitude-related information and the encoded differential signal from the encoded data input by the input step; a prediction signal generating step of adjusting an amplitude of a reproduced image that is stored in storage means as a reference image, on the basis of the spatial frequency amplitude-related information extracted by the extraction step, and generating a prediction signal; a decoding step of decoding the encoded differential signal extracted by the extraction step, to acquire a decoded differential signal; an adding step of adding the prediction signal generated by the prediction signal generating step to the decoded differential signal acquired by the decoding step, to generate the reproduced image; and an output step of outputting the reproduced image generated by the adding step to an output terminal and the storage means that stores the reproduced image for use in decoding.

The moving image decoding program of the present invention has: a storage module for storing a reproduced image as a reference image for use in decoding; an input module for inputting encoded data, which contains an encoded differential signal obtained by predictively encoding a moving image and spatial frequency amplitude-related information of an image; an extraction module for extracting the spatial frequency amplitude-related information and the encoded differential signal from the encoded data input by the input module; a prediction signal generating module for adjusting an amplitude of the reproduced image stored in the storage module, on the basis of the spatial frequency amplitude-related information extracted by the extraction module, and generating a prediction signal; a decoding module for decoding the encoded differential signal extracted by the extraction module, to acquire a decoded differential signal; an adding module for adding the prediction signal generated by the prediction signal generating module to the decoded differential signal acquired by the decoding module, to generate the reproduced image; and an output module for outputting the reproduced image generated by the adding module to an output terminal and the storage module.

According to the present invention, a reproduced image for use in decoding is stored, and encoded data, which contains an encoded differential signal obtained by predictively encoding a moving image and spatial frequency amplitude-related information of an image, is input. Then, the spatial frequency amplitude-related information and the encoded differential signal are extracted from the input encoded data, the amplitude of the reproduced image stored in the storage means is adjusted based on the extracted spatial frequency amplitude-related information, to generate a prediction signal. Also, the extracted encoded differential signal is decoded to generate a decoded differential signal, and the prediction signal is added to the decoded differential signal to generate the reproduced image. The generated reproduced image is output to an output terminal, and then stored again.

Accordingly, the spatial frequency amplitudes of the target image and the prediction signal become nearly equal to each other, and the encoded data that has been compressed can be decoded efficiently.

Furthermore, preferably, in the moving image encoding device of the present invention, the spatial frequency amplitude analyzing means further has: external input means for externally inputting information required for generating the spatial frequency amplitude-related information, wherein the spatial frequency amplitude analyzing means adds the information input by the external input means to the amplitude of the spatial frequency component of the target image and to the amplitude of the spatial frequency component of the reference image, to generate the spatial frequency amplitude-related information.

According to the present invention, information that is required for generating the spatial frequency amplitude-related information can be input externally, and the spatial frequency amplitude-related information can be generated based on the input information, whereby the adjustment parameter that is defined based on the measure for evaluation of the entire video can be input externally, thus an amplitude adjustment coefficient based on the entire video can be generated and more efficient encoding can be performed.

In addition, it is preferred that the spatial frequency analyzing means of the moving image encoding device of the present invention adjust the spatial frequency amplitude-related information on the basis of the adjustment parameter defined according to the spatial frequency component of the target image, and generate the adjusted spatial frequency amplitude-related information and the adjustment parameter as the spatial frequency amplitude-related information.

According to the present invention, the spatial frequency amplitude-related information can be adjusted based on the adjustment parameter defined according to the spatial frequency components, whereby more efficient encoding can be performed.

Furthermore, preferably, the input means of the moving image decoding device of the present invention inputs the spatial frequency-related information and the adjustment parameter that are adjusted as the spatial frequency amplitude-related information, and the prediction signal generating means generates a prediction signal on the basis of the spatial frequency amplitude-related information and adjustment parameter that are input by the input means.

According to the present invention, the prediction signal can be generated based on the adjusted spatial frequency-related information and adjustment parameter, whereby the encoded data can be decoded efficiently.

According to the present invention, a moving image can be compressed efficiently when encoding/decoding the moving image.

BRIEF DESCRIPTION OF THE DRAWINGS

FIG. 4 is a diagram showing a relation between pixel precision of motion vectors and a row of coefficients for generating a prediction signal;

FIG. 15 is a diagram showing a conversion table that is stored in an amplitude adjustment coefficient storage unit 203;

EXPLANATION OF REFERENCE NUMERALS

1 . . . input terminal, 2 . . . differential unit, 3 . . . converter, 4 . . . quantizer, 5 . . . inverse quantizer, 6 . . . inverter, 7 . . . adder, 8 . . . frame memory, 9 . . . prediction signal generator, 10 . . . band analyzer, 11 . . . entropy encoder, 12 . . . output terminal, 21 . . . input terminal, 22 . . . data analyzer, 23 . . . inverse quantizer, 24 . . . inverter, 25 . . . prediction signal generator, 26 . . . adder, 27 . . . output terminal, 28 . . . frame memory, 100 . . . input terminal, 101 . . . spatial frequency analyzer, 102 . . . prediction signal generator, 103 . . . differential unit, 104 . . . converter, 105 . . . quantizer, 106 . . . inverse quantizer, 107 . . . inverter, 108 . . . adder, 109 . . . frame memory, 120 . . . entropy encoder, 121 . . . output terminal, 201 . . . spatial frequency amplitude analyzer, 202 . . . spatial frequency amplitude-related information generator, 203 . . . amplitude adjustment coefficient storage unit, 600 . . . input terminal, 601 . . . data analyzer, 602 . . . inverse quantizer, 603 . . . inverter, 604 . . . adder, 605 . . . output terminal, 606 . . . frame memory, 607 . . . prediction signal generator

BEST MODE FOR CARRYING OUT THE INVENTION

The moving image encoding device according to an embodiment of the present invention will be described hereinafter with reference to the accompanying drawings.

Figure 1:
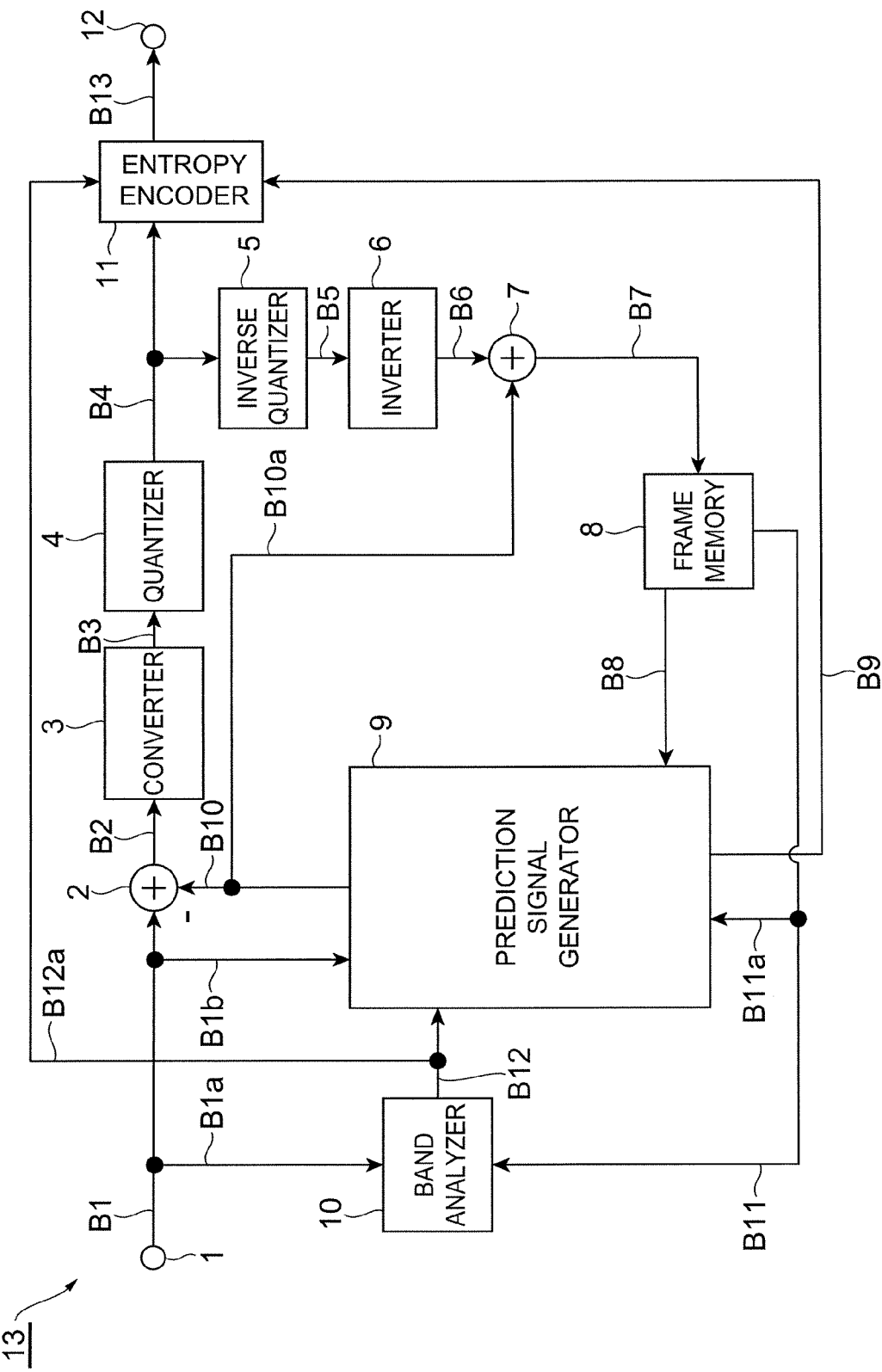
FIG. 1 is a diagram showing a configuration of a moving image encoding device according to a first embodiment.

FIG. 1 is a diagram showing a configuration of a moving image encoding device according to a first embodiment.

The moving image encoding device 13 of the first embodiment has an input terminal 1 (corresponding to the input means), a differential unit 2 (corresponding to the differential means), a converter 3, a quantizer 4 (both corresponding to the encoding means), an inverse quantizer 5, an inverter 6 (both corresponding to the decoding means), an adder 7 (corresponding to the adding means), a frame memory 8 (corresponding to the storage means), a prediction signal generator 9 (corresponding to the prediction signal generating means), a band analyzer 10 (corresponding to the band analyzing means), an entropy encoder 11, and an output terminal 12 (corresponding to the output means). These components are connected with one another via buses so that signals can be input and output.

The detail of each of these components is described hereinafter.

The input terminal 1 inputs a moving image. The input moving image is divided into areas, each of which has a predetermined size (16×16 pixels, for example).

The differential unit 2 inputs a prediction signal obtained by the prediction signal generator 9, via a bus B10, and then subtracts the prediction signal from a target block to generate a differential signal.

The converter 3 converts the differential signal input from the differential unit 2 into a signal of a frequency range.

The quantizer 4 quantizes the signal input from the converter 3.

The inverse quantizer 5 inversely quantizes the quantized coefficient input from the quantizer 4.

The inverter 6 performs inverse discrete cosine transformation on the inversely quantized coefficient input from the inverse quantizer 5 and converts thus obtained coefficient into a reproduced differential signal of a spatial area.

The adder 7 adds a prediction signal, which is input via a bus B10a, to the reproduced differential signal input from the inverter 6, and generates a reproduced image.

The frame memory 8 stores the reproduced image that is input from the adder 7 via a bus B7, and uses this reproduced image as a reference image for encoding the next image.

The prediction signal generator 9 generates a prediction signal with respect to an encoding target block that is input via a bus B1b. The prediction signal generator 9 also performs control such that the band of the prediction signal for this block does not exceed the band of a block signal. The detailed operation will be described later.

The band analyzer 10 analyzes the band of the signal of the encoding target block.

The entropy encoder 11 converts the quantized coefficient input from the quantizer 4 into a variable-length code, and thereafter outputs the variable-length code to the output terminal 12. An arithmetic code may be used in place of a variable-length code.

The operation is described next.

As a premise for explaining the operation, it is assumed that a moving image to be input by the input terminal 1 has a plurality of images captured by a consumer video camera (a mobile phone camera, for example). In this case, a combination of an image having a wide signal band and an image having a narrow signal band is input for the reasons described above.

A target image to be encoded and a reference image to be referenced to generate a prediction signal of the target image are input to the band analyzer 10. The target image is input from the input terminal 1 via a bus B1a, and the reference image is input from the frame memory 8 via a bus B11. In the first embodiment, the number of reference images to be input is one, but a plurality of reference images may be input.

The band of the target image is measured by means of Fourier transformation. Specifically, the band analyzer 10 performs Fourier transformation on a row of pixels on the target image as one-dimensional data array, to generate a row of frequency coefficients. Then, of the coefficients in the row of frequency coefficients, the maximum frequency component that is equal to or lower than x % of the direct-current component is taken as the band of the row of pixels. For example, although x=5, other numeric value may be used.

In this manner, the band analyzer 10 obtains a band of each row of pixels on the target image, and takes the largest band as a vertical band of the target image. Similarly, the band analyzer 10 obtains a band of a row of pixels on each column of the target image, and takes the largest band as a horizontal band of the target image. In the first embodiment, the maximum values in the vertical band and in the horizontal band are band data of the target image.

The band of the reference image can also be measured by means of the same method, but in the first embodiment the band information that is measured when encoding the reference image is stored so the information on the band of the reference image does not have to be recalculated. Therefore, the frame memory 8 stores the information on the band of the target image in order to encode the next image. It should be noted that the reproduced image stored in the frame memory 8 can be used as the reference image, but the original image corresponding to the reference image may be used to calculate the band of the original image.

The band analyzer 10 obtains a band ratio by using the band data of the obtained target image as the denominator and the band data of the reference numeral as the numerator, and outputs the obtained band ratio to the prediction signal generator 9 via a bus B12. This band ratio is output as band-related information (frequency characteristic-related information) to the entropy encoder 11 via a bus B9, thereafter subjected to variable length encoding, and then output along with other information from the output terminal 12. The band-related information (frequency characteristic-related information) may not only be the band ratio but also information that can represent the information indicating a correlation between the frequency characteristic of the reproduced image and the frequency characteristic of the reference image. For example, the band-related information may be the frequency characteristic itself of the reproduced image, or the frequency characteristic itself of the reference image, or alternatively the difference therebetween.

Figure 2:
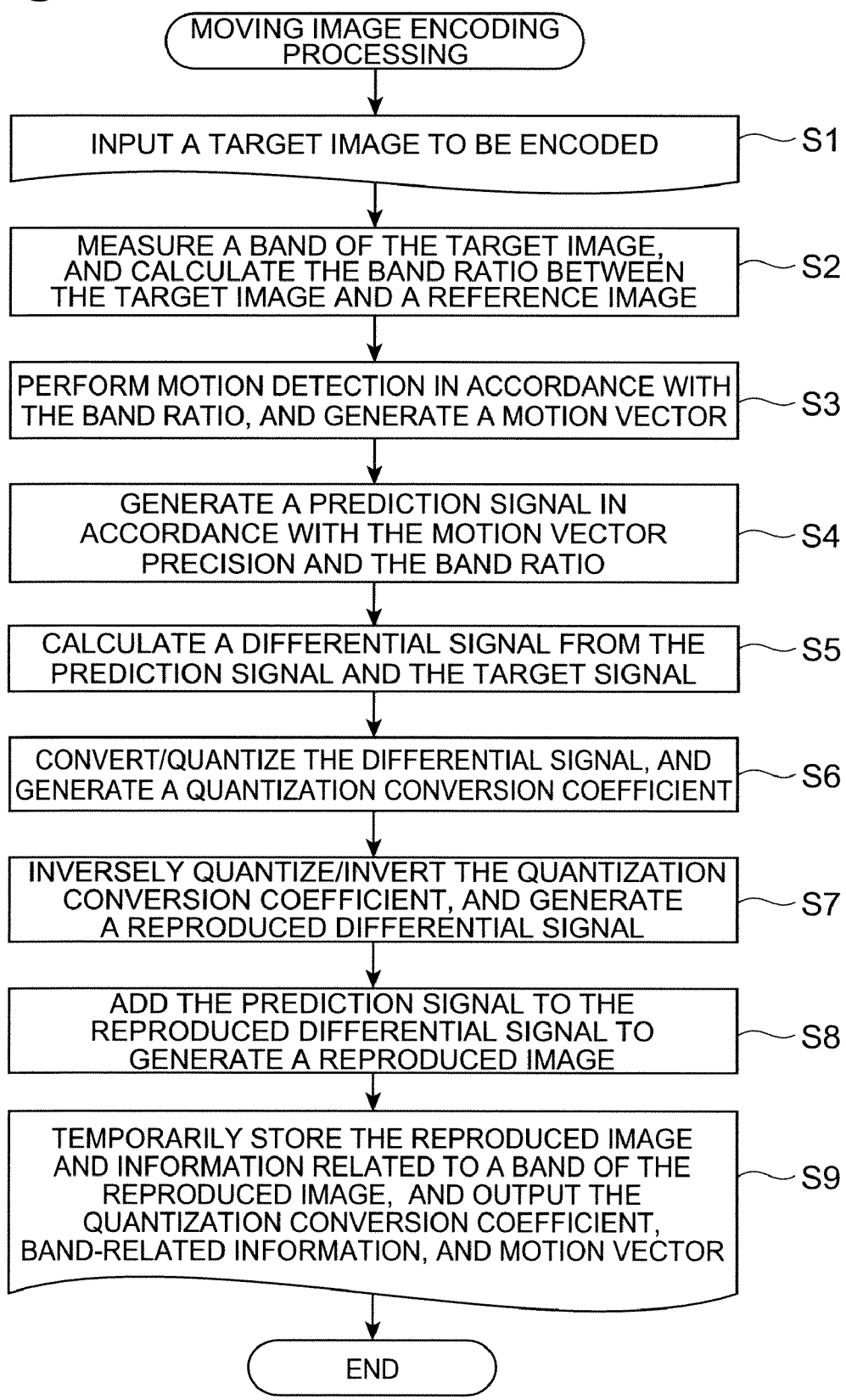
FIG. 2 is a diagram for explaining the operation of the moving image encoding device.

The operation of the moving image encoding device 13 and the steps configuring the moving image encoding method are described hereinafter with reference to FIG. 2.

Once a target image to be encoded is input to the input terminal 1 of the moving image encoding device 13 (S1), the band analyzer 10 measures band of the target image and obtains the band ratio by means of the band data of the target image and of the reference image (S2). The method of measuring the bands and the method of obtaining the band ratio will be described later.

In the first embodiment, the moving image encoding device 13 obtains data related to the bands of the entire image, but the moving image encoding device 13 may obtain the data in units of blocks.

In S3, the prediction signal generator 9 performs motion detection based on the band ratio, and generates a motion vector. Then, the prediction signal generator 9 generates a prediction signal corresponding to both the motion vector precision and the band ratio (S4).

The differential unit 2 subtracts the prediction signal generated in S4 from a target signal to obtain a differential signal (S5). This differential signal is subjected to discrete cosine transformation by the converter 3, and thereafter quantized by the quantizer 4, whereby quantization conversion coefficient is generated (S6).

The quantization conversion coefficient is subjected to inverse quantization processing by the inverse quantizer 5 and then to inverting processing by the inverter 6, whereby a reproduced differential signal is generated (S7).

The adder 7 adds the prediction signal to the reproduced differential signal, and, as a result, a reproduced image is generated (S8).

The generated reproduced image and information on the bands are temporarily stored in the frame memory 8. At the same time, the data such as the quantization conversion coefficient, band-related information and motion vector are subjected to entropy encoding and then output (S9).

Next, the operation of the prediction signal generator 9 is described in detail with reference to FIG. 3.

First, in S11, the target image, reference image, and band ratio are input to the prediction signal generator 9 via buses B1b, B11a, and B12, respectively.

In S12, motion detection processing is executed in accordance with the value of the band ratio.

The motion detection processing is a known and commonly used image analysis technology, thus the detailed explanation thereof is omitted. The motion detection processing is executed using, for example, a block matching method.

In the case in which the band ratio is 1 or lower (S12:≦1), that is, when the band of the target image is larger than that of the reference image, the prediction signal generator 9 executes the processing of S13, S14 and S15, and detects a motion vector for a target block.

The prediction signal generator 9 has generators 101, 102 and 103 that are executed in accordance with the band ratio. FIG. 4 shows a relation between a row of coefficients used by these generators to generate prediction signals and the pixel precision of motion vectors.

Figure 3:
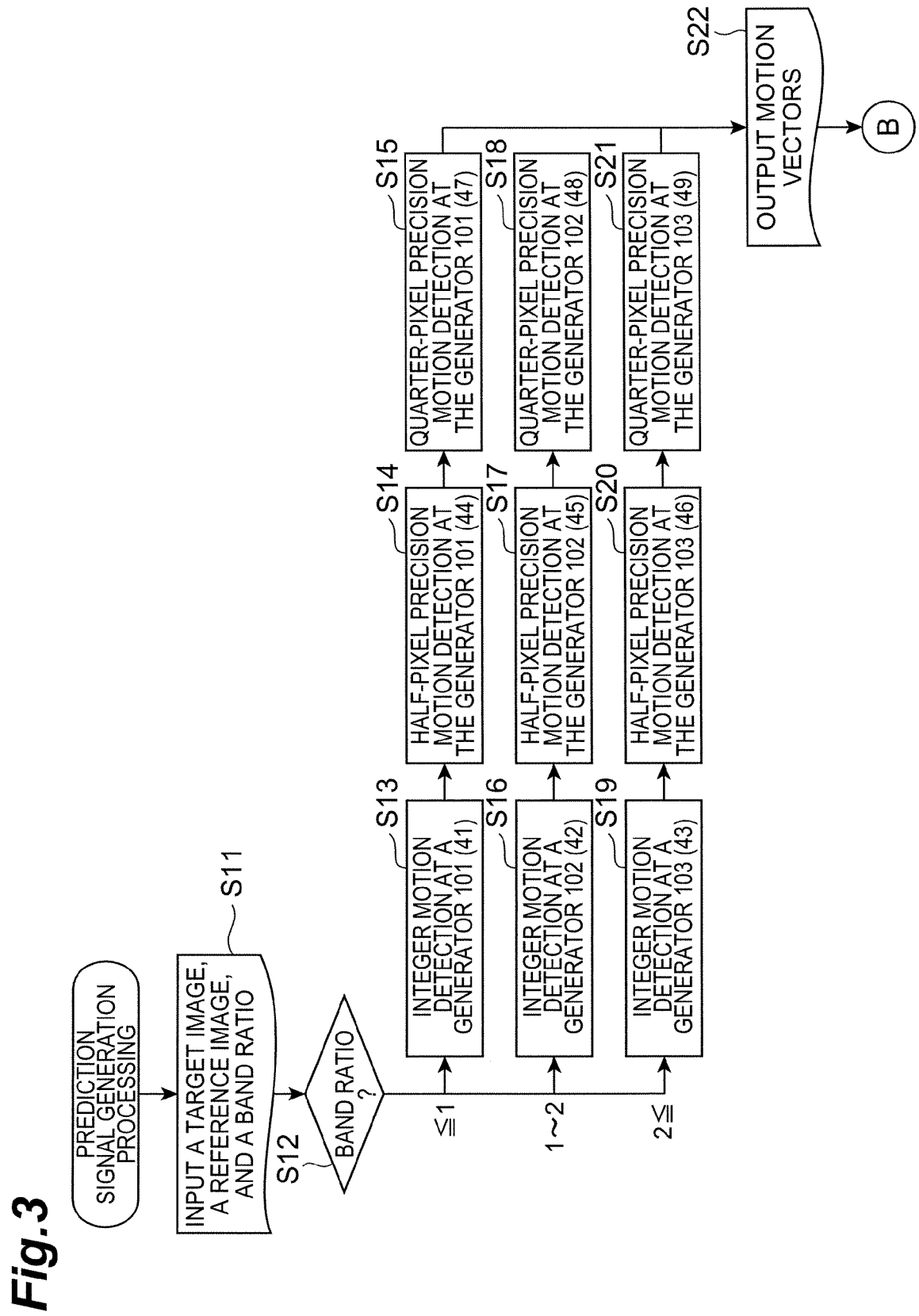
FIG. 3 is a diagram for explaining the first half of the operation of a prediction signal generator.

In S13 shown in FIG. 3, the generator 101 detects an integer precision motion vector (corresponding to 41 shown in FIG. 4). The generator 101 uses a certain pixel value directly in the reference image to perform matching, and takes a displacement of a block located in a location that yields a block having the minimum error, as the integer precision motion vector.

In S14, the generator 101 detects a half-pixel precision motion vector, mainly in a position indicated by the integer precision motion vector (corresponding to 44 shown in FIG. 4).

The generator 101 linearly interpolates the certain pixel value by means of coefficients $[u_h\ u_h]$ in the reference image to generate half-pixel precision pixels, and matches the generated pixels with the target block. Then, the generator 101 takes a displacement of a block located in a location that yields a reference block having the minimum error, as the half-pixel precision motion vector.

For example, although $u_h=\frac{1}{2}$, other linear interpolation coefficients may be used.

In S15, the generator 101 detects a quarter-pixel precision motion vector, mainly in a position indicated by the half-pixel precision motion vector (corresponding to 47 shown in FIG. 4).

The generator 101 linearly interpolates a certain pixel value by means of coefficients $[u_q\ u_q\ u_q\ u_q]$ in the reference image to generate quarter-pixel precision pixels, and matches the generated pixels with the target block. Then, the generator 101 takes a displacement of a block located in a location that yields a reference block having the minimum error, as the quarter-pixel precision motion vector.

For example, although $u_q=\frac{1}{4}$, other linear interpolation coefficients may be used.

In this manner, when the target image and the reference image have the same band level or large band level, the prediction signal generator 9 uses the same method as the conventional one to obtain an optimal motion vector from the motion vectors of integer precision, half-pixel precision and quarter-pixel precision.

In the case in which the band ratio is between 1 and 2 (S12:1 through 2), that is, when the band of the reference image is large but smaller than twice as large as the band of the target image, the prediction signal generator 9 executes the processing of S16, S17 and S18 to detect a motion vector for the target block.

In S16, the generator 102 detects an integer precision motion vector (corresponding to 42 shown in FIG. 4). The generator 102 weight-adds a certain pixel value by means of three coefficients in the reference image to perform matching, and takes a displacement of a block located in a location that yields a block having the minimum error, as the integer precision motion vector.

As the coefficients, for example, $[w_1\ w_2\ w_3]=[\frac{1}{3}\ \frac{1}{3}\ \frac{1}{3}]$ can be used, but other coefficients may be used.

In S17, the generator 102 detects a half-pixel precision motion vector, mainly in a position indicated by the integer precision motion vector (corresponding to 45 shown in FIG. 4).

The generator 102 linearly interpolates a certain pixel value by means of coefficients $[w_{h1}\ w_{h2}\ w_{h3}\ w_{h4}]$ in the reference image to generate half-pixel precision pixels, and matches the generated pixels with the target block. Then, the generator 102 takes a displacement of a block located in a location that yields a reference block having the minimum error, as the half-pixel precision motion vector.

For example, each of the coefficients $[w_{h1}\ w_{h2}\ w_{h3}\ w_{h4}]$ can be obtained by a function of $[u_h\ u_h]$ and $[w_1\ w_2\ w_3]$, but other linear interpolation functions may be used.

In S18, the generator 102 detects a quarter-pixel precision motion vector, mainly in a position indicated by the half-pixel precision motion vector (corresponding to 48 shown in FIG. 4).

The generator 102 linearly interpolates a certain pixel value by means of coefficients $[w_{q1}\ w_{q2}\ w_{q3}\ w_{q4}\ w_{q5}\ w_{q6}]$ in the reference image to generate quarter-pixel precision pixels, and matches the generated pixels with the target block. Then, the generator 102 takes a displacement of a block located in a location that yields a reference block having the minimum error, as the quarter-pixel precision motion vector.

For example, each of the coefficients $[w_{q1}\ w_{q2}\ w_{q3}\ w_{q4}\ w_{q5}\ w_{q6}]$ can be obtained by a function of $[u_q\ u_q\ u_q\ u_q]$ and $[w_{h1}\ w_{h2}\ w_{h3}\ w_{h4}]$, but other linear interpolation functions may be used.

In this manner, when the target image has a band narrower than that of the reference image, the prediction signal generator 9 performs motion detection in a state in which the band of the reference image is matched with the band of the target image, and obtains an optimal motion vector from the motion vectors of integer precision, half-pixel precision and quarter-pixel precision.

In the case in which the band ratio is 2 or higher (S12:$2\leq$), that is, when the band of the reference image is at least twice as large as the band of the target image, the prediction signal generator 9 executes the processing of S19, S20 and S21 to detect a motion vector for the target block.

In S19, the generator 103 detects an integer precision motion vector (corresponding to 43 shown in FIG. 4). The generator 103 weight-adds a certain pixel value by means of three coefficients in the reference image to perform matching, and takes a displacement of a block located in a location that yields a block having the minimum error, as the integer precision motion vector.

As the coefficients, for example, $[v_1\ v_2\ v_3]=[\frac{1}{4}\ \frac{2}{4}\ \frac{1}{4}]$ can be used, but other coefficients may be used.

In S20, the generator 103 detects a half-pixel precision motion vector, mainly in a position indicated by the integer precision motion vector (corresponding to 46 shown in FIG. 4).

The generator 103 linearly interpolates a certain pixel value by means of coefficients $[v_{h1}\ v_{h2}\ v_{h3}\ v_{h4}]$ in the reference image to generate half-pixel precision pixels, and matches the generated pixels with the target block. Then, the generator 102 takes a displacement of a block located in a location that yields a reference block having the minimum error, as the half-pixel precision motion vector.

For example, each of the coefficients $[v_{h1}\ v_{h2}\ v_{h3}\ v_{h4}]$ can be obtained by a function of $[u_h\ u_h]$ and $[v_1\ v_2\ v_3]$, but other linear interpolation functions may be used.

In S21, the generator 103 detects a quarter-pixel precision motion vector, mainly in a position indicated by the half-pixel precision motion vector (corresponding to 49 shown in FIG. 4).

The generator 103 linearly interpolates a certain pixel value by means of coefficients $[v_{q1}\ v_{q2}\ v_{q3}\ v_{q4}\ v_{q5}\ v_{q6}]$ in the reference image to generate quarter-pixel precision pixels, and matches the generated pixels with the target block. Then, the generator 103 takes a displacement of a block located in a location that yields a reference block having the minimum error, as the quarter-pixel precision motion vector.

For example, each of the coefficients $[v_{q1}\ v_{q2}\ v_{q3}\ v_{q4}\ v_{q5}\ v_{q6}]$ can be obtained by a function of $[u_q\ u_q\ u_q\ u_q]$ and $[v_{h1}\ v_{h2}\ v_{h3}\ v_{h4}]$, but other linear interpolation functions may be used.

In this manner, when the target image has a band that is much narrower than that of the reference image, the prediction signal generator 9 performs motion detection in a state in which the band of the reference image is matched with the band of the target image, and obtains an optimal motion vector from the motion vectors of integer precision, half-pixel precision and quarter-pixel precision.

The motion vectors that are obtained in a state in which the band of the reference image is matched with the band of the target image are output to the entropy encoder 11 in S22.

Figure 5:
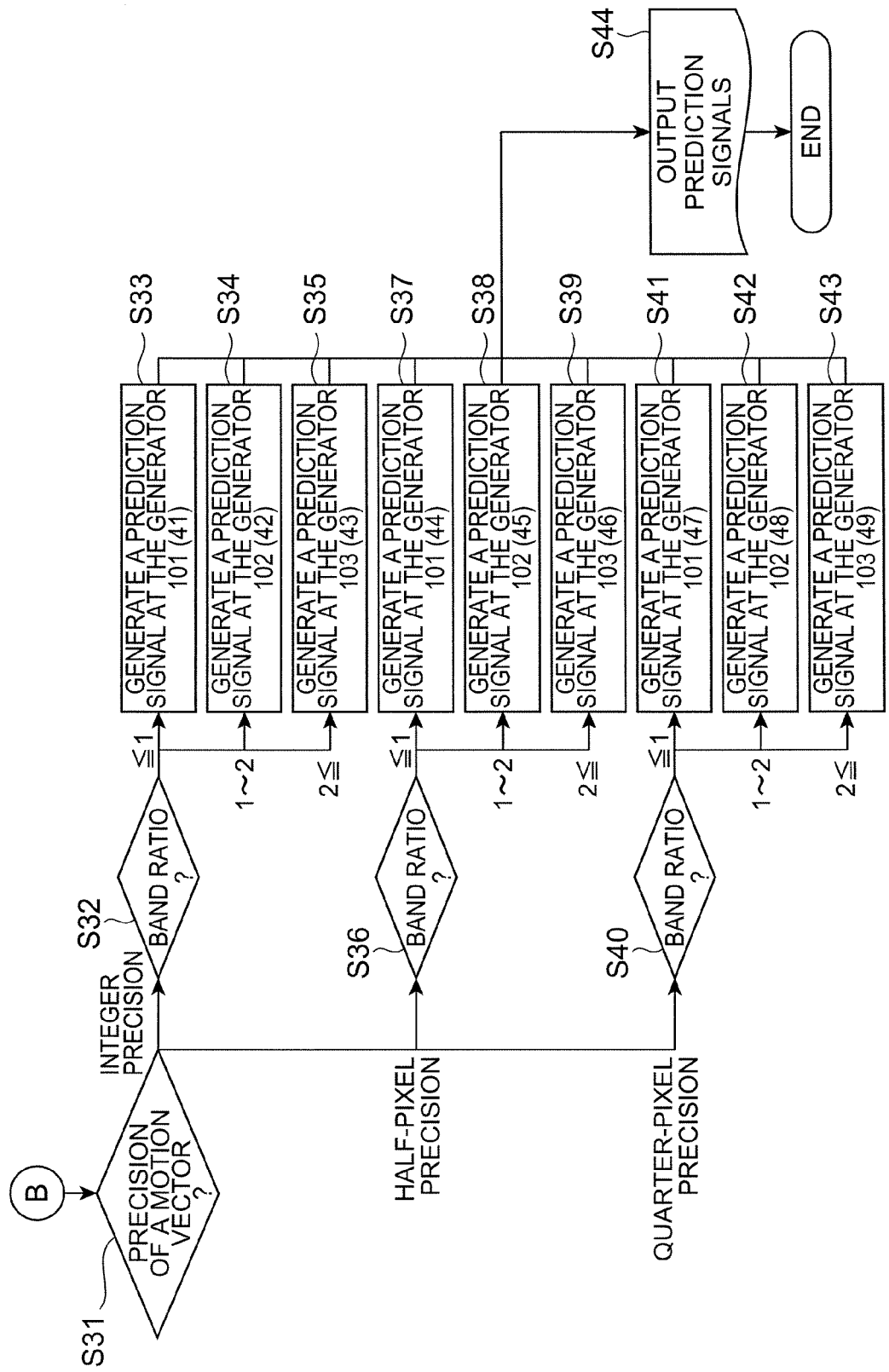
FIG. 5 is a diagram for explaining the last half of the operation of the prediction signal generator.

Returning to FIG. 5, explanation of the operation of the prediction signal generator 9 will be continued.

Subsequently, with respect to the optical vector obtained in the manner described above, the prediction signal generator 9 generates a prediction signal in accordance with the precision of the optimal vector (S31).

For example, in the case in which the motion vector is an integer-pixel precision, the processing proceeds to S32, in the case of a half-pixel precision the processing proceeds to S36, and in the case of the motion vector has a quarter-pixel precision, the processing proceeds to S40.

In S32, the generators generate a prediction signal in accordance with the band ratio. Specifically, if the band ratio is 1 or lower, the generator 101 generates a prediction signal (S33, corresponding to 41 shown in FIG. 4), and if the band ratio is between 1 and 2, the generator 102 generates a prediction signal (S34, corresponding to 42 shown in FIG. 4). If the band ratio is 2 or higher, the generator 103 generates a prediction signal (S35, corresponding to 43 shown in FIG. 4).

In S36 and S40 as well, the generator corresponding to the band ratio generates a prediction signal, as in S32. Specifically, if the band ratio is 1 or lower, the generator 101 generates a prediction signal (S37 and S41, corresponding respectively to 44 and 47 shown in FIG. 4), and if the band ratio is between 1 and 2, the generator 102 generates a prediction signal (S38 and S42, corresponding respectively to 45 and 48 shown in FIG. 4). If the band ratio is 2 or higher, the generator 103 generates a prediction signal (S39 and S43, corresponding respectively to 46 and 49 shown in FIG. 4).

The generated prediction signal is output to the differential unit 2 and the adder 7 (S44).

The first embodiment adopts a configuration in which coefficients for generating a prediction signal are prepared beforehand in each of the generators generating prediction signals, and the generators are selected based on the motion vector precision and the band ratio. Therefore, the band-related information relates only to the band ratio. However, the moving image encoding device 13 may obtain optimal coefficients by means of the band ratio without preparing the generators for generating a prediction signal beforehand, and may encode all of the coefficients together.

In such embodiment, the means for generating a prediction signal, or the coefficients for generating a prediction signal may be output as the band-related information, in addition to or in place of the band ratio. The moving image encoding device 13 can obtain a prediction signal of higher precision by obtaining the generator in accordance with the band ratio, thus the image compression rate can be further improved.

Also, in the first embodiment, data on one band ratio is output for one or a plurality of images, but this is not only the case. Specifically, the moving image encoding device 13 may output the band-related information not only in units of images but also in units of blocks obtained by dividing an image.

Furthermore, the horizontal direction and the vertical direction of an image may be processed using the respective band data. In this case, the prediction signal generator 9 obtains the band ratio in relation to the horizontal direction and to the vertical direction, and thereafter generates prediction signals by means of the generators different according to the direction.

In addition, in the first embodiment, the prediction signals is generated based on the motion vectors up to quarter-pixel precision, but the prediction signals may be generated based on 1/8-pixel precision or above.

In the first embodiment, the band ratio is used as the band-related information, but the band ratio may be obtained using another function that is different from the abovementioned functions. Such embodiment can be realized by setting the determination conditions for generating a prediction signal in accordance with the definition of the abovementioned another function.

Next, the moving image decoding device according to an embodiment of the present invention is described.

Figure 6:
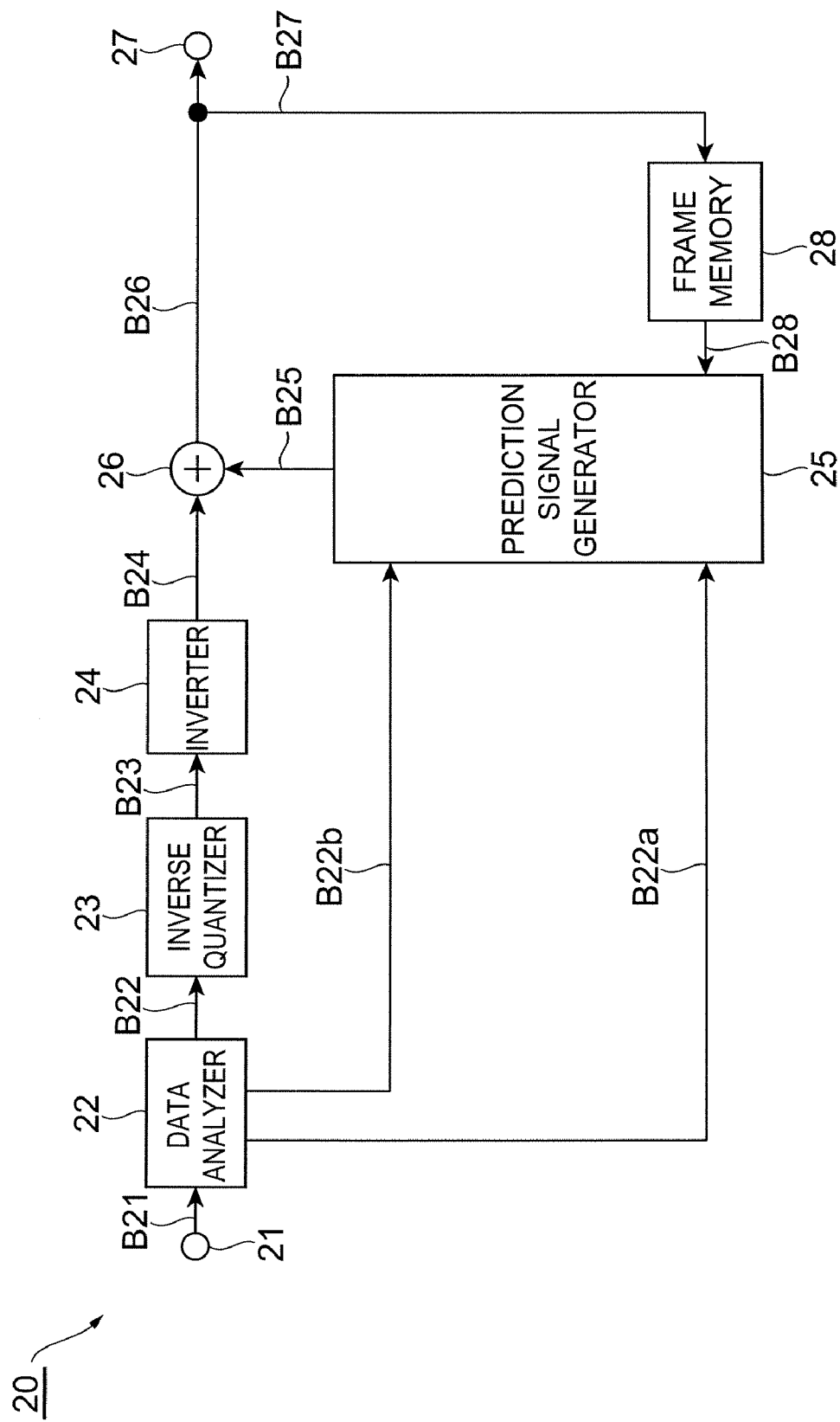
FIG. 6 is a diagram showing a configuration of a moving image decoding device according to the first embodiment.

FIG. 6 is a diagram showing a configuration of the moving image decoding device of the present invention.

A moving image decoding device 20 of the first embodiment has an input terminal 21 (corresponding to the input means), a data analyzer 22, an inverse quantizer 23, an inverter 24 ([both] corresponding to the decoding means), a prediction signal generator 25 (corresponding to the prediction signal generating means), an adder 26 (corresponding to the adding means), an output terminal 27, and a frame memory 28 (corresponding to the storage means). These components are connected with one another via buses so that signals can be input and output.

The detail of each of these components is described hereinafter.

The input terminal 21 inputs compressed data that contains data on an encoded differential signal obtained by predictively encoding a moving image, data on a motion vector, and the band-related information (such as the band ratio).

The data analyzer 22 analyzes the input compressed data to perform entropy decoding processing, and extracts the quantized conversion coefficient, information on quantization, the motion vectors related to generation of prediction signals, and the band-related information on the image to be decoded.

The inverse quantizer 23 generates an inversely quantized conversion coefficient from the abovementioned conversion coefficient that is input from the data analyzer 22 via a bus B22, and from the information on quantization.

The inverter 24 performs inverse discrete cosine transformation on the abovementioned conversion coefficient that is input from the inverse quantizer 23 via a bus B23, to generate a reproduced differential signal.

Although described in detail hereinafter, the prediction signal generator 25 generates a prediction signal on the basis of the motion vector that is input from the data analyzer 22 via a bus B22a and on the basis of band-related information that is input via a bus B22b. As with the prediction signal generator 9 described above, the prediction signal generator 25 has the generators 101, 102 and 103 that are executed in accordance with the band ratio included in the band-related information. The relation between a row of coefficients used by these generators to generate prediction signals and the pixel precision of the motion vectors is as shown in FIG. 4.

The adder 26 adds up the reproduced differential signal, which is input from the inverter 24 via a bus B24, and the prediction signal, which is input from the prediction signal generator 25 via a bus B25.

The output terminal 27 outputs the result of addition, which is input from the adder 26, as a reproduced image.

The frame memory 28 stores the result of addition, which is input from the adder 26 via a bus B27, as the reproduced image to be used for decoding the next image. It should be noted that the frame memory 28 may store information on the band of a target image for use in decoding the next image, as with the frame memory 8 described above. In this case, in place of the band ratio, only the information on a bandwidth possessed by the target image is contained in the band-related information.

Figure 7:
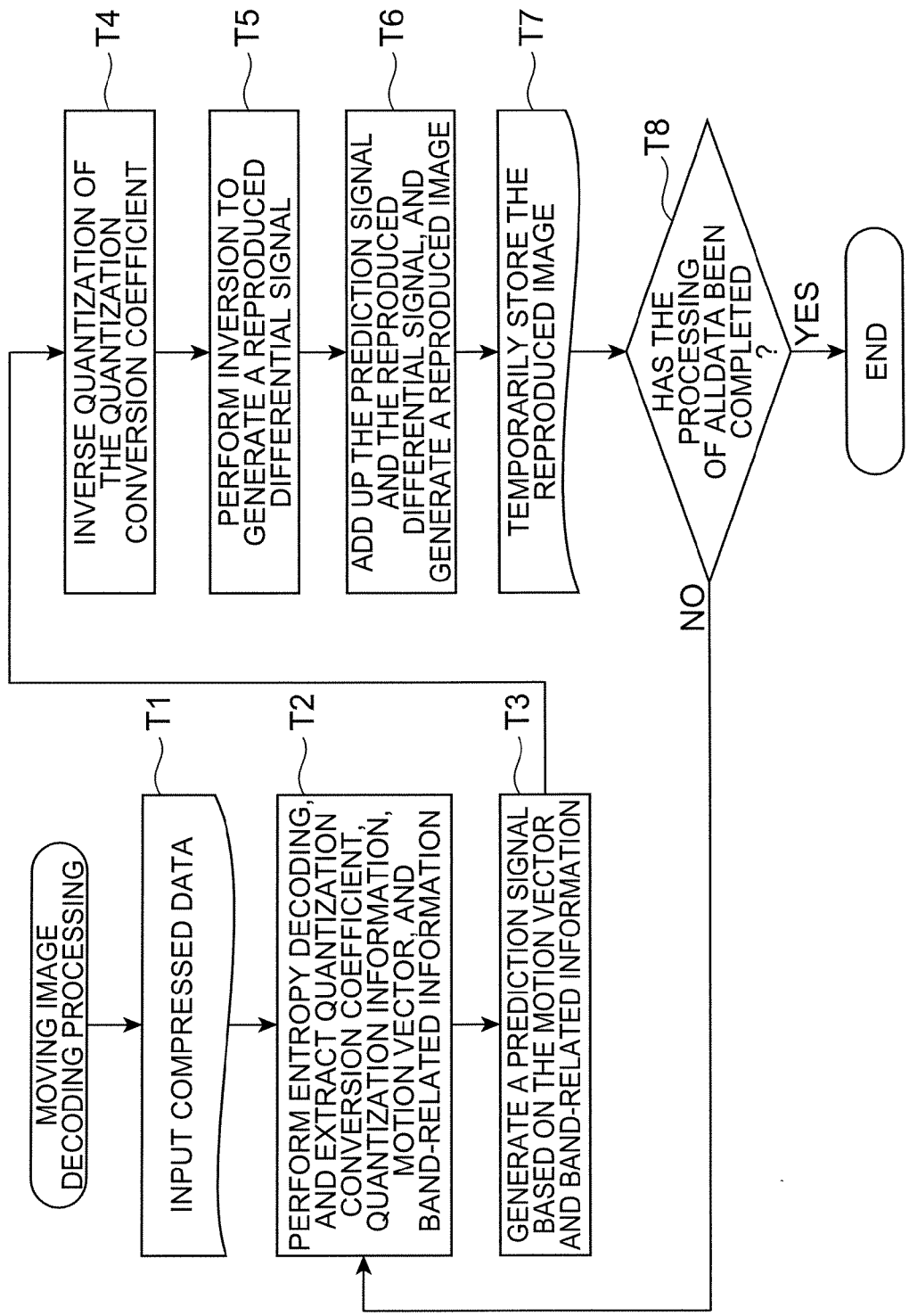
FIG. 7 is a diagram for explaining the operation of the moving image decoding device.

Next, the operation of the moving image decoding device 20 and the steps configuring the moving image decoding method are described hereinafter with reference to FIG. 7.

In T1, compressed data containing data on an encoded differential signal, data on a motion vector, and the band-related information are input to the input terminal 21 of the moving image decoding device 20. The data analyzer 22 performs entropy decoding processing and at the same time extracts, from the compressed data, a quantized conversion coefficient, the information on quantization, the motion vector related to generation of a prediction signal, and the band-related information on the image to be decoded (T2).

The prediction signal generator 25 generates a prediction signal on the basis of the motion vectors and band-related information that are input from the data analyzer 22 (T3). The detail of the method of generating prediction signals is described hereinafter.

On the other hand, the quantized conversion coefficient is inversely quantized by the inverse quantizer 23 (T4), and is then subjected to inverse discrete cosine transformation by the inverter 24. As a result, a reproduced differential signal is generated (T5).

The prediction signal generated in T3 and the reproduced differential signal generated in T5 are added up by the adder 26, whereby a reproduced image is generated (T6). This reproduced image is temporarily stored in the frame memory 28 in order to decode the next image (T7).

The series of processes from T2 through T8 are repeatedly executed until decoding processing of all compressed data that are input is completed (T8).

Figure 8:
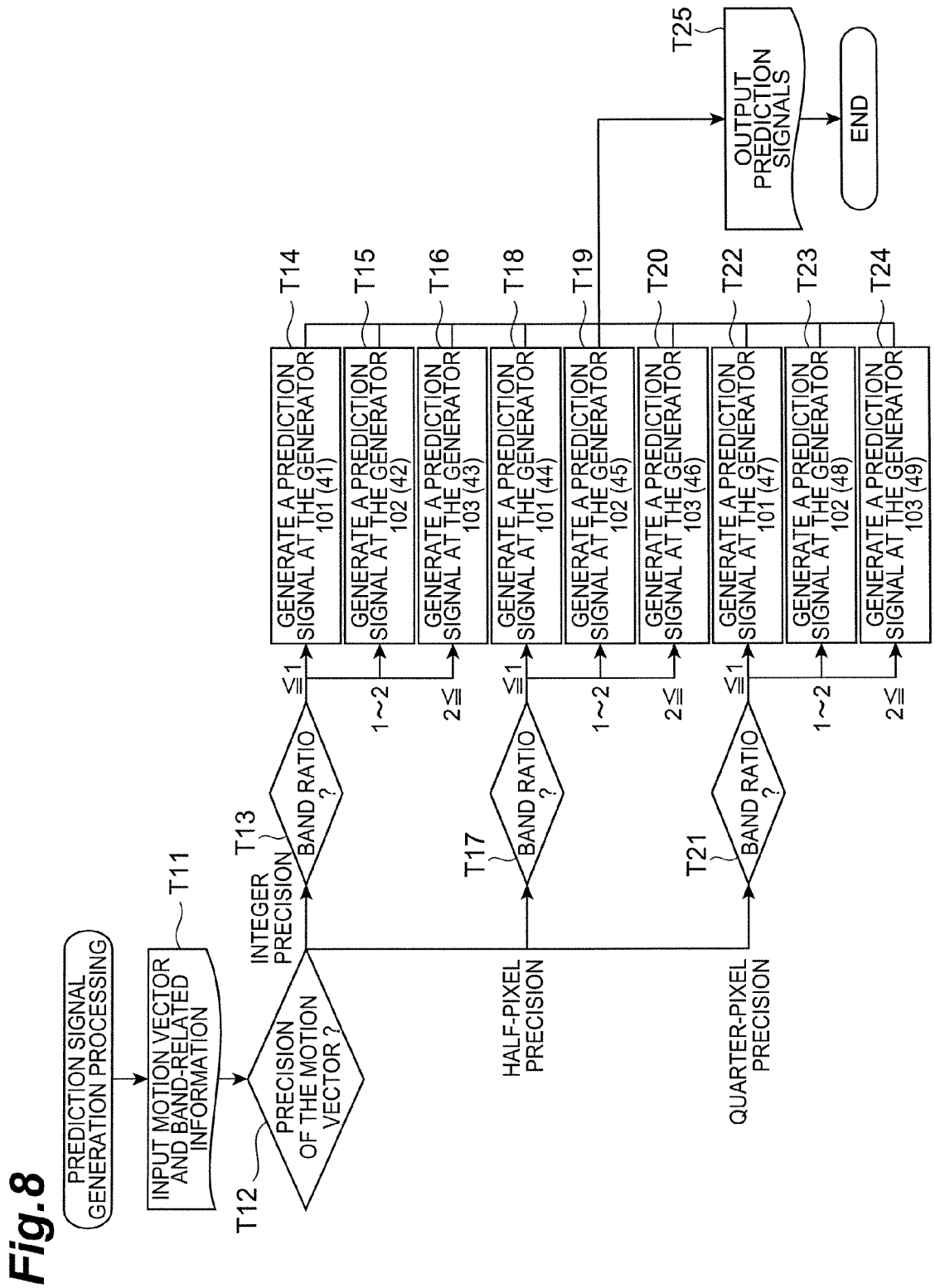
FIG. 8 is a diagram for explaining the operation of the prediction signal generator.

Next, the operation of the prediction signal generator 25 is described in detail with reference to FIG. 8.

In T11, a motion vector of a block to be decoded and the band-related information are input from the data analyzer 22. The band-related information includes the information on the band ratio of a reference image to a target image.

In relation to the input motion vector, the prediction signal generator 25 generates a prediction signal in accordance with the precision of the input motion vector (T12).

For example, in the case in which the motion vector is an integer-pixel precision, the processing proceeds to T13, in the case of a half-pixel precision the processing proceeds to T17, and in the case of the motion vector has a quarter-pixel precision, the processing proceeds to T21.

In T13, the generator generates a prediction signal in accordance with the band ratio. Specifically, if the band ratio is 1 or lower, the generator 101 generates a prediction signal (T14, corresponding to 41 shown in FIG. 4), and if the band ratio is between 1 and 2, the generator 102 generates a prediction signal (T15, corresponding to 42 shown in FIG. 4). If the band ratio is 2 or higher, the generator 103 generates a prediction signal (T16, corresponding to 43 shown in FIG. 4).

In T17 and T21 as well, the generator corresponding to the band ratio generates a prediction signal, as in T13. Specifically, if the band ratio is 1 or lower, the generator 101 generates a prediction signal (T18, T22, corresponding to 44 and 47 shown in FIG. 4), and if the band ratio is between 1 and 2, the generator 102 generates a prediction signal (T19 and T23, corresponding respectively to 45 and 48 shown in FIG. 4). If the band ratio is 2 or higher, the generator 103 generates a prediction signal (T20 and T24, corresponding respectively to 46 and 49 shown in FIG. 4).

Then, the generated prediction signal is output to the adder 26 (T25).

The first embodiment adopts a configuration in which coefficients for generating a prediction signal are prepared beforehand in each of the generators generating prediction signals, and the generators are selected based on the motion vector precision and the band ratio. Therefore, the band-related information relates only to the band ratio. However, if the band-related information includes information for discriminating the generators for generating the prediction signals, the prediction signal generator 25 may generate a prediction signal by using this information.

Also, in the first embodiment, data on one band ratio is output for one or a plurality of images, but this is not only the case. Specifically, the moving image decoding device 20 may output the band-related information not only in units of images but also in units of blocks obtained by dividing an image. In such embodiment, the prediction signal generator 25 generates a prediction signal on the basis of each band-related information item of each block.

Furthermore, the horizontal direction and the vertical direction of an image may be processed using the respective band data. In this case, the prediction signal generator 25 obtains the band ratio in relation to the horizontal direction and to the vertical direction, and thereafter generates prediction signals in accordance with the band ratio.

In addition, in the first embodiment, the prediction signals a reproduced based on the motion vectors up to quarter-pixel precision, but the prediction signals may be generated based on ⅛-pixel precision or above.

Here, the moving image encoding technology according to the present invention can also be realized as a moving image encoding program for operating a computer as the moving image encoding device 13.

Figure 9:
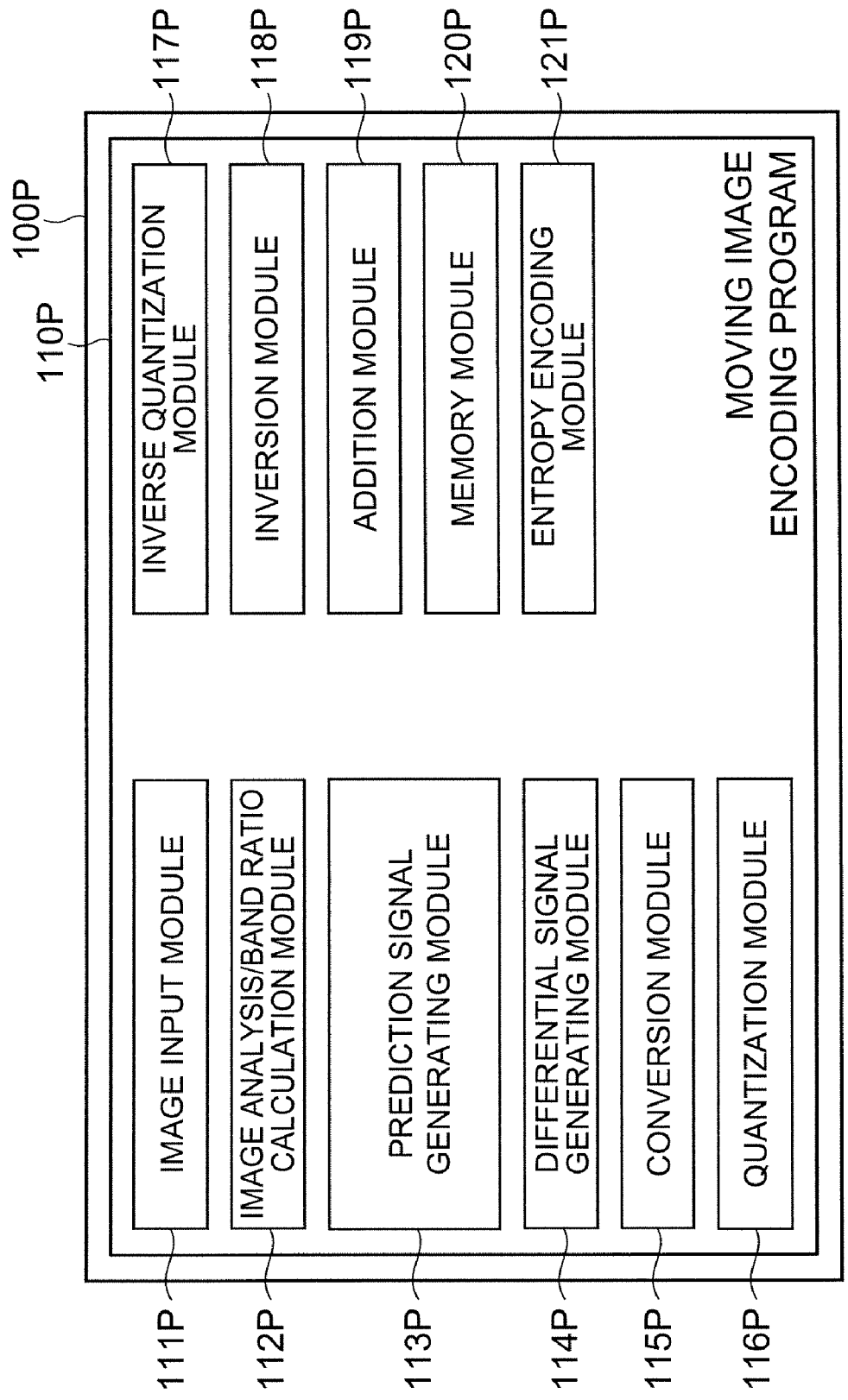
FIG. 9 is a schematic diagram showing a configuration of a moving image encoding program.

FIG. 9 is a diagram showing a configuration of a moving image encoding program 110P according to the present invention. The moving image encoding program 110P is recorded in a recording medium 100P. The recording medium 100P is, for example, a floppy disk, a CD-ROM, a DVD, or a semiconductor memory.

As shown in FIG. 9, the moving image encoding program 110P has, as constituent units, an image input module 111P, an image analysis/band ratio calculation module 112P, a prediction signal generating module 113P, a differential signal generating module 114P, a conversion module 115P, a quantization module 116P, an inverse quantization module 117P, an inversion module 118P, an addition module 119P, and an entropy encoding module 121P. The functions that are realized by executing these modules are the same as the functions of the input terminal 1, band analyzer 10, prediction signal generator 9, differential unit 2, converter 3, quantizer 4, inverse quantizer 5, inverter 6, adder 7, and entropy encoder 11 of the moving image encoding device 13 described above. The data stored by executing a memory module 120P are the same as the data stored in the frame memory 8.

Also, the moving image decoding technology according to the present invention can be realized as a moving image decoding program for operating the computer as the moving image decoding device 20.

Figure 10:
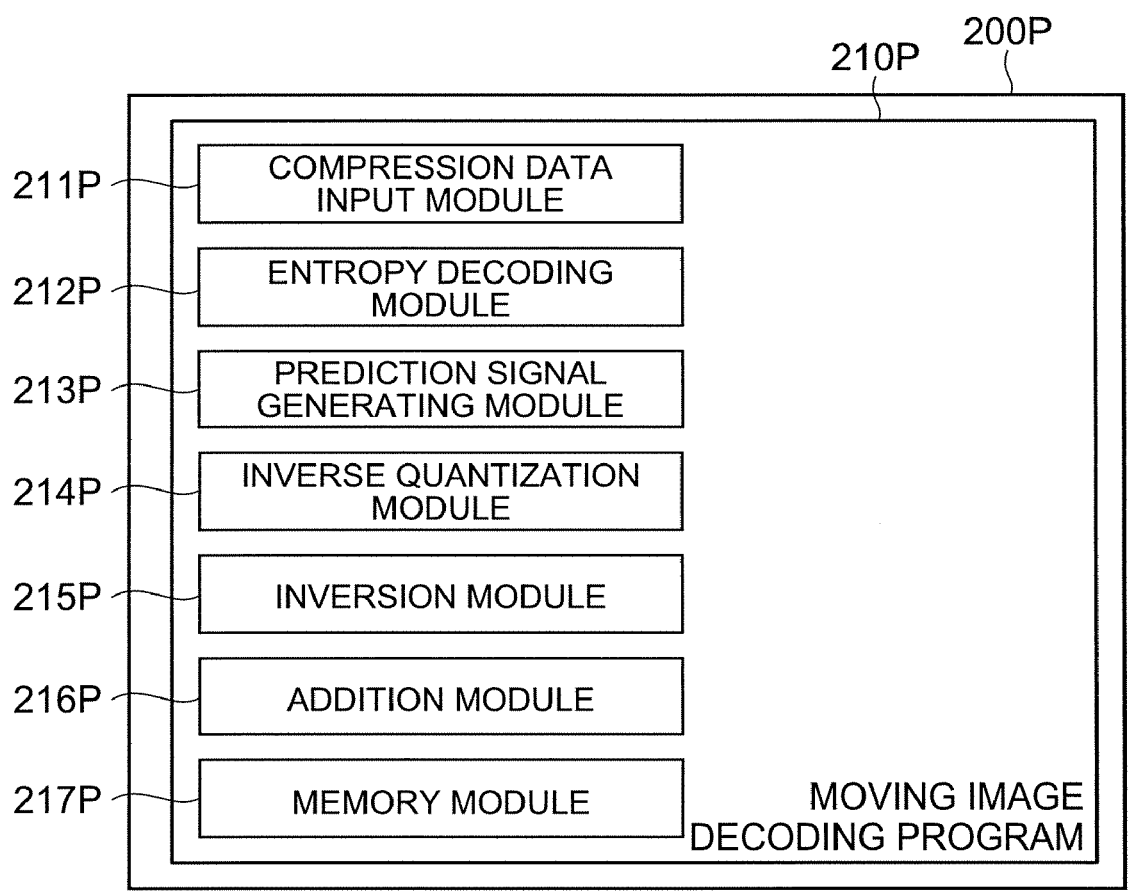
FIG. 10 is a schematic diagram showing a configuration of a moving image decoding program.

A moving image decoding program 210P according to the present invention can adopt the configuration shown in FIG. 10. The moving image decoding program 210P is recorded in a recording medium 200P. The recording medium 200P is, for example, a Floppy™ disk, a CD-ROM, a DVD, or a semiconductor memory.

As shown in FIG. 10, the moving image decoding program 210P has, as constituent units, a compression data input module 211P, an entropy decoding module 212P, a prediction signal generating module 213P, an inverse quantization module 214P, an inversion module 215P, and an addition module 216P. The functions that are realized by executing these modules are the same as the functions having respectively the input terminal 21, data analyzer 22, prediction signal generator 25, inverse quantizer 23, inverter 24, and adder 26 of the moving image decoding device 20 described above. The data stored by executing a memory module 217P are the same as the data stored in the frame memory 28.

Figure 11:
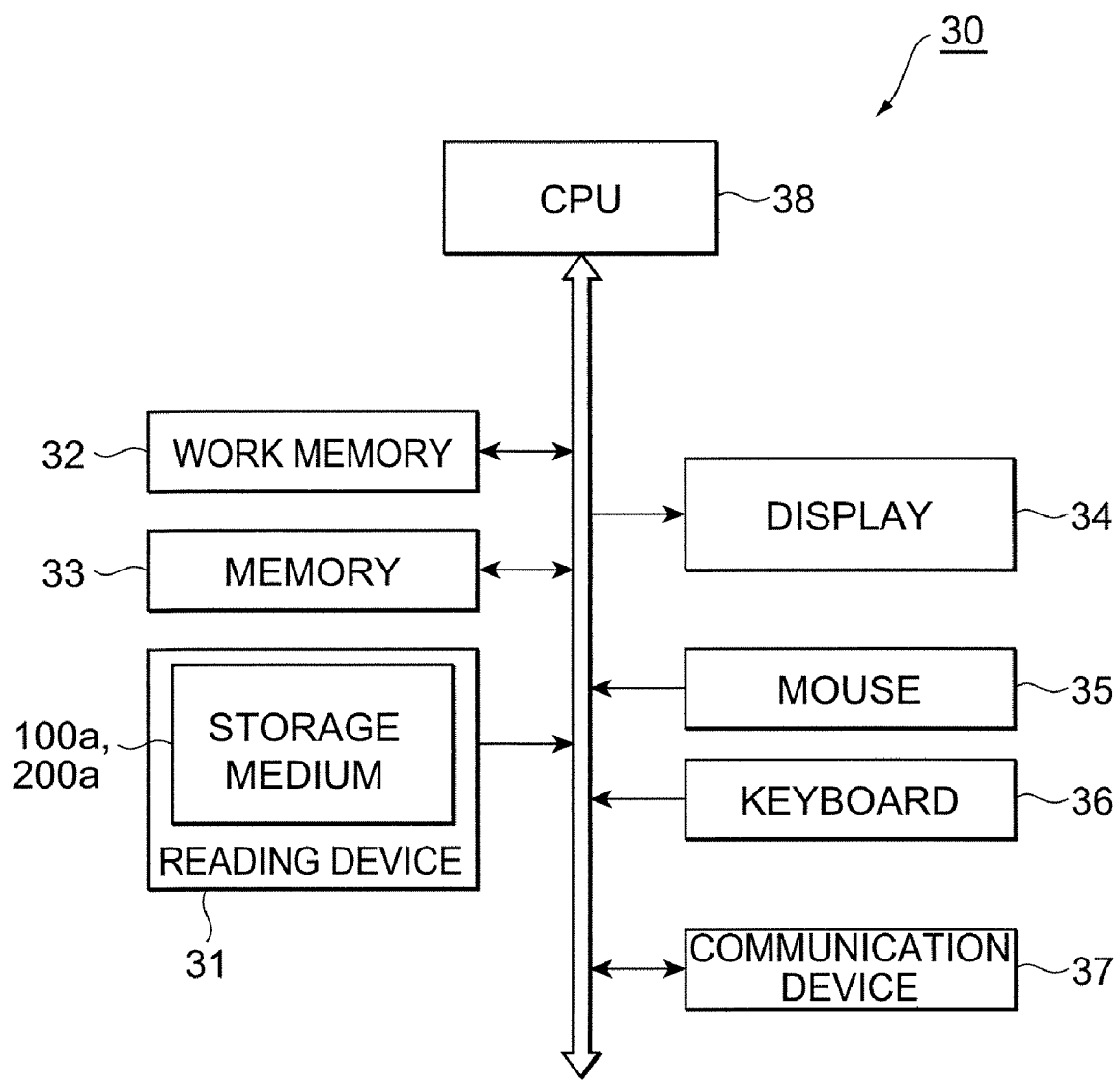
FIG. 11 is a diagram showing a schematic configuration of a computer that executes the moving image encoding/decoding programs.

FIG. 11 is a diagram showing a hardware configuration of a computer for executing the programs recorded in the recording media 100P, 200P.

As shown in FIG. 11, a computer 30 has a data reading device 31 such as a FDD (Floppy Disk Drive), a CD-ROM drive device and a DVD drive device, a work memory (RAM: Random Access Memory) 32 in which the OS resides, a memory 33 for storing the programs read out from the recording media 100P, 200P, a display 34 serving as a display device, a mouse 35 and a keyboard 36 that serve as input devices, a communication device 37 for performing data transmission/reception, and a CPU 38 that entirely controls execution of the programs.

Once the recording media 100P, 200P are inserted into the reading device 31, the computer 30 can access the moving image encoding program 110P and the moving image decoding program 210P, which are recorded in the recording media 100P and 200P respectively, via the reading device 31. The computer 30 executes the moving image encoding program 110P by means of the CPU 38, and thereby operates as the moving image encoding device 13 described above. Similarly, the computer 30 executes the moving image decoding program 210P by means of the CPU 38, and thereby can operate as the moving image decoding device 20 described above.

Figure 12:
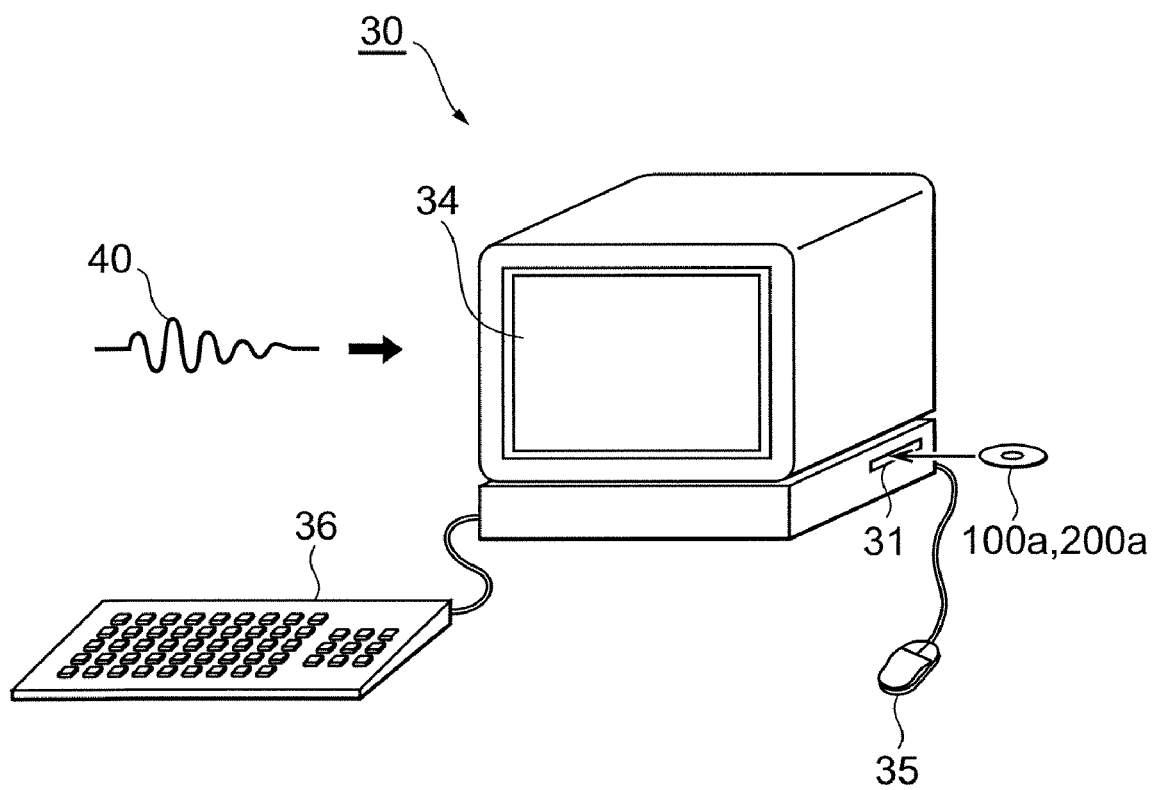
FIG. 12 is an external perspective view of the computer that executes the moving image encoding/decoding programs.

FIG. 12 is an external perspective view of the computer 30 for executing the programs recorded in the recording media 100P and 200P. The computer 30 is not only a PC (Personal Computer), but also a DVD player, a set-top box, a cellular phone, or the like that has a CPU and performs information processing and control by means of software.

As shown in FIG. 12, the moving image encoding program 110P or the moving image decoding program 210P may be provided (downloaded), via a network, as a data signal 40 that is superimposed on a carrier wave. In this case, the computer 30 receives the moving image encoding program 110P or the moving image decoding program 210P by means of the communication device 37, stores the received program in the memory 33, and thereafter executes the program.

As described above, according to the moving image encoding/decoding technologies (devices, methods, programs) of the present invention, after the band of the target image and the band of the reference image are measured, the band-related information indicating these bands is generated. Then, on the basis of the band-related information, a prediction signal for the target image is generated from the reference image so that the band of the prediction signal is matched with the band of the target image. Accordingly, the band of the target image becomes nearly equal to the band of the prediction signal of the target image, and the high-frequency components of the reference image are not shifted to the prediction signal. As a result, the compression-encoding efficiency is improved.

Figure 13:
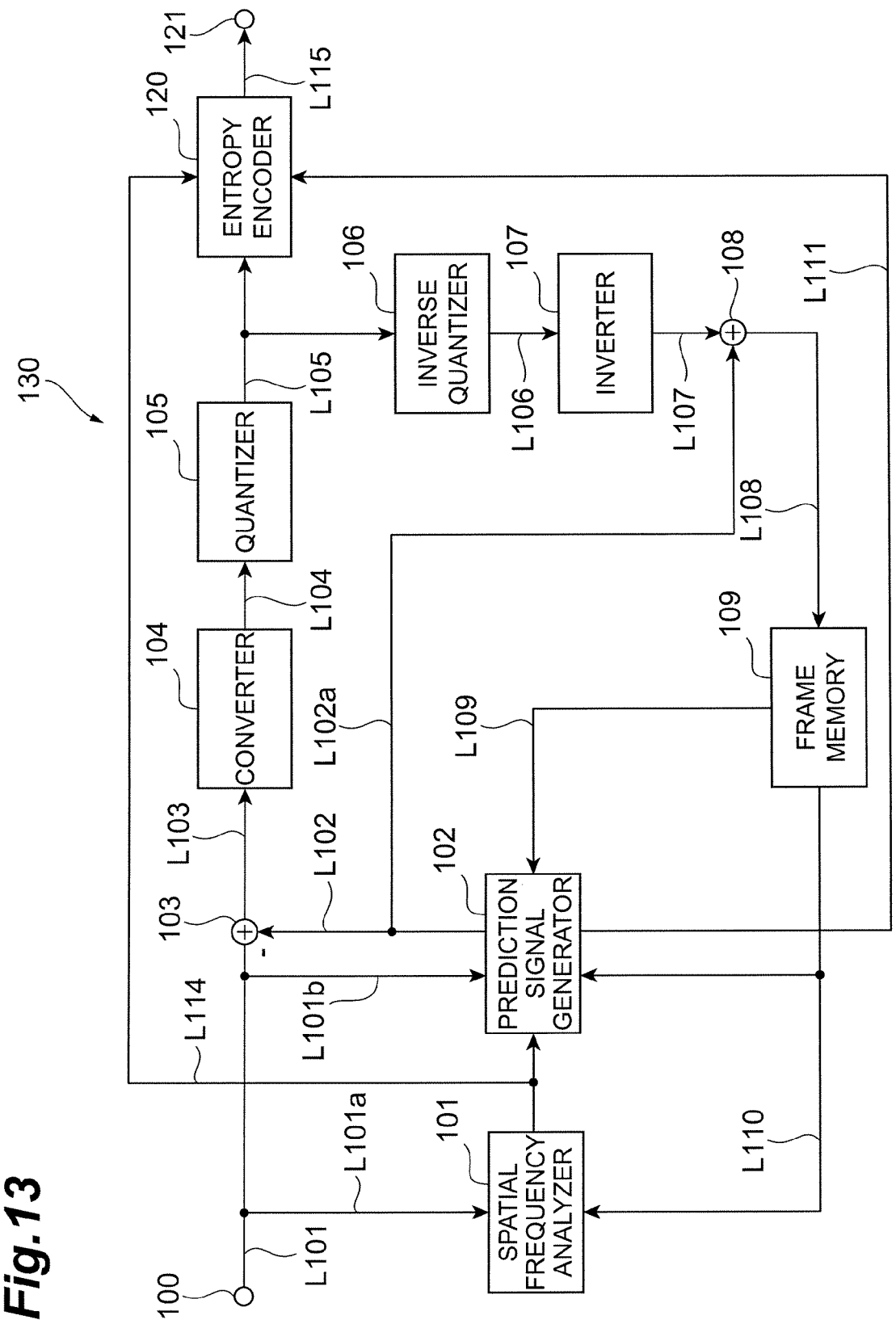
FIG. 13 is a block diagram of a moving image encoding device 130.

Next, the second embodiment of the present invention is described with reference to FIG. 13 through FIG. 22. First, the moving image encoding device of the second embodiment is described. FIG. 13 is a block diagram of a moving image encoding device 130. This moving image encoding device 130 is constituted by an input terminal 100 (input means), a spatial frequency analyzer 101 (spatial frequency amplitude analyzing means), a prediction signal generator 102 (prediction signal generating means), a differential unit 103 (differential means), a converter 104 (encoding means), a quantizer 105 (encoding means), an inverse quantizer 106 (decoding means), an inverter 107 (decoding means), an adder 108 (reproduced image generating means), a frame memory 109 (storage means), an entropy encoder 120, and an output terminal 121 (output means). Each of these components is described hereinafter.

The input terminal 100 is a terminal for inputting a plurality of image data configuring moving image data, and is a section for inputting, one by one, a plurality of static image data configuring the moving image data that is output from a camera or a memory storing a moving image. It should be noted that the input image is divided into areas of a predetermined size by an image divider, which is not shown. In the second embodiment, the image is divided into blocks, each of which is composed of 16×16 pixels, and compression/encoding processing is performed in units of blocks.

The spatial frequency analyzer 101 is a section for generating spatial frequency amplitude-related information (frequency characteristic-related information) indicating a ratio or the relative or absolute difference between the amplitudes of the target image and the reference image, that is, spatial-frequency-amplitude-related information for adjusting the difference between the amplitude of a spatial frequency component of the target image and the amplitude of a spatial frequency component of the reference image. Specifically, the spatial frequency analyzer 101 calculates the spatial frequency amplitude of the target image that is input via a line L101a and a reference image signal that is extracted from the frame memory 109 via a line L110. The spatial frequency analyzer 101 then generates the spatial frequency amplitude-related information indicating the ratio or relative or absolute difference between the amplitudes of the target image and the reference image, on the basis of the information on the calculated spatial frequency amplitudes of the target image and reference image. The spatial frequency analyzer 101 outputs the generated spatial frequency amplitude-related information to the entropy encoder 120 and the prediction signal generator 102.

Figure 14:
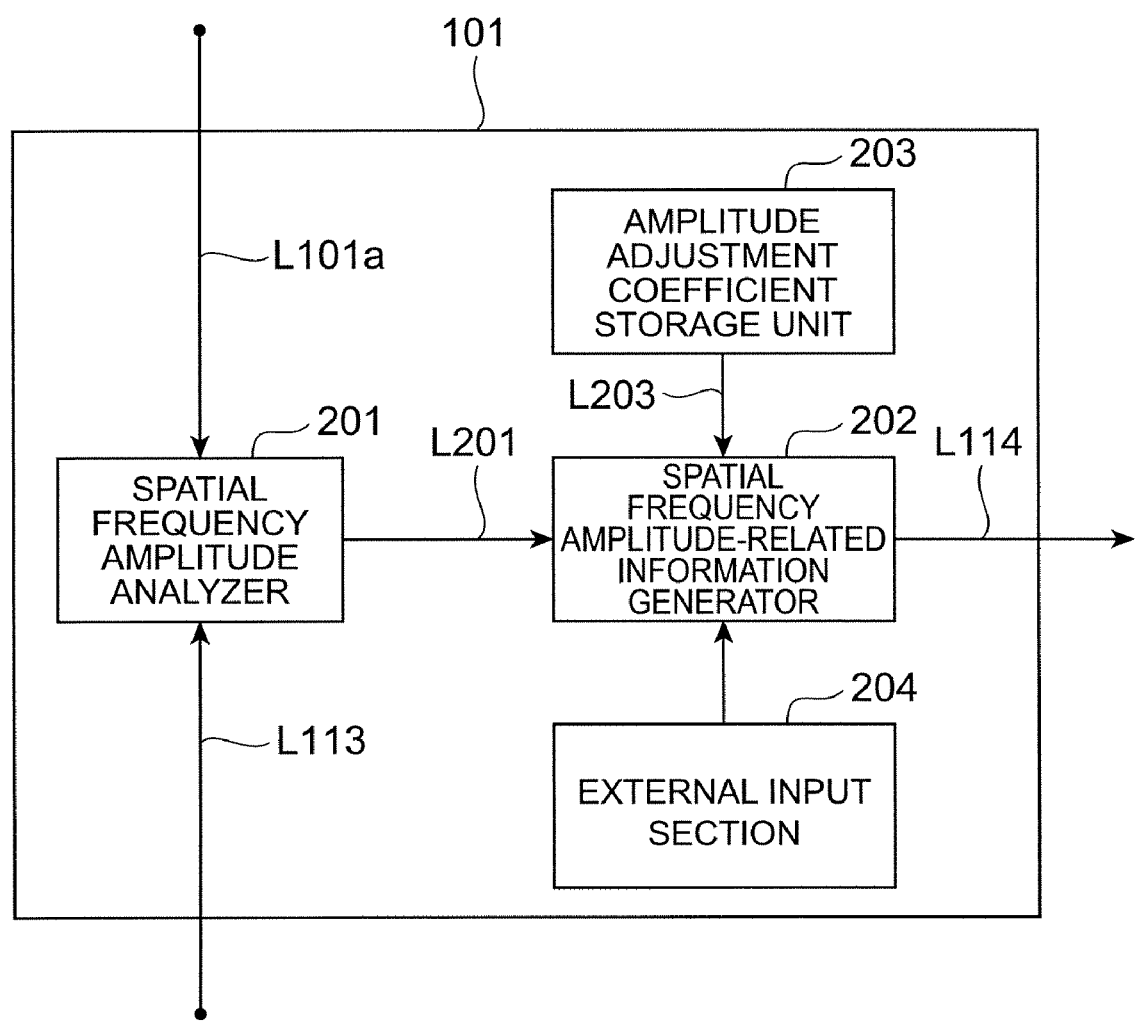
FIG. 14 is a block diagram of a spatial frequency analyzer 101.

Now, the detailed configuration of the spatial frequency analyzer 101 is described. FIG. 14 is a block diagram of the spatial frequency analyzer 101. The spatial frequency analyzer 101 is constituted by a spatial frequency amplitude analyzer 201, a spatial frequency amplitude-related information generator 202, and an amplitude adjustment coefficient storage unit 203. Each of these components is described hereinafter.

The spatial frequency amplitude analyzer 201 is a section that calculates the spatial frequency amplitude of the target image and the spatial frequency amplitude of the reference image, and then outputs the calculated amplitudes to the spatial frequency amplitude-related information generator 202 via a line L201, along with the spatial frequency of the target image and the spatial frequency of the reference image.

Specifically, the spatial frequency amplitude analyzer 201 acquires a target image to be encoded, via the line L101a, and a reference image to be referenced for generating a prediction signal of the target image, via the line L110. The reference image is stored in the frame memory 109 and then input via the line L110. In the second embodiment the image focuses on a single reference image, but a plurality of reference images may be used.

The spatial frequency amplitude analyzer 201 calculates the amplitude of spatial frequency components of the target image and the amplitude of spatial frequency components of the reference image by performing Fourier transformation on the target image and the reference image. Specifically, the spatial frequency amplitude analyzer 201 performs two-dimensional Fourier transformation on the target image to generate a row of frequency coefficients, and then calculates power spectrum of the coefficients of the row of frequency coefficients. In other words, the spatial frequency amplitude analyzer 201 obtains the square root of the sum of squares of the real number component and the imaginary number component as a magnitude of a spatial frequency amplitude of each spatial frequency. It should be noted that the method of calculating a spatial frequency amplitude (method of expression) is not limited to the abovementioned calculation method, thus another calculation method may be used.

The spatial frequency amplitude analyzer 201 of the second embodiment calculates a two-dimensional spatial frequency amplitude, but the spatial frequency amplitude analyzer 201 may also calculate a spatial frequency amplitude by means of one-dimensional Fourier transformation. In this case, for example, Fourier transformation may be performed on each row in a horizontal direction to calculate the spatial frequency amplitude. Also, at least one spatial frequency amplitude in a vertical direction, a horizontal direction, or a direction other than vertical and horizontal directions may be taken as the target.

Furthermore, in the second embodiment, the spatial frequency amplitude is calculated by taking a row of two-dimensional data, but a row of one-dimensional data may be used. Also, any part of the two-dimensional data may be extracted and used. In addition, the two-dimensional data may be arrayed by means of a sorting method, such as zigzag scanning, and processed as one-dimensional data.

Moreover, in the second embodiment, Fourier transformation is performed as frequency conversion, but other frequency conversion, such as discrete cosine transformation or discrete wavelet transformation, may be performed. In addition, by causing the spatial frequency amplitude analyzer 201 to store the spatial frequency component amplitude information that is measured when encoding the reference image, it is not necessary to recalculate the information related to the spatial frequency amplitude of the reference image. Specifically, the spatial frequency amplitude analyzer 201 stores the information related to the spatial frequency amplitude of the target image as the information related to the spatial frequency amplitude of the reference image for encoding the next image. It should be noted that the reproduced image stored in the frame memory 109 is used as the reference image, but the original image corresponding to the reference image (the image data itself, which is input without being encoded/decoded) may be used to calculate the spatial frequency amplitude of the original image.

The spatial frequency amplitude-related information generator 202 acquires the spatial frequencies of the target image, the spatial frequency amplitude of the target image, the spatial frequencies of the reference image, and the spatial frequency amplitude of the reference image from the spatial frequency amplitude analyzer 201, as described above. This spatial frequency amplitude-related information generator 202 calculates an amplitude ratio PR (f_cur) in accordance with the following equation (1) by using the input spatial frequency amplitudes of the target image and reference image, and then outputs the calculated amplitude ratio to the prediction signal generator 102 via a line L114. The amplitude ratio PR (f_cur) is calculated from the magnitude of the spatial frequency amplitude of each spatial frequency f_cur of the target image, the magnitude being expressed as P_cur, and from the magnitude of the spatial frequency amplitude of the spatial frequency f_ref corresponding to the reference image, the magnitude being expressed as P_ref, and is a function expressing the ratio when P_ref of each spatial frequency is 100 [%]. Also, P_ref is always set to 100 [%] with respect to a DC component in which the spatial frequency is zero.

$$PR(f\_cur)=100\times(P\_cur/P\_ref),$$
$$\text{provided that } PR(0)=100 \qquad (1)$$

In the second embodiment, the relative magnitude of the spatial frequency amplitude was used, but the difference between the amplitude of the spatial frequency amplitude of the target image, P_cur, and the magnitude of the spatial frequency amplitude of the reference image, P_ref, may be used. Also, another function that is obtained from the difference between P_cur and P_ref or from both P_cur and P_ref may be used. Moreover, in the second embodiment, the amplitude ratio PR (f_cur)=100 is set when the spatial frequency is 0, but PR (f_cur) may be calculated even when the spatial frequency is 0.

The amplitude adjustment coefficient storage unit 203 is a section for storing a conversion table for adjusting the amplitude ratio PR (f_cur) for each x [Hz] in each spatial frequency f_cur of the target image. For example, the amplitude adjustment coefficient storage unit 203 associates each of the adjustment parameters for changing the amplitude ratio PR (f_cur) to each y % of a ratio range of 0% through 100% and to each x [Hz] in each spatial frequency f_cur of the target image, and stores the adjustment parameters as the conversion table. FIG. 15 is a diagram showing the conversion table stored in the amplitude adjustment coefficient storage unit 203. As shown in FIG. 15, the vertical direction shows the amplitude ratio, while the horizontal direction shows the spatial frequency band ranges of the target image, and the adjustment parameters $\alpha 1$ through $\alpha 25$ are each assigned to the amplitude ratio and spatial frequency band.

The spatial frequency amplitude-related information generator 202 extracts the adjustment parameters, which are stored in the amplitude adjustment coefficient storage unit 203, via a line L203, multiplies the adjustment parameters by the amplitude ratio PR (f_cur) to thereby adjust the amplitude ratio, and obtains the amplitude adjustment coefficient R (f_cur). In the second embodiment, x=10 and y=5 are set. It should be noted that the values of x and y are not limited to the abovementioned values, and thus may be higher or lower values. Also, the upper limit of the ratio range was set to 100% in the second embodiment, but is not limited to this value. It should be noted that one conversion table is used in the second embodiment, but a hierarchical table may be used. Furthermore, it is desired that the section of each band be a range of spatial frequencies based on sensitivity of the human. Each combination of the adjustment parameters defined in association with the frequency band ranges and amplitude ratios defined in the conversion table, i.e., the information described in the conversion table, is transmitted to the moving image decoding device in units of blocks as information related to spatial frequency amplitude adjustment. The information related to spatial frequency amplitude adjustment may be transmitted to the moving image decoding device in units of frames. Also, the information related to spatial frequency amplitude adjustment may be transmitted to the moving image decoding device as one adjustment parameter for an entire frame.

The method of calculating the amplitude adjustment coefficient R (f_cur) is not limited to the abovementioned method, thus, for example, a matrix table for storing the amplitude adjustment coefficient for each frequency band of spatial frequencies and for each predetermined range of amplitude ratio may be provided, and the predetermined range of amplitude ratio and the frequency band thereof may be converted to the amplitude adjustment coefficient defined in the matrix table. Specifically, in the case in which β1 as the amplitude adjustment coefficient (12%, for example) is stored in the matrix table in association with a certain range of amplitude ratio, e.g., an amplitude ratio between 10% and 15% (13%, for example), and the frequency band thereof f1, the amplitude ratio 13% in which the frequency band is f1 is converted to the amplitude adjustment coefficient 12%.

In the second embodiment, the amplitude adjustment coefficient R (f_cur) corresponding to the spatial frequencies of the target image is set, but an amplitude adjustment coefficient based on a different matter other than the spatial frequencies may be set. For example, a numeric value concerning the human visual characteristics to a video may be used. Also, the amplitude adjustment coefficient may be calculated using the relationship of the information such as brightness information or color-difference information contained in a moving image to a quantization step.

Also, in the second embodiment, the amplitude adjustment coefficient R(f_cur) is calculated by the spatial frequencies of each moving image and the magnitude of the spatial frequency amplitude, but a previously defined amplitude adjustment coefficient R (f_cur) may be set. In this case, for example, a percentage change of the spatial frequency amplitude defined for each determined spatial frequency band range, or an element such as a scaling factor may be used. Moreover, in the second embodiment, the amplitude adjustment ratio is calculated based on the conversion table stored in the amplitude adjustment coefficient storage unit 203, but the amplitude ratio PR (f_cur) of each spatial frequency may be used directly.

In addition, the spatial frequency amplitude-related information generator 202 has an external input section 204 that accepts input information from the outside, and may generate the amplitude adjustment coefficient R (f_cur) by using the input information received from this external input means. In this case, it is desired that the spatial frequency amplitude-related information generator 202 calculate the amplitude adjustment coefficient on the basis of an external input of the adjustment parameter that is defined based on the measure for evaluation of the entire video. This external input section 204 is not an essential component, but is capable of generating the amplitude adjustment coefficient concerning the entire video by providing it in the moving image encoding device 130 of the second embodiment, whereby more efficient encoding can be performed. Also, in the external input section 204, a person may input an adjustment parameter, or an adjustment parameter that is generated based on the information evaluated by a previously set evaluation apparatus may be input.

Moreover, in the second embodiment, information related to the spatial frequencies of two frames was used. However, not only such information but also, for example, the spatial frequencies of all of the frames in a moving image, the average value, the maximum value, or the minimum value of the spatial frequencies may be used to perform the calculation.

Although the second embodiment shows the processing performed in units of blocks, the processing may be performed in units of frames. Moreover, in the second embodiment, contrast adjustment is performed by converting the spatial frequencies and adjusting the spatial frequency amplitude, but a contrast adjustment ratio may be calculated using a luminance value. In this case, for example, a variation of a luminance value of each block may be calculated to use the contrast adjustment ratio. Also, in the second embodiment, the spatial frequency amplitude is used, but other elements of spatial frequencies may be used.

The spatial frequency amplitude-related information generator 202 outputs the information related to the amplitude adjustment coefficient R (f_cur) to the entropy encoder 120 as the spatial frequency amplitude-related information. The entropy encoder 120 performs variable-length encoding on the input spatial frequency amplitude-related information, and outputs thus obtained information along with information on the motion vector and the like via the output terminal 121, as described above. At the same time, the spatial frequency amplitude-related information generator 202 transmits the spatial frequency amplitude-related information to the prediction signal generator 102 via the line L114, and saves the spatial frequency amplitude-related information in the prediction signal generator 102.

Returning to FIG. 13, explanation of the moving image encoding device 130 will be continued. The prediction signal generator 102 is a section that generates a prediction signal (also a block composed of 16×16 pixels) on the basis of a target block to be encoded, the target block being input via a line L101b. This prediction signal generator 102 operates so as to perform adjustment processing on the spatial frequency amplitude of the reference image extracted from the frame memory 109 on the basis of the information related to the spatial frequency amplitude for the target image analyzed by the spatial frequency analyzer 101, and generates a prediction signal for each block. The prediction signal generator 102 then outputs the generated prediction signals to the differential unit 103 via a line L112. The prediction signal generator 102 performs amplitude adjustment on the spatial frequencies of the reference image by means of an arithmetic expression shown in the following equation (2).

Spatial frequency amplitude of reference image after adjustment=Spatial frequency amplitude of reference image×Amplitude adjustment coefficient R(f_ref)/100 (2)

Also, the prediction signal generator 102 performs the adjustment processing on the spatial frequency amplitude of the reference image, and thereafter detects a motion of the moving image by using the block matching method on the basis of the adjusted reference image. The prediction signal generator 102 then calculates, as an optimal motion vector, the location that is for the target block and yields a reference block having the minimum error, and outputs the calculated motion vector to the entropy encoder 120.

The differential unit 103 subtracts the prediction signals from the target block that is output via a line L101, and generates a differential signal. The differential unit 103 outputs the generated differential signal to the converter 104.

The converter 104 performs discrete cosine transformation processing on the differential signal to thereby convert it into a signal of a frequency range, and outputs the signal to the quantizer 105 via a line L104, while the quantizer 105 quantizes the converted signal of a frequency range to obtain a quantization conversion coefficient of the signal of a frequency range, and outputs the quantization conversion coefficient to the entropy encoder 120 and inverse quantizer 106 via a line L105. The quantizer 105 adds up quantization information indicating the value of quantization in the quantization conversion coefficient, and outputs thus obtained result to the entropy encoder 120 and inverse quantizer 106.

The entropy encoder 120 inputs the quantization conversion coefficient, which is the signal of a frequency range quantized by the quantizer 105, via the line L105, inputs the spatial frequency amplitude-related information generated by the spatial frequency analyzer 101 via the line L114, and inputs the motion vector generated by the prediction signal generator 102 via a line L111.

Then, the entropy encoder 120 converts the quantization information, quantization conversion coefficient, motion vector, and spatial frequency amplitude-related information into variable length codes, and outputs the variable length codes to the outside via the output terminal 121. It should be noted that the entropy encoder 120 may perform the processing by means of arithmetic coding in place of variable length encoding.

The inverse quantizer 106 performs inverse quantization processing on the quantization conversion coefficient, and outputs thus obtained result to the inverter 107 via a line L106. The inverter 107 performs inverse discrete cosign transformation on the signal of a frequency range that is inversely quantized, to thereby convert it to a reproduced differential signal of a spatial range, and then outputs the reproduced differential signal to the adder 108 via a line L107.

The adder 108 adds a prediction signal transmitted from the prediction signal generator 102 via a line L102a, to the reproduced differential signal, and generates a reproduced image.

The frame memory 109 acquires the reproduced image generated by the adder 108, via a line L108, and stores the reproduced image as a reference image for use in encoding the next image. The spatial frequency analyzer 101 and the prediction signal generator 102 can take out the reference image stored in the frame memory 109, via lines L109 and L110 respectively.

The moving image encoding device 130 is configured as described above, whereby the difference of spatial frequency amplitude between the target image and the reference image can be adjusted to efficiently encode the moving image data.

It should be noted that the entropy encoder 120 of the moving image encoding device 130 performs encoding of the amplitude adjustment coefficient R (f_cur) as the encoding processing of the spatial frequency amplitude-related information, but the entropy encoder 120 may perform encoding by means of, for example, an encoding table in which combinations of adjustment coefficients PR (f_cur) are used. Also, the entropy encoder 120 may encode the difference of spatial frequency amplitude-related information between frames.

Moreover, in the second embodiment, although the processing is performed in units of blocks, when the processing is performed in units of frames, adjustment and the like of the image may be performed in units of frames, and then thus obtained result may be transmitted. In this case, encoding may be performed using an amplitude adjustment coefficient between frames. Also, a difference between frames may be used.

Figure 16:
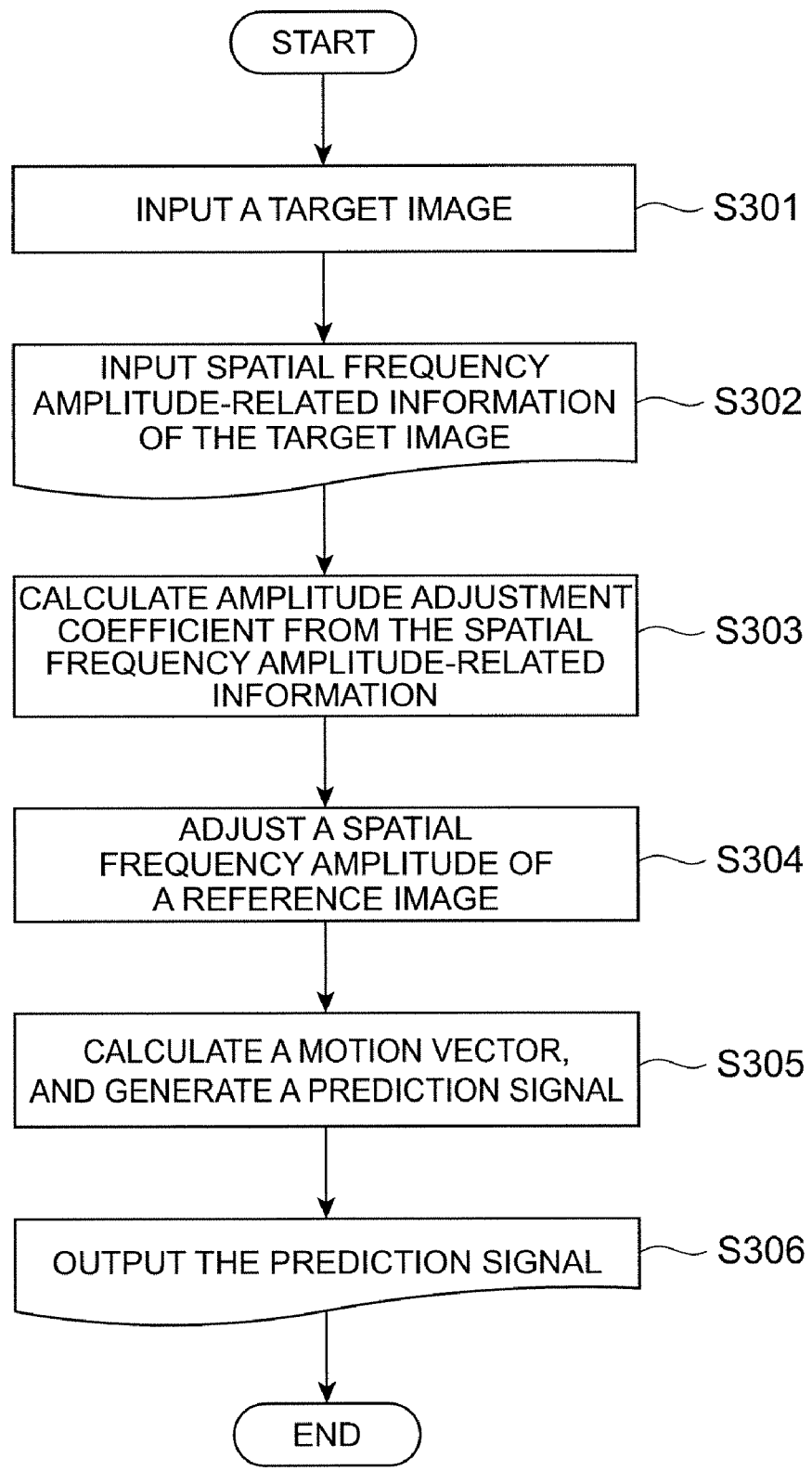
FIG. 16 is an operational flowchart showing processing performed by a prediction signal generator 102.

Next is described the processing of generating a prediction signal in the prediction signal generator 102. FIG. 16 is an operational flowchart showing the processing performed by the prediction signal generator 102. A target block of a target image and a reference image are input to the prediction signal generator 102 via the line L101b and line L108 (S301). Then, the prediction signal generator 102 performs correction processing on a spatial frequency amplitude of the reference image on the basis of the spatial frequency amplitude-related information of the target image. Specifically, the prediction signal generator 102 calculates, from the spatial frequency amplitude-related information of the target image, the amplitude adjustment coefficient by using a spatial frequency to be adjusted (S303). The calculated amplitude adjustment coefficient is saved in the prediction signal generator 102.

Next, the prediction signal generator 102 adjusts the spatial frequency amplitude of the reference image by using the calculated amplitude adjustment coefficient of the spatial frequency. Specifically, the prediction signal generator 102 multiplies the amplitude adjustment coefficient by the spatial frequency amplitude of the reference image according to the abovementioned equation (2) to calculate the spatial frequency amplitude of the reference image after adjustment (S304).

In the second embodiment, although the amplitude adjustment coefficient R (f_ref) is multiplied, adjustment may be performed by means of a calculation method using functions including predicted amplitude adjustment coefficients of a plurality of reference images that are obtained separately in terms of time. In addition, besides the multiplication method, any methods may be used as long as it is a method of adjusting the amplitude of the spatial frequency amplitude of the reference image by using the amplitude adjustment coefficient.

Further, when using a plurality of reference images, the prediction signal generator 102 can calculate relative amplitude ratio between amplitude adjustment coefficients of the reference images by saving the amplitude adjustment coefficients in the prediction signal generator 102. The prediction signal generator 102 can also adjust the spatial frequency amplitude appropriately and perform prediction, by adjusting the spatial frequencies of the reference images obtained separately in terms of time by means of the calculated relative amplitude ratio. Also, when using a plurality of reference images, the prediction signal generator 102 may take both an image obtained before amplitude adjustment and an image obtained after amplitude adjustment as candidates for prediction, and perform prediction. In this case, information for determining whether to perform adjustment may be used as the spatial frequency amplitude information to perform encoding.

By means of the above steps, the prediction signal generator 102 adjusts the spatial frequency amplitude of the reference image, and thereafter performs motion detection on the basis of this adjusted reference image. In the second embodiment, motion detection is performed using the block matching method as in the prior art, and a location that is for the target block and yields the reference block having the minimum error is taken as an optimal motion vector, to generate a prediction signal (S305). The prediction signal generator 102 outputs the generated prediction signal to the differential unit 103 and the adder 108 (S306).

It should be noted that although the second embodiment shows how the spatial frequency amplitude is processed in units of blocks, this processing may be performed in units of frames. In the case of performing the processing in units of blocks, the spatial frequency of each block may be obtained by means of Fourier transformation when calculating a standard for performing motion detection, and a prediction signal may be determined while adjusting the spatial frequency amplitude. Also, in the case of performing the processing in units of frames, Fourier transformation may be performed on all of the frames of the reference image, the spatial frequencies may be obtained to adjust the spatial frequency amplitude, and thereafter a prediction signal may be determined. Moreover, the spatial frequency amplitude may be adjusted after performing Fourier transformation, and a motion vector may be calculated in the region for Fourier transformation when performing motion detection. In addition, for the frequency conversion, not only Fourier transformation, but also other frequency conversion, such as discrete cosine transformation or discrete wavelet transformation, may be performed. It is desired to perform frequency conversion used in adjustment of the spatial frequency amplitude.

Figure 17:
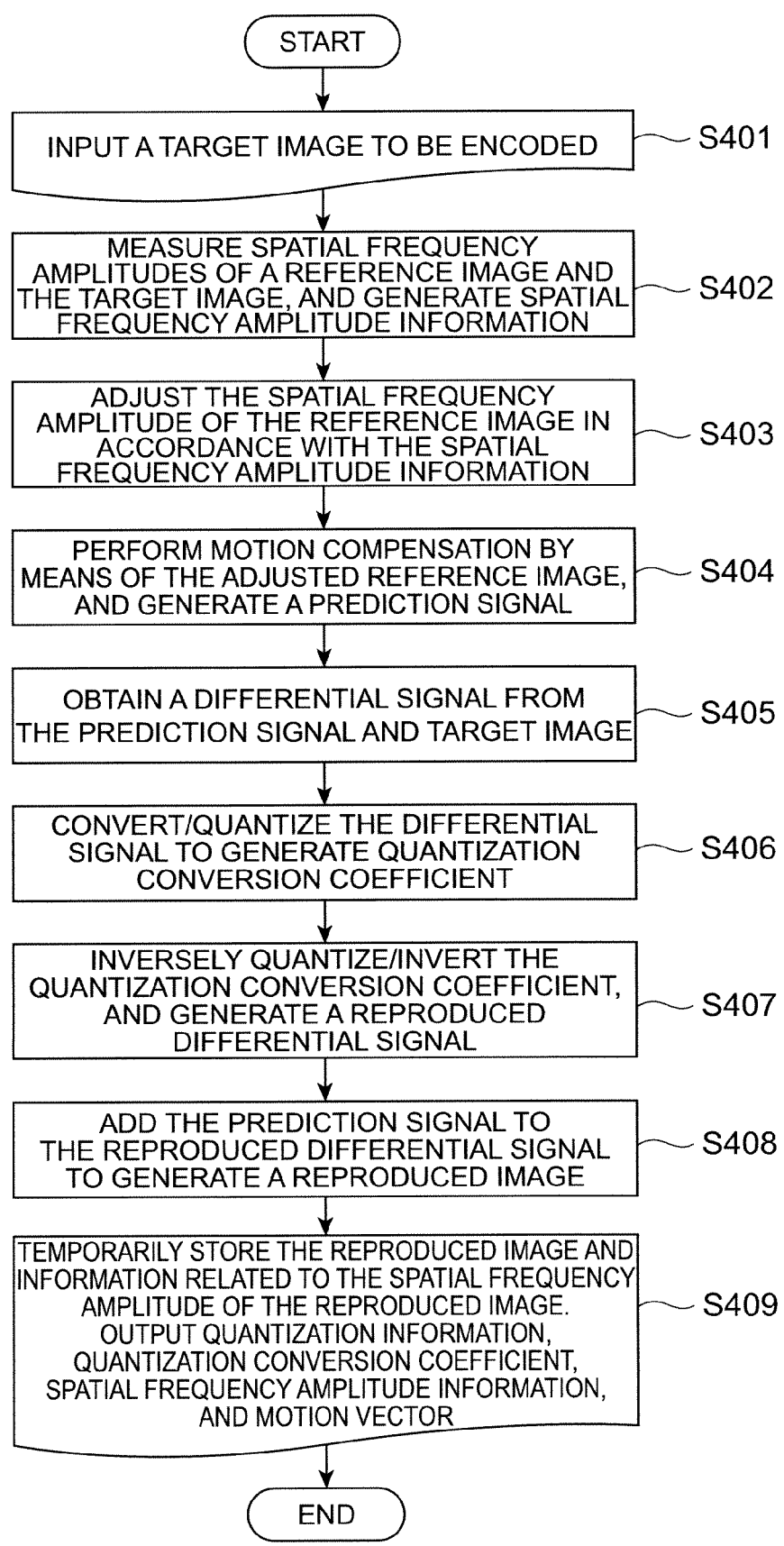
FIG. 17 is a flowchart showing the operation of the moving image encoding device 130.

Next, the operation of the moving image coding device 130 of the second embodiment is described. FIG. 17 is a flowchart showing the operation of the moving image encoding device 130. First, a target image to be encoded is input via the input terminal 100 (S401). In the spatial frequency analyzer 101, the spatial frequency amplitude of the target image and the spatial frequency amplitude of a reference image are calculated, and the spatial frequency amplitude-related information (adjusted) of the target image is generated (S402). The methods of calculating and adjusting the spatial frequency amplitude are as described above. It should be noted in the second embodiment that the data related to the spatial frequency amplitude is obtained for each block, but the data related to the spatial frequency amplitude may be obtained for each frame.

Next, in the prediction signal generator 102, the spatial frequency amplitude of the reference image is adjusted based on the spatial frequency amplitude information of the target image (S403). Motion compensation is performed using the reference image whose spatial frequency amplitude is adjusted, and a prediction signal is generated as an optimal motion vector (S404). The prediction signal obtained in this manner is subtracted from the target image, whereby a differential signal is calculated (S405). The differential signal is converted by means of discrete cosine transformation and quantized, whereby a quantization conversion coefficient is generated (S406).

Moreover, the quantization conversion coefficient is inversely quantized and then inverted, whereby a reproduced differential signal is generated (S407). The prediction signal is added to the reproduced differential signal thus generated, whereby a reproduced image is generated (S408). Then, the reproduced image and the spatial frequency amplitude-related information are temporarily stored in the frame memory 109, and at the same time the data containing the quantization conversion coefficient, quantization information, spatial frequency amplitude-related information, and motion vector is subjected to entropy encoding by the entropy encoder 120 and then output via the output terminal 121 (S409).

It should be noted that the second embodiment is not limited to a configuration in which a certain image is expressed by one spatial frequency amplitude datum and one spatial-frequency-amplitude-related datum is output for one or a plurality of images. The spatial frequency amplitude-related information may be encoded in units of blocks obtained by dividing the image.

Figure 18:
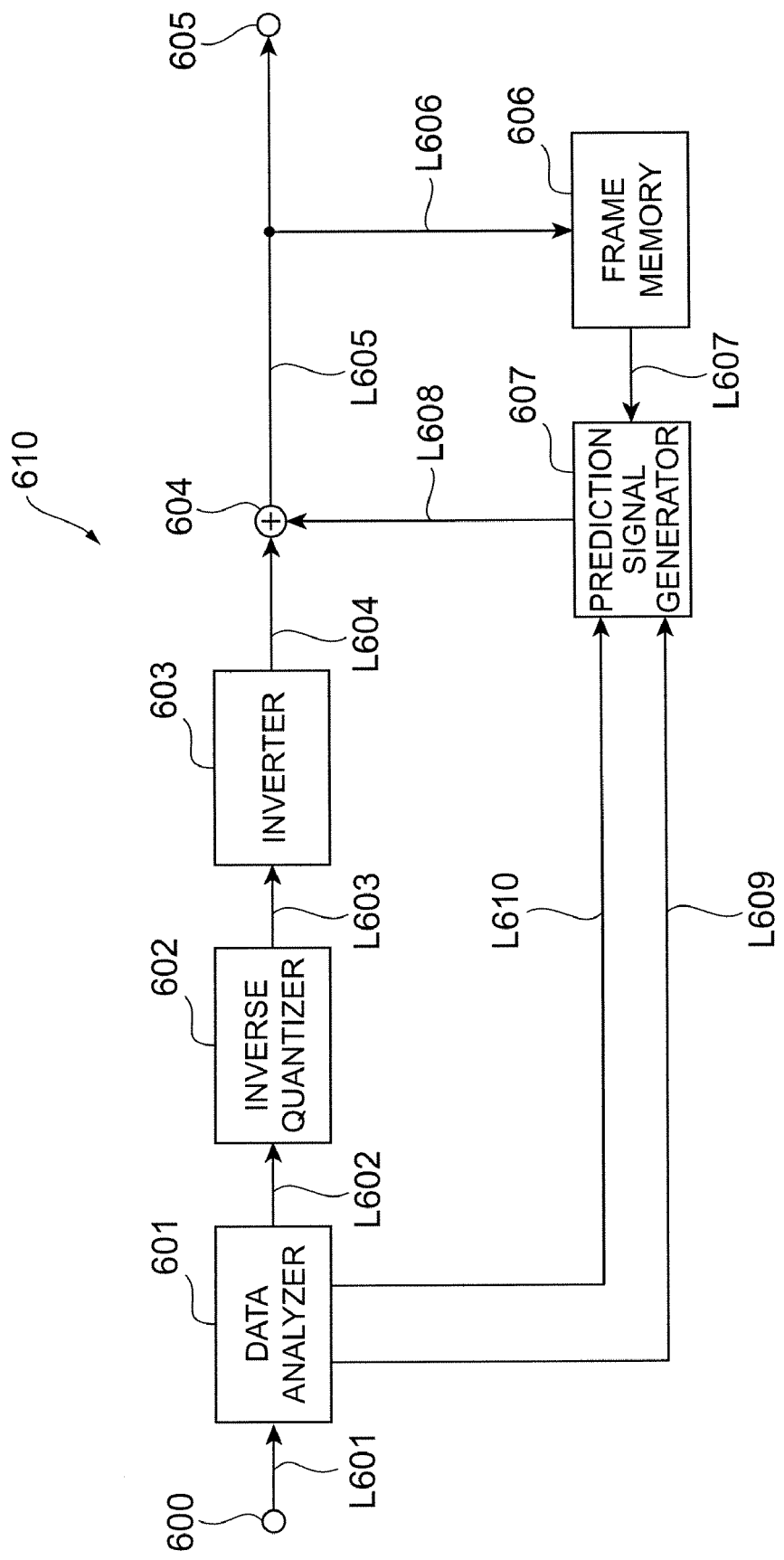
FIG. 18 is a block diagram of a moving image decoding device 610 of a second embodiment.

Next is described the moving image decoding device 610 that receives and decodes the moving image encoded by the moving image encoding device 130 of the second embodiment. FIG. 18 is a block diagram of the moving image decoding device 610 of the second embodiment. This moving image decoding device 610 is constituted by an input terminal 600 (input means), a data analyzer 601 (extraction means), an inverse quantizer 602 (decoding means), an inverter 603 (decoding means), an adder 604 (adding means), a frame memory 606, a prediction signal generator 607 (prediction signal generating means), and an output terminal 605 (output means). Each of these components is described hereinafter.

The input terminal 600 is a terminal that inputs compressed data containing a quantization conversion coefficient that is an encoded differential signal obtained by predictively encoding a moving image, quantization information indicating the value of quantization, data on a motion vector, and the spatial frequency amplitude-related information. In the second embodiment, the data that is obtained in processing performed by the moving image encoding device 130 shown in FIG. 13 is input to the moving image decoding device 610.

The data analyzer 601 is a section that analyzes the compressed data, performs entropy decoding processing, and extracts the quantized quantization conversion coefficient, the quantization information indicating the value of quantization, the motion vector related to generation of a prediction signal, and the spatial frequency amplitude-related information related to a target image to be decoded. This data analyzer 601 outputs the quantized conversion coefficient and the quantization information indicating the value of quantization to the inverse quantizer 602 via a line L602. Also, the data analyzer 601 outputs the motion vector and the spatial frequency amplitude-related information to the prediction signal generator 607 via a line L609 and a line L610 respectively.

The inverse quantizer 602 is a section that inversely quantizes the quantized quantization conversion coefficient to thereby generate a conversion coefficient, on the basis of the quantization information indicating the value of quantization. The inverse quantizer 602 outputs the conversion coefficient to the inverter 603 via a line L603. The inverter 603 is a section that converts the conversion coefficient, which is inversely quantized by the inverse quantizer 602, by performing inverse discrete cosine transformation and generates a reproduced differential signal. The inverter 603 outputs the generated reproduced differential signal to the adder 604 via a line L604.

The adder 604 is a section that adds up the reproduced differential signal and a prediction signal and outputs thus obtained result simultaneously to the output terminal 605 via a line L605 and to the frame memory 606 via a line L606 as a reproduced image.

The prediction signal generator 607 is a section that generates a prediction signal from the reproduced image stored in the frame memory 606, on the basis of the motion vector and the spatial frequency amplitude-related information. The prediction signal generator 607 outputs the generated prediction signal to the adder 604. It should be noted that the prediction signal generator 607 receives the adjusted spatial frequency amplitude-related information and an adjustment parameter from the moving image encoding device 130 as the spatial frequency amplitude-related information, and generates a prediction signal by using spatial frequency-related information (amplitude adjustment coefficient R (f_ref)) based on the adjustment parameter.

The frame memory 606 is a section that stores the reproduced image that is output from the adder 604. The prediction signal generator 607 can take out the reproduced image stored in the frame memory 606.

Figure 19:
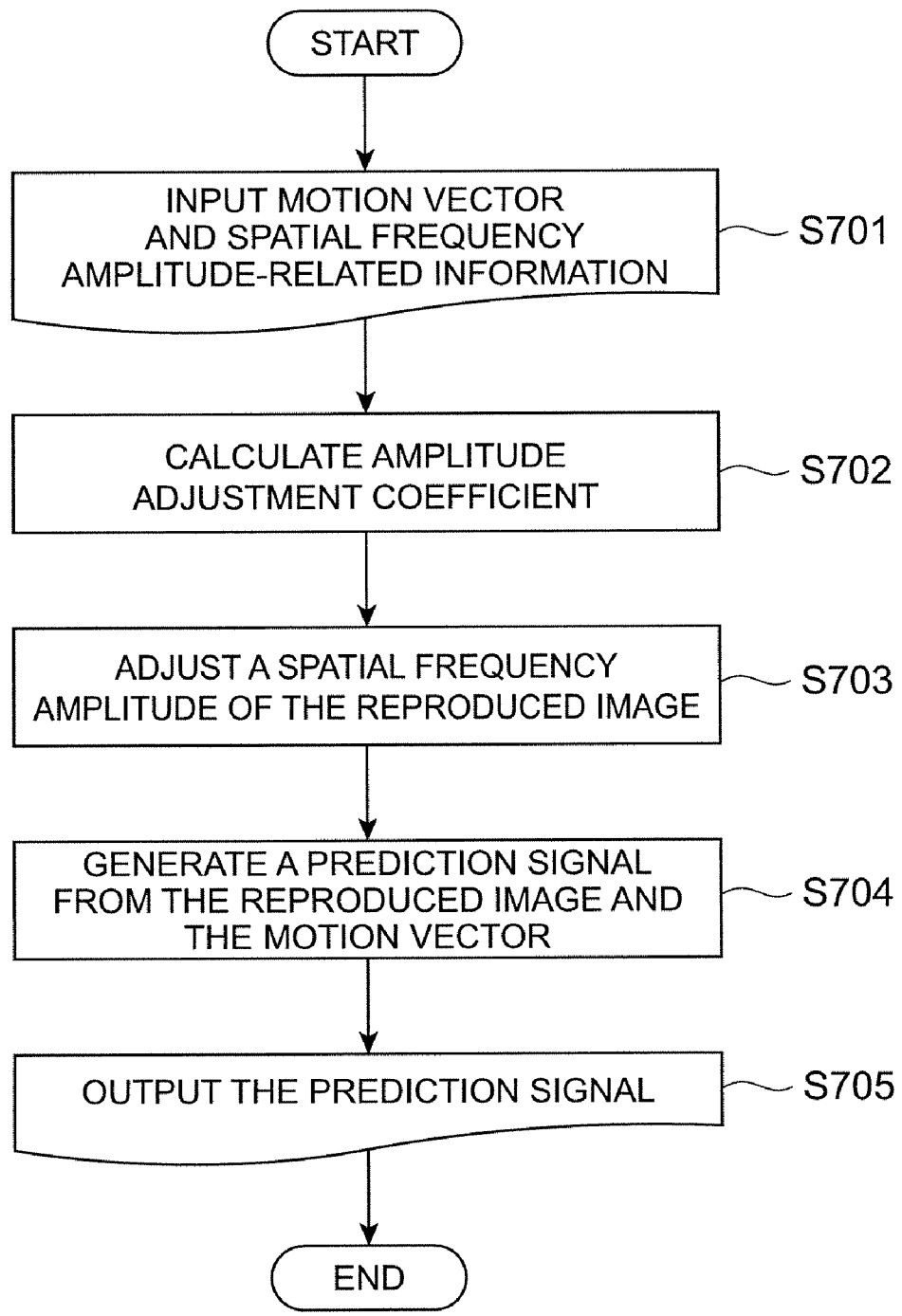
FIG. 19 is a flowchart showing the operation of a prediction signal generator 607.

Next is described prediction signal generation processing that is performed by the prediction signal generator 607. FIG. 19 is a flowchart showing the operation of the prediction signal generator 607. The prediction signal generator 607 inputs the spatial frequency amplitude-related information, which is output from the data analyzer 601, and a motion vector of each target block to be decoded (S701). In the second embodiment, the spatial frequency amplitude-related information contains information related to the spatial frequency amplitude of a target image to be decoded.

Next, the prediction signal generator 607 calculates the amplitude adjustment coefficient of the spatial frequency on the basis of the spatial frequency amplitude-related information of the target image (S702). The prediction signal generator 607 then multiplies the calculated amplitude adjustment coefficient by the spatial frequency of the reproduced image stored in the frame memory 606, and adjusts the spatial frequency amplitude of the reproduced image (S703). The prediction signal generator 607 generates a prediction signal on the basis of the reproduced image whose spatial frequency amplitude is adjusted, and on the basis of a motion vector (S704). The prediction signal generator 607 outputs thus generated prediction signal to the adder 604 (S705).

It should be noted that in the second embodiment the spatial frequency amplitude of the reproduced image is adjusted, and thereafter a prediction signal is generated, but a prediction signal may be generated while performing the adjustment.

Figure 20:
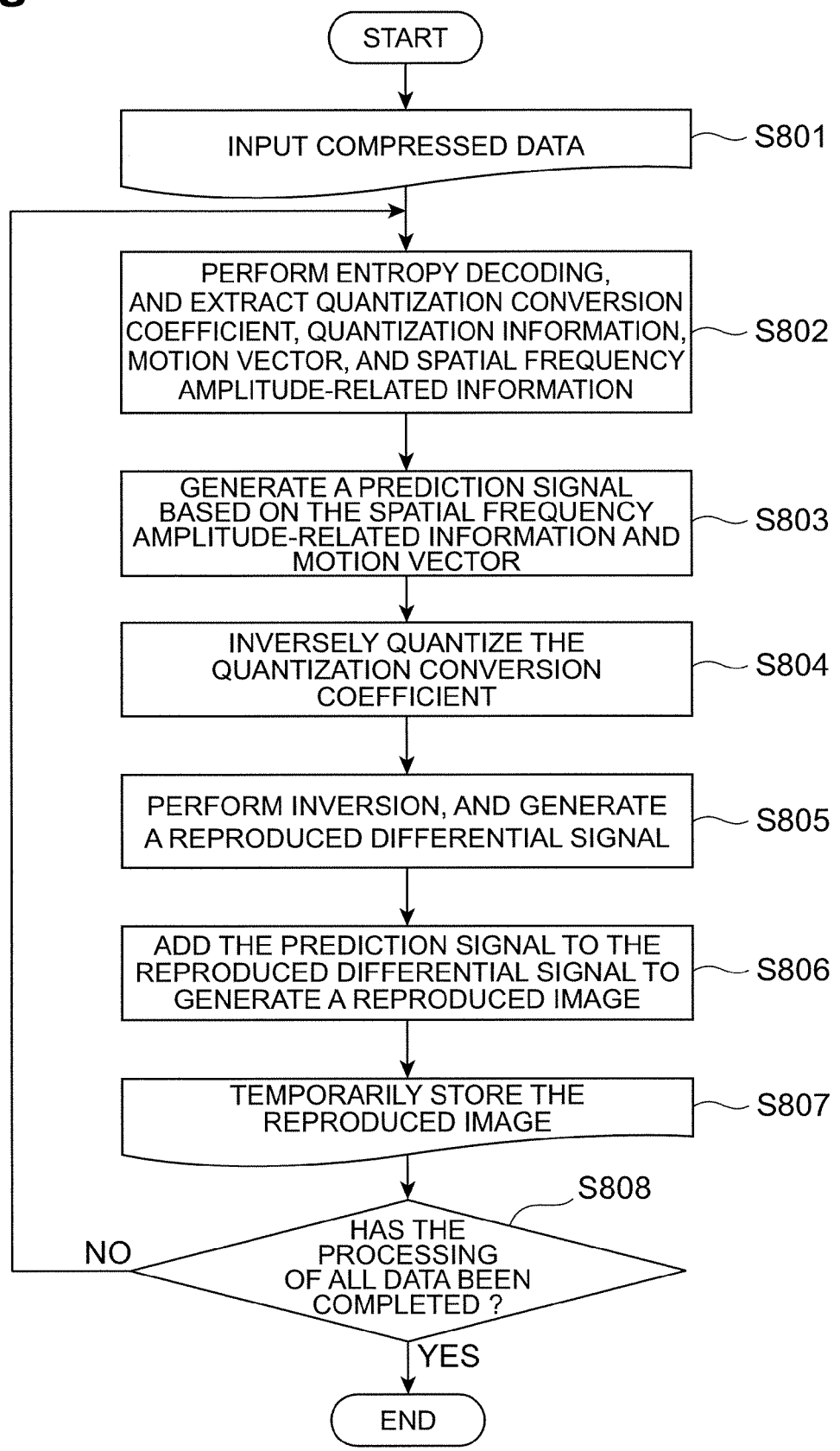
FIG. 20 is a flowchart showing the operation of the moving image decoding device 610.

Next, the operation of the moving image decoding device 610 of the second embodiment is described. FIG. 20 is a flowchart showing the operation of the moving image decoding device 610. Compressed data containing a quantization conversion coefficient that is a decoded differential signal, quantization information, data related to a motion vector, and spatial frequency amplitude-related information are input to the data analyzer 601 (S801). The data analyzer 601 performs entropy decoding processing, and extracts the quantized quantization conversion coefficient, the quantization information indicating the value of quantization, the motion vector related to generation of a prediction signal, and the spatial frequency amplitude-related information related to a target image to be decoded (S802). The prediction signal generator 607 generates a prediction signal on the basis of the motion vector and spatial frequency amplitude-related information that are extracted by the data analyzer 601 (S803). The detail of this configuration is as described using FIG. 19.

Next, the inverse quantizer 602 inversely quantizes the conversion coefficient quantized by the moving image encoding device 130, and generates an inversely quantized conversion coefficient (S804). The inversely quantized conversion coefficient is subjected to inverse discrete cosine transformation processing by the inverter 603, whereby a reproduced differential signal is generated (S805). The adder 604 adds up thus generated reproduced differential signal and the prediction signal generated in S803, whereby a reproduced image is generated (S806). The generated reproduced image is temporarily stored in the frame memory 606 as a reference image for use in decoding the next image (S807). This processing is repeated until decoding of all data is completed (S808).

It should be noted that the second embodiment is not limited to a configuration in which a certain image is expressed by one spatial frequency amplitude datum and one spatial frequency amplitude-related datum is received for one or a plurality of images. The spatial frequency amplitude-related information may be received in units of blocks obtained by dividing the image. In this case, a prediction signal is generated on the basis of the spatial frequency amplitude-related information of each block.

Figure 21:
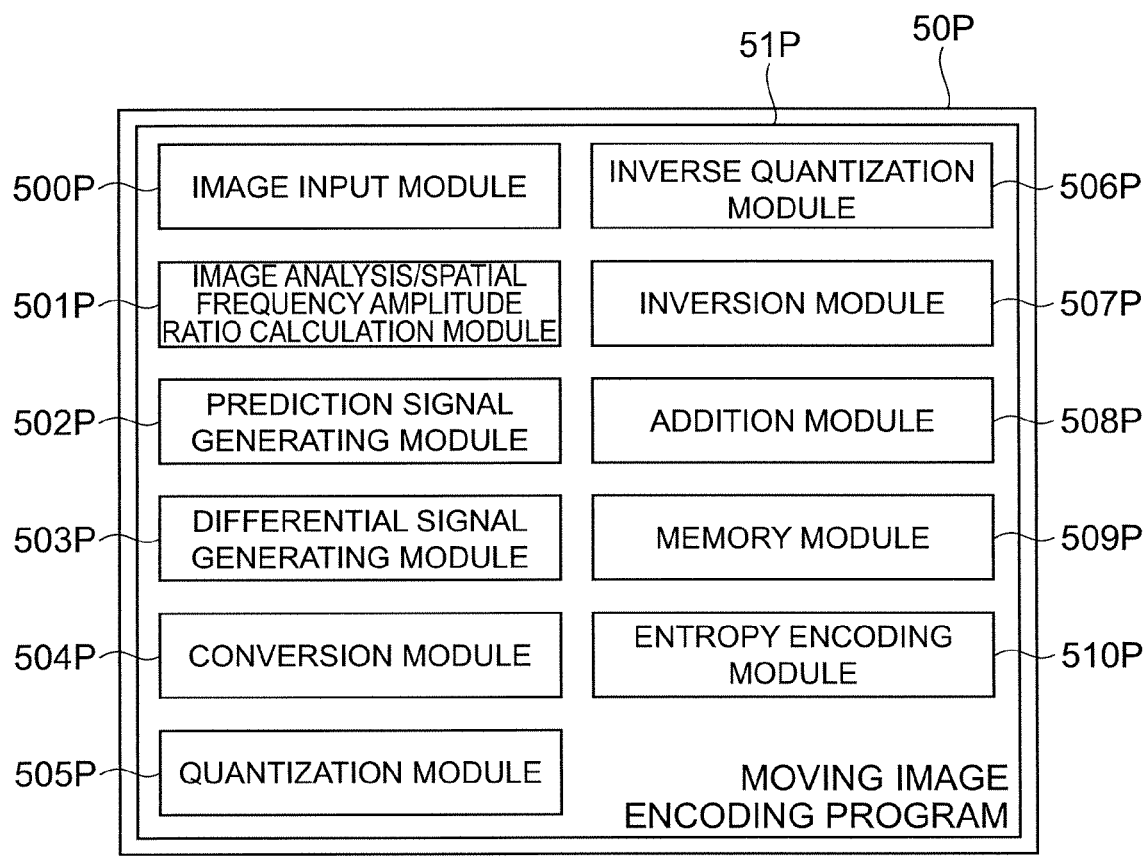
FIG. 21 is a diagram showing a configuration of a moving image encoding program 51P of the second embodiment along with a recording medium 50P.

Next is describe a moving image encoding program for causing a computer to operate as the moving image encoding device 130 of the second embodiment. FIG. 21 is a diagram showing a configuration of a moving image encoding program 51 of the second embodiment along with a recording medium 50P. Examples of the recording medium 50P include recording media such as a Floppy Disk™, CD-ROM, DVD and ROM, a semiconductor memory, and the like. A computer can be operated as the moving image encoding device 130 of the second embodiment by the moving image encoding program 51P.

As shown in FIG. 21, the moving image encoding program 51P has an image input module 500P, an image analysis/spatial frequency amplitude ratio calculation module 501P, a prediction signal generating module 502P, a differential signal generating module 503P, a conversion module 504P, a quantization module 505P, an inverse quantization module 506P, an inversion module 507P, an addition module 508P, a memory module 509P, and an entropy encoding module 510P.

In relation to the association with the moving image encoding device 130 shown in FIG. 13, the input terminal 100 corresponds to the image input module 500P, the spatial frequency analyzer 101 to the image analysis/spatial frequency amplitude ratio calculation module 501P, the prediction signal generator 102 to the prediction signal generating module 502P, the differential unit 103 to the differential signal generating module 503P, the converter 104 to the conversion module 504P, the quantizer 105 to the quantization module 505P, the inverse quantizer 106 to the inverse quantization module 506P, the inverter 107 to the inversion module 507P, the adder 108 to the addition module 508P, the frame memory 109 to the memory module 509P, and the entropy encoder 120 to the entropy encoding module 510P, and these components are caused to collaborate with a computer system described hereinafter, whereby the same processing as the abovementioned encoding processing is executed.

Figure 22:
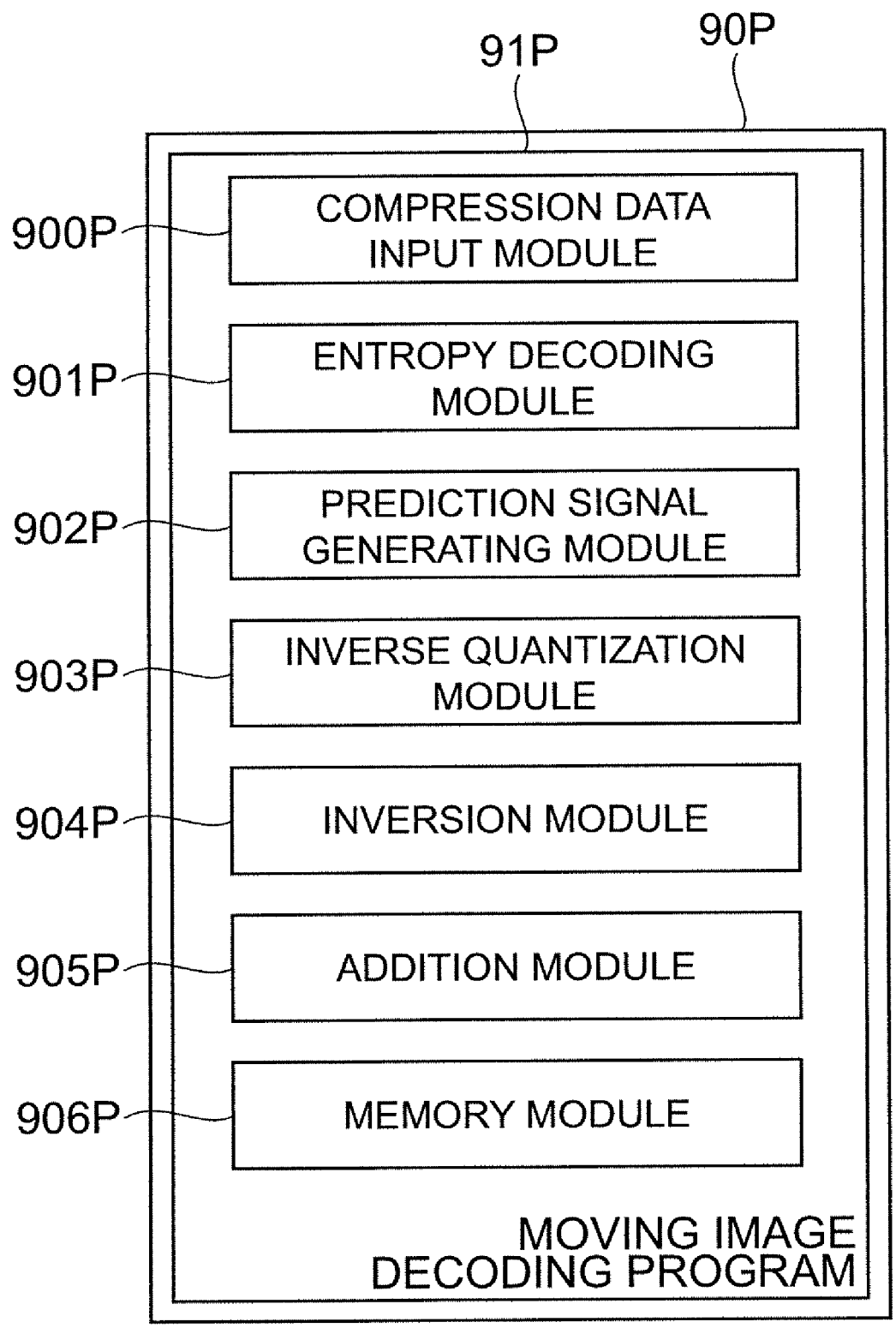
FIG. 22 is a diagram showing a configuration of a moving image decoding program 91P of the second embodiment along with a recording medium 90P.

Next is described the moving image decoding program 91P for causing a computer to operate as the moving image decoding device 610 of the second embodiment. FIG. 22 is a diagram showing a configuration of the moving image decoding program 91P of the second embodiment along with a recording medium 90P. A computer can be operated as the moving image decoding device 610 of the second embodiment by the moving image decoding program 91P.

As shown in FIG. 22, the moving image decoding program 91P has a compressed data input module 900P, an entropy decoding module 901P, a prediction signal generating module 902P, an inverse quantization module 903P, an inversion module 904P, an addition module 905P, and a memory module 906P.

In relation to the association with the moving image decoding device 610 shown in FIG. 18, the input terminal 600 corresponds to the compressed data input module 900P, the data analyzer 601 to the entropy decoding module 901P, the prediction signal generator 607 to the prediction signal generating module 902P, the inverse quantizer 602 to the inverse quantization module 903P, the inverter 603 to the inverse quantization conversion module 904P, the adder 604 to the addition module 905P, and the frame memory 606 to the memory module 906P, and these components are caused to collaborate with a computer system described hereinafter, whereby the same processing as the abovementioned decoding processing is executed.

As shown in FIG. 11, the computer 30 has the reading device 31 such as a floppy disk drive device, a CD-ROM drive device and a DVD drive device, the work memory (RAM) 32 in which the operating system resides, the memory 33 for storing the programs stored in recording media, the display 34, the mouse 35 and keyboard 36 that serve as input devices, the communication device 37 for performing data transmission/reception, and the CPU 38 that entirely controls execution of the programs. Once the recording medium is inserted into the reading device 31, the computer 30 can access the moving image encoding program 51P or moving image decoding program 91P stored in the recording medium from the reading device 31, and can be operated as the moving image encoding device 130 or moving image decoding device 610 of the second embodiment by the moving image encoding program 51P or moving image decoding program 91P.

As shown in FIG. 11, the moving image encoding program 51P or moving image decoding program 91P may be provided, via a network, as a computer data signal 40 that is superimposed on a carrier wave. In this case, the computer 30 can store, in the memory 33, the moving image encoding program 51P or moving image decoding program 91P received by the communication device 37, and execute the moving image encoding program 51P or moving image decoding program 91P.

Next, the operational effects of the abovementioned moving image encoding device 130 and moving image decoding device 610 are described.

The moving image encoding device 130 inputs a target image to be encoded, via the input terminal 100, from among a plurality of images configuring a moving image. On the other hand, the frame memory 109 stores a reference image that is used for generating a prediction signal for the target image input via the input terminal 100. Then, the spatial frequency analyzer 101 generates the spatial frequency amplitude-related information for adjusting the difference between the amplitude of a spatial frequency component of the input target image and the amplitude of a spatial frequency component of the reference image stored in the frame memory 109, on the basis of the amplitude of the spatial frequency component of the target image and the amplitude of the spatial frequency component of the reference image, the information being, for example, information containing the amplitude ratio.

The amplitude of the spatial frequency component of the reference image is adjusted based on the spatial frequency amplitude-related information generated by the spatial frequency analyzer 101, and the prediction signal generator 102 generates a prediction signal for the target image on the basis of the adjusted reference image. The differential unit 103 generates a differential signal on the basis of the difference between the input target image and the generated prediction signal. The converter 104 and quantizer 105 each encode the generated differential signal and generate an encoded differential signal. On the other hand, the inverse quantizer 106 and the inverter 107 each decode the generated encoded differential signal and generate a decoded differential signal.

The adder 108 adds up the decoded differential signals and the prediction signal to generate a reproduced image, and stores the reproduced image in the frame memory 109 as the reference image. On the other hand, the entropy encoder 120 performs entropy encoding on the encoded differential signal and the spatial frequency amplitude-related information, and outputs thus obtained results.

Accordingly, the spatial frequency amplitude of the target image becomes nearly equal to the spatial frequency amplitude of the prediction signal of the target image, and excess and deficiency of spatial frequency components of the reference image do not influence the prediction signal, thus compression can be performed efficiently.

Also, the moving image encoding device 130 has, in the spatial frequency analyzer 101, the external input section 204 that can externally input information that is required for generating the spatial frequency amplitude-related information, so as to be able to generate the spatial frequency amplitude-related information on the basis of the input information. Therefore, the adjustment parameter that is defined based on the measure for evaluation of the entire video can be input externally, thus an amplitude adjustment coefficient based on the entire video can be generated and more efficient encoding can be performed.

Moreover, the moving image encoding device 130 causes the amplitude adjustment coefficient storage unit 203 to store the adjustment parameter defined according to the spatial frequency components, and can adjust the spatial frequency amplitude-related information on the basis of the stored adjustment parameter so as to be able to perform more efficient encoding.

In addition, the moving image decoding device 610 stores the reproduced image for use in decoding, in the frame memory 606 in advance. Then, the moving image decoding device 610 inputs the encoded differential signal, which is obtained by predictively encoding the moving image, and encoded data, which has the spatial frequency amplitude-related information of the images, via the input terminal 600. The data analyzer 601 extracts the spatial frequency amplitude-related information and the encoded differential signal from the input encoded data, while the prediction signal generator 607 adjusts the amplitude of the reproduced image stored in the storage means, on the basis of the spatial frequency amplitude-related information that is extracted by the data analyzer 601, and generates a prediction signal.

Furthermore, the inverse quantizer 602 and the inverter 603 each decode the extracted encoded differential signal to generate a decoded differential signal, and the adder 604 adds up the prediction signal and the decoded differential signals to generate a reproduced image. The generated reproduced image is output to the output terminal 605 and then stored in the frame memory 606.

Accordingly, the spatial frequency amplitude of the target image becomes nearly equal to the spatial frequency amplitude of the prediction signal, and the encoded data that is compressed efficiently can be decoded.

Moreover, the moving image decoding device 610 can generate a prediction signal on the basis of the spatial frequency amplitude-related information adjusted by the abovementioned moving image encoding device 130 and the adjustment parameter, and can decode the data that is encoded efficiently.

In the first embodiment and the second embodiment described above, bands or amplitudes of spatial frequency components are used as the frequency characteristics, but no limitation is intended thereto. Specifically, the parameters representing electrical power, contrast, or other frequency characteristics may be used, or the information for adjusting a band ratio or the amplitude of a spatial frequency component, the information for adjusting the frequency characteristics of the target image and reference image, and the information for adjusting the frequency characteristics in which, for example, electric power or contrast is used may be used.

The invention claimed is:

1. A moving image decoding method, comprising:
 inputting compressed data that contains an encoded differential signal obtained by predictively encoding a moving image and frequency characteristic-related information;
 decoding the encoded differential signal to generate a decoded differential signal;
 generating a prediction signal for the decoded differential signal;
 adding the prediction signal to the decoded differential signal to generate a reproduced image; and
 storing in a storage unit a reference image that is used for generating the prediction signal, wherein
 the frequency characteristic-related information represents information indicating a correlation between a frequency characteristic of the reproduced image and a frequency characteristic of the reference image, and
 in the prediction signal generating the prediction signal is generated such that the signal matches a frequency characteristic of a target image to be decoded, from the reference image, on the basis of the frequency characteristic-related information; and storing frequency characteristic information that is measured when decoding the reference image, wherein the prediction signal generating generates the prediction signal on the basis of the stored frequency characteristic information and the frequency characteristic of the reproduced image.

2. A moving image encoding device, comprising:
an input unit that inputs a target image to be encoded, from among a plurality of images configuring a moving image;
a storage unit that stores a reference image that is used for generating a prediction signal for the target image;
a frequency characteristic analyzing unit that measures a frequency characteristic of the target image and a frequency characteristic of the reference image, and that generates frequency characteristic-related information that represents information indicating a correlation between the frequency characteristic of the target image and the frequency characteristic of the reference image;
a prediction signal generating unit that generates the prediction signal such that the signal matches the frequency characteristic of the target image, from the reference image, on the basis of the frequency characteristic-related information;
a difference unit that obtains a difference between the target image and the prediction signal to generate a differential signal;
an encoding unit that encodes the differential signal to generate an encoded differential signal;
a decoding unit that decodes the encoded differential signal to generate a decoded differential signal;
an adding unit that adds the prediction signal to the decoded differential signal to generate a reproduced image, the adding unit being connected, at the post-stage thereof, to the storage unit storing the reproduced image; and
an output unit that outputs at least the encoded differential signal and the frequency characteristic-related information, wherein
the prediction signal generating unit derives a method of generating a prediction signal corresponding to the frequency characteristic-related information, to generate the prediction signal from the reference image, and the frequency characteristic-related information contains information on the method of generating the prediction signal.

3. A moving image encoding device, comprising:
an input unit that inputs a target image to be encoded, from among a plurality of images configuring a moving image;
a storage unit that stores a reference image that is used for generating a prediction signal for the target image;
a frequency characteristic analyzing unit that measures a frequency characteristic of the target image and a frequency characteristic of the reference image, and that generates frequency characteristic-related information that represents information indicating a correlation between the frequency characteristic of the target image and the frequency characteristic of the reference image;
a prediction signal generating unit that generates the prediction signal such that the signal matches the frequency characteristic of the target image, from the reference image, on the basis of the frequency characteristic-related information;
a difference unit that obtains a difference between the target image and the prediction signal to generate a differential signal;
an encoding unit that encodes the differential signal to generate an encoded differential signal;
a decoding unit that decodes the encoded differential signal to generate a decoded differential signal;
an adding unit that adds the prediction signal to the decoded differential signal to generate a reproduced image, the adding unit being connected, at the post-stage thereof, to the storage unit storing the reproduced image; and
an output unit that outputs at least the encoded differential signal and the frequency characteristic-related information, wherein
the prediction signal generating unit selects, from at least two types of prediction signal generation methods, a method of generating a prediction signal corresponding to the frequency characteristic-related information, to generate the prediction signal from the reference image, and the frequency characteristic-related information contains information on the method of generating the prediction signal.

4. A moving image encoding device, comprising:
an input unit that inputs a target image to be encoded, from among a plurality of images configuring a moving image;
a storage unit that stores a reference image that is used for generating a prediction signal for the target image;
a frequency characteristic analyzing unit that measures a frequency characteristic of the target image and a frequency characteristic of the reference image, and that generates frequency characteristic-related information that represents information indicating a correlation between the frequency characteristic of the target image and the frequency characteristic of the reference image;
a prediction signal generating unit that generates the prediction signal such that the signal matches the frequency characteristic of the target image, from the reference image, on the basis of the frequency characteristic-related information;
a difference unit that obtains a difference between the target image and the prediction signal to generate a differential signal;
an encoding unit that encodes the differential signal to generate an encoded differential signal;
a decoding unit that decodes the encoded differential signal to generate a decoded differential signal;
an adding unit that adds the prediction signal to the decoded differential signal to generate a reproduced image, the adding unit being connected, at the post-stage thereof, to the storage unit storing the reproduced image; and
an output unit that outputs at least the encoded differential signal and the frequency characteristic-related information; and
a memory that stores frequency characteristic information that is measured when processing the reference image as the target image, instead of when measuring the frequency characteristic of the reference image, wherein the prediction signal is generated based on the frequency characteristic of the target image and the frequency characteristic information stored in the memory.

5. A non-transitory computer-readable medium including a moving image decoding program for causing a computer to execute:
input processing of inputting compressed data that contains an encoded differential signal obtained by predictively encoding a moving image and frequency characteristic-related information;

decoding processing of decoding the encoded differential signal to generate a decoded differential signal;
prediction signal generation processing of generating a prediction signal for the decoded differential signal;
adding processing of adding the prediction signal to the decoded differential signal to generate a reproduced image;
storage processing of storing in a storage unit a reference image that is used for generating the prediction signal, wherein
the frequency characteristic-related information represents information indicating a correlation between a frequency characteristic of the reproduced image and a frequency characteristic of the reference image, and
in the prediction signal generation processing the prediction signal is generated such that the signal matches a frequency characteristic oaf a target image to be decoded, from the reference image, on the basis of the frequency characteristic-related information; and
storing frequency characteristic information that is measured when decoding the reference image, wherein the prediction signal generation processing generates the prediction signal on the basis of the stored frequency characteristic information and the frequency characteristic of the reproduced image.

6. A moving image decoding device, comprising:
an input unit that inputs compressed data that contains an encoded differential signal obtained by predictively encoding a moving image and frequency characteristic-related information;
a decoding unit that decodes the encoded differential signal to generate a decoded differential signal;
a prediction signal generating unit that generates a prediction signal for the decoded differential signal;
an adding unit that adds the prediction signal to the decoded differential signal to generate a reproduced image; and
a storage unit that stores a reference image that is used for generating the prediction signal, wherein
the frequency characteristic-related information represents information indicating a correlation between a frequency characteristic of the reproduced image and a frequency characteristic of the reference image,
the prediction signal generating unit generates the prediction signal such that the signal matches a frequency characteristic of a target image to be decoded, from the reference image, on the basis of the frequency characteristic-related information, and
the frequency characteristic-related information contains prediction signal generation-related information that is related to a method of generating the prediction signal, and the prediction signal generating unit generates the prediction signal from the reference image, on the basis of the prediction signal generation-related information.

7. A moving image decoding device, comprising:
an input unit that inputs compressed data that contains an encoded differential signal obtained by predictively encoding a moving image and frequency characteristic-related information;
a decoding unit that decodes the encoded differential signal to generate a decoded differential signal;
a prediction signal generating unit that generates a prediction signal for the decoded differential signal;
an adding unit that adds the prediction signal to the decoded differential signal to generate a reproduced image; and
a storage unit that stores a reference image that is used for generating the prediction signal, wherein
the frequency characteristic-related information represents information indicating a correlation between a frequency characteristic of the reproduced image and a frequency characteristic of the reference image,
the prediction signal generating unit generates the prediction signal such that the signal matches a frequency characteristic of a target image to be decoded, from the reference image, on the basis of the frequency characteristic-related information, and
the frequency characteristic-related information contains prediction signal generation-related information that is related to a method of generating the prediction signal, and the prediction signal generating unit selects, from at least two types of prediction signal generation methods, a method of generating the prediction signal, on the basis of the prediction signal generation-related information, and generates the prediction signal from the reference image.

8. A moving image decoding device, comprising:
an input unit that inputs compressed data that contains an encoded differential signal obtained by predictively encoding a moving image and frequency characteristic-related information;
a decoding unit that decodes the encoded differential signal to generate a decoded differential signal;
a prediction signal generating unit that generates a prediction signal for the decoded differential signal;
an adding unit that adds the prediction signal to the decoded differential signal to generate a reproduced image; and
a storage unit that stores a reference image that is used for generating the prediction signal, wherein
the frequency characteristic-related information represents information indicating a correlation between a frequency characteristic of the reproduced image and a frequency characteristic of the reference image,
the prediction signal generating unit generates the prediction signal such that the signal matches a frequency characteristic of a target image to be decoded, from the reference image, on the basis of the frequency characteristic-related information, and
the frequency characteristic-related information contains prediction signal generation-related information that is related to a method of generating the prediction signal, and the prediction signal generating unit selects, from at least two types of prediction signal generation methods that are prepared in advance, a method of generating the prediction signal, on the basis of the prediction signal generation-related information, and generates the prediction signal from the reference image.

9. A moving image decoding device, comprising:
an input unit that inputs compressed data that contains an encoded differential signal obtained by predictively encoding a moving image and frequency characteristic-related information;
a decoding unit that decodes the encoded differential signal to generate a decoded differential signal;
a prediction signal generating unit that generates a prediction signal for the decoded differential signal;
an adding unit that adds the prediction signal to the decoded differential signal to generate a reproduced image;
a storage unit that stores a reference image that is used for generating the prediction signal, wherein the frequency characteristic-related information represents information indicating a correlation between a frequency characteristic of the reproduced image and a frequency characteristic of the reference image, the prediction signal generating unit generates the prediction signal such that the signal matches a frequency characteristic of a target image to be decoded, from the reference image, on the basis of the frequency characteristic-related information; and a memory that stores frequency characteristic information that is measured when decoding the reference image, wherein the prediction signal generating unit generates the prediction signal on the basis of the frequency characteristic information stored in the memory and the frequency characteristic of the reproduced image.

10. A moving image encoding method, comprising:

inputting a target image to be encoded, from among a plurality of images configuring a moving image;

storing in a storage unit a reference image that is used for generating a prediction signal for the target image;

measuring a frequency characteristic of the target image and a frequency characteristic of the reference image, and generating frequency characteristic-related information that represents information indicating a correlation between the frequency characteristic of the target image and the frequency characteristic of the reference image;

generating the prediction signal such that the signal matches the frequency characteristic of the target image, from the reference image, on the basis of the frequency characteristic-related information;

obtaining a difference between the target image and the prediction signal to generate a differential signal;

encoding the differential signal to generate an encoded differential signal;

decoding the encoded differential signal to generate a decoded differential signal;

adding the prediction signal to the decoded differential signal to generate a reproduced image, the adding being connected, at a post-stage thereof, to the storage unit storing the reproduced image; and outputting at least the encoded differential signal and the frequency characteristic-related information, wherein the generating includes deriving a method of generating a prediction signal corresponding to the frequency characteristic-related information, to generate the prediction signal from the reference image, and the frequency characteristic-related information contains information on the method of generating the prediction signal.

11. A moving image decoding method, comprising:

inputting compressed data that contains an encoded differential signal obtained by predictively encoding a moving image and frequency characteristic-related information;

decoding the encoded differential signal to generate a decoded differential signal;

generating a prediction signal for the decoded differential signal;

adding the prediction signal to the decoded differential signal to generate a reproduced image; and storing in a storage unit a reference image that is used for generating the prediction signal, wherein the frequency characteristic-related information represents information indicating a correlation between a frequency characteristic of the reproduced image and a frequency characteristic of the reference image, in the prediction signal generating the prediction signal is generated such that the signal matches a frequency characteristic of a target image to be decoded, from the reference image, on the basis of the frequency characteristic-related information, and the frequency characteristic-related information contains prediction signal generation-related information that is related to a method of generating the prediction signal, and the generating includes generating the prediction signal from the reference image on the basis of the prediction signal generation-related information.

12. A non-transitory computer-readable medium including a moving image encoding program for causing a computer to execute:

input processing of inputting a target image to be encoded, from among a plurality of images configuring a moving image;

storage processing of storing in a storage unit a reference image that is used for generating a prediction signal for the target image;

frequency characteristic analyzing processing of measuring a frequency characteristic of the target image and a frequency characteristic of the reference image, and generating frequency characteristic-related information that represents information indicating a correlation between the frequency characteristic of the target image and the frequency characteristic of the reference image;

prediction signal generation processing of generating the prediction signal such that the signal matches the frequency characteristic of the target image, from the reference image, on the basis of the frequency characteristic-related information;

difference processing of obtaining a difference between the target image and the prediction signal to generate a differential signal;

encoding processing of encoding the differential signal to generate an encoded differential signal;

decoding processing of decoding the encoded differential signal to generate a decoded differential signal;

adding processing of adding the prediction signal to the decoded differential signal to generate a reproduced image, the adding processing being connected, at a post-stage thereof, to the storage storing the reproduced image; and output processing of outputting at least the encoded differential signal and the frequency characteristic-related information, wherein the prediction signal generation processing includes deriving a method of generating a prediction signal corresponding to the frequency characteristic-related information, to generate the prediction signal from the reference image, and the frequency characteristic-related information contains information on the method of generating the prediction signal.

13. A non-transitory computer-readable medium including a moving image decoding program for causing a computer to execute:

input processing of inputting compressed data that contains an encoded differential signal obtained by predictively encoding a moving image and frequency characteristic-related information;

decoding processing of decoding the encoded differential signal to generate a decoded differential signal;

prediction signal generation processing of generating a prediction signal for the decoded differential signal;

adding processing of adding the prediction signal to the decoded differential signal to generate a reproduced image; and storage processing of storing in a storage unit a reference image that is used for generating the prediction signal, wherein the frequency characteristic-related information represents information indicating a correlation between a frequency characteristic of the reproduced image and a frequency characteristic of the reference image, in the prediction signal generation processing the prediction signal is generated such that the signal matches a frequency characteristic of a target image to be decoded, from the reference image, on the basis of the frequency characteristic-related information, and the frequency characteristic-related information contains prediction signal generation-related information that is related to a method of generating the prediction signal, and the prediction signal generation processing includes generating the prediction signal from the reference image on the basis of the prediction signal generation-related information.

14. A moving image encoding device, comprising:
an input unit that inputs a target image to be encoded, from among a plurality of images configuring a moving image;
a storage unit that stores a reference image that is used for generating a prediction signal for the target image;
a frequency band analyzing unit that measures a frequency band of the target image and a frequency band of the reference image, and that generates frequency band-related information that represents information indicating a correlation between the frequency band of the target image and the frequency band of the reference image;
a prediction signal generating unit that generates a prediction signal such that the signal matches the frequency band of the target image, from the reference image, on the basis of the frequency band-related information;
a difference unit that obtains a difference between the target image and the prediction signal to generate a differential signal;
an encoding unit that encodes the differential signal to generate an encoded differential signal;
a decoding unit that decodes the encoded differential signal to generate a decoded differential signal;
an adding unit that adds the prediction signal to the decoded differential signal to generate a reproduced image, the adding unit being connected, at a post-stage thereof, to the storage unit storing the reproduced image; and
an output unit that outputs at least the encoded differential signal and the frequency band-related information.

15. A moving image decoding device, comprising:
an input unit that inputs compressed data that contains an encoded differential signal obtained by predictively encoding a moving image and frequency band-related information;
a decoding unit that decodes the encoded differential signal to generate a decoded differential signal;
a prediction signal generating unit that generates a prediction signal for the decoded differential signal;
an adding unit that adds the prediction signal to the decoded differential signal to generate a reproduced image; and
a storage unit that stores a reference image that is used for generating the prediction signal,
wherein the frequency band-related information represents information indicating a correlation between a frequency band of the reproduced image and a frequency band of the reference image, and the prediction signal generating unit generates the prediction signal such that the signal matches a frequency band of a target image to be decoded, from the reference image, on the basis of the frequency band-related information.

16. A moving image encoding method, comprising:
inputting a target image to be encoded, from among a plurality of images configuring a moving image;
storing in a storage unit a reference image that is used for generating a prediction signal for the target image;
measuring a frequency band of the target image and a frequency band of the reference image, and generating frequency band-related information that represents information indicating a correlation between the frequency band of the target image and the frequency band of the reference image;
generating the prediction signal such that the signal matches the frequency band of the target image, from the reference image, on the basis of the frequency band-related information;
obtaining a difference between the target image and the prediction signal to generate a differential signal;
encoding the differential signal to generate an encoded differential signal;
decoding the encoded differential signal to generate a decoded differential signal;
adding the prediction signal to the decoded differential signal to generate a reproduced image;
storing the reproduced image in the storage unit; and
outputting at least the encoded differential signal and the frequency band-related information.

17. A moving image decoding method, comprising:
inputting compressed data that contains an encoded differential signal obtained by predictively encoding a moving image and frequency band-related information;
decoding the encoded differential signal to generate a decoded differential signal;
generating a prediction signal for the decoded differential signal;
adding the prediction signal to the decoded differential signal to generate a reproduced image; and
storing in a storage unit a reference image that is used for generating the prediction signal,
wherein the frequency band-related information represents information indicating a correlation between a frequency band of the reproduced image and a frequency band of the reference image, and
in the prediction signal generating the prediction signal is generated such that the signal matches a frequency band of a target image to be decoded, from the reference image, on the basis of the frequency band-related information.

18. A non-transitory computer-readable medium including a moving image encoding program for causing a computer to execute:
input processing of inputting a target image to be encoded, from among a plurality of images configuring a moving image;
storage processing of storing in a storage unit a reference image that is used for generating a prediction signal for the target image;
frequency band analyzing processing of measuring a frequency band of the target image and a frequency band of the reference image, and generating frequency band-related information that represents a correlation between the frequency band of the target image and the frequency band of the reference image;

prediction signal generation processing of generating the prediction signal such that the signal matches the frequency band of the target image, from the reference image, on the basis of the frequency band-related information;

difference processing of obtaining a difference between the target image and the prediction signal to generate a differential signal;

encoding processing of encoding the differential signal to generate an encoded differential signal;

decoding processing of decoding the encoded differential signal to generate a decoded differential signal;

adding processing of adding the prediction signal to the decoded differential signal to generate a reproduced image;

storage processing of storing the reproduced image in the storage unit; and output processing of outputting at least the encoded differential signal and the frequency band-related information.

19. A non-transitory computer-readable medium including a moving image decoding program for causing a computer to execute:

input processing of inputting compressed data that contains an encoded differential signal obtained by predictively encoding a moving image and frequency band-related information;

decoding processing of decoding the encoded differential signal to generate a decoded differential signal;

prediction signal generation processing of generating a prediction signal for the decoded differential signal;

adding processing of adding the prediction signal to the decoded differential signal to generate a reproduced image; and storage processing of storing in a storage unit a reference image that is used for generating the prediction signal, wherein the frequency band-related information represents information indicating a correlation between a frequency band of the reproduced image and a frequency band of the reference image, and in the prediction signal generation processing the prediction signal is generated such that the signal matches a frequency band of a target image to be decoded, from the reference image, on the basis of the frequency band-related information.

20. A moving image encoding device, comprising:

an input unit that inputs a target image to be encoded, from among a plurality of images configuring a moving image;

a storage unit that stores a reference image that is used for generating a prediction signal for the target image input by the input unit;

a spatial frequency amplitude analyzing unit that generates spatial frequency amplitude-related information for adjusting a difference between an amplitude of a spatial frequency component of the target image input by the input unit and an amplitude of a spatial frequency component of the reference image stored in the storage unit, on the basis of the amplitude of the spatial frequency component of the target image and the amplitude of the spatial frequency component of the reference image;

a prediction signal generating unit that adjusts the amplitude of the spatial frequency component of the reference image on the basis of the spatial frequency amplitude-related information generated by the spatial frequency amplitude analyzing unit, and that generates the prediction signal for the target image on the basis of the adjusted reference image;

a difference unit that generates a differential signal on the basis of a difference between the target image input by the input unit and the prediction signal generated by the prediction signal generating unit;

an encoding unit that encodes the differential signal generated by the difference unit, to generate an encoded differential signal;

an output unit that outputs the encoded differential signal encoded by the encoding unit and the spatial frequency amplitude-related information generated by the spatial frequency amplitude analyzing unit;

a decoding unit that decodes the encoded differential signal generated by the encoding unit, to generate a decoded differential signal; and a reproduced image generating unit that adds the prediction signal generated by the prediction signal generating unit to the decoded differential signal generated by the decoding unit, to generate a reproduced image, and that stores the generated reproduced image in the storage unit as the reference image.

21. The moving image encoding device as claimed in claim 20, wherein the spatial frequency amplitude analyzing unit further comprises an external input unit that externally inputs information required for generating the spatial frequency amplitude-related information, and the spatial frequency amplitude analyzing unit adds the information input by the external input unit to the amplitude of the spatial frequency component of the target image and the amplitude of the spatial frequency component of the reference image, and generates the spatial frequency amplitude-related information.

22. The moving image encoding device as claimed in claim 20, wherein the spatial frequency analyzing unit adjusts the spatial frequency amplitude-related information on the basis of an adjustment parameter that is defined in accordance with the spatial frequency component of the target image, and generates the adjusted spatial frequency amplitude-related information and the adjustment parameter as the spatial frequency amplitude-related information.

23. The moving image decoding device as claimed in claim 22, wherein the input unit inputs adjusted spatial frequency-related information and an adjustment parameter as the spatial frequency amplitude-related information, and the prediction signal generating unit generates the prediction signal on the basis of the spatial frequency amplitude-related information and adjustment parameter that are input by the input unit.

24. A moving image decoding device, comprising:

a storage unit that stores a reproduced image that is a reference image for use in decoding;

an input unit that inputs encoded data, which contains an encoded differential signal obtained by predictively encoding a moving image and spatial frequency amplitude-related information of an image;

an extraction unit that extracts the spatial frequency amplitude-related information and the encoded differential signal from the encoded data input by the input unit;

a prediction signal generating unit that adjusts an amplitude of the reproduced image stored in the storage unit, on the basis of the spatial frequency amplitude-related information extracted by the extraction unit, and that generates a prediction signal;

a decoding unit that decodes the encoded differential signal extracted by the extraction unit, to acquire a decoded differential signal;

an adding unit that adds the prediction signal generated by the prediction signal generating unit to the decoded differential signal acquired by the decoding unit, to generate the reproduced image; and an output unit that outputs the reproduced image acquired by the adding unit to an output terminal and the storage unit.

25. A moving image encoding method, comprising:

inputting a target image to be encoded, from among a plurality of images configuring a moving image;

generating spatial frequency amplitude-related information for adjusting a difference between an amplitude of a spatial frequency component of the target image input by the inputting and an amplitude of a spatial frequency component of a reference image that is used for generating a prediction signal for the target image input by the inputting, on the basis of the amplitude of the spatial frequency component of the target image and the amplitude of the spatial frequency component of the reference image;

adjusting the amplitude of the spatial frequency component of the reference image on the basis of the spatial frequency amplitude-related information generated in the spatial frequency amplitude analyzing, and generating the prediction signal for the target image on the basis of the adjusted reference image;

generating a differential signal on the basis of a difference between the target image input in the inputting and the prediction signal generated in the prediction signal generating;

encoding the differential signal generated in the generating a differential signal, to generate an encoded differential signal;

outputting the encoded differential signal encoded in the encoding and the spatial frequency amplitude-related information generated in the generating spatial frequency amplitude-related information;

decoding the encoded differential signal generated in the encoding, to generate a decoded differential signal; and adding the prediction signal generated in the prediction signal generating to the decoded differential signal generated in the decoding, to generate a reproduced image, and storing the generated reproduced image as the reference image.

26. A moving image decoding method, comprising:

inputting encoded data, which contains an encoded differential signal obtained by predictively encoding a moving image and spatial frequency amplitude-related information of an image;

extracting the spatial frequency amplitude-related information and the encoded differential signal from the encoded data input in the inputting;

adjusting an amplitude of a reproduced image that is stored in a storage unit as a reference image, on the basis of the spatial frequency amplitude-related information extracted in the extracting, and generating a prediction signal;

decoding the encoded differential signal extracted in the extracting, to acquire a decoded differential signal;

adding the prediction signal generated in the prediction signal generating to the decoded differential signal acquired in the decoding, to generate the reproduced image; and outputting the reproduced image acquired in the adding to an output terminal and the storage unit that stores the reproduced image for use in decoding.

27. A non-transitory computer-readable medium including a moving image encoding program, comprising:

an input module for inputting a target image to be encoded, from among a plurality of images configuring a moving image;

a storage module for storing a reference image that is used for generating a prediction signal for the target image input by the input module;

a spatial frequency amplitude analyzing module for generating spatial frequency amplitude-related information for adjusting a difference between an amplitude of a spatial frequency component of the target image input by the input module and an amplitude of a spatial frequency component of the reference image stored in the storage module, on the basis of the amplitude of the spatial frequency component of the target image and the amplitude of the spatial frequency component of the reference image;

a prediction signal generating module for adjusting the amplitude of the spatial frequency component of the reference image on the basis of the spatial frequency amplitude-related information generated by the spatial frequency amplitude analyzing module, and generating the prediction signal for the target image on the basis of the adjusted reference image;

a difference module for generating a differential signal on the basis of a difference between the target image input by the input module and the prediction signal generated by the prediction signal generating module;

an encoding module for encoding the differential signal generated by the difference module, to generate an encoded differential signal;

a decoding module for decoding the encoded differential signal generated by the encoding module, to generate a decoded differential signal;

a reproduced image generating module for adding the prediction signal generated by the prediction signal generating module to the decoded differential signal generated by the decoding module, to generate a reproduced image, and storing the generated reproduced image in the storage module as the reference image; and an output module for outputting the encoded differential signal encoded by the encoding module and the spatial frequency amplitude-related information generated by the spatial frequency amplitude analyzing module.

28. A non-transitory computer-readable medium including a moving image decoding program, comprising:

a storage module for storing a reproduced image as a reference image for use in decoding;

an input module for inputting encoded data, which contains an encoded differential signal obtained by predictively encoding a moving image and spatial frequency amplitude-related information of an image;

an extraction module for extracting the spatial frequency amplitude-related information and the encoded differential signal from the encoded data input by the input module;

a prediction signal generating module for adjusting an amplitude of the reproduced image stored in the storage module, on the basis of the spatial frequency amplitude-related information extracted by the extraction module, and generating a prediction signal;

a decoding module for decoding the encoded differential signal extracted by the extraction module, to acquire a decoded differential signal;

an adding module for adding the prediction signal generated by the prediction signal generating module to the decoded differential signal acquired by the decoding module, to generate the reproduced image; and an output module for outputting the reproduced image acquired by the adding module to an output terminal and the storage module.

29. A moving image encoding method, comprising:

inputting a target image to be encoded, from among a plurality of images configuring a moving image;

storing in a storage unit a reference image that is used for generating a prediction signal for the target image;

measuring a frequency characteristic of the target image and a frequency characteristic of the reference image, and generating frequency characteristic-related information that represents information indicating a correlation between the frequency characteristic of the target image and the frequency characteristic of the reference image;

generating the prediction signal such that the signal matches the frequency characteristic of the target image, from the reference image, on the basis of the frequency characteristic-related information;

obtaining a difference between the target image and the prediction signal to generate a differential signal;

encoding the differential signal to generate an encoded differential signal;

decoding the encoded differential signal to generate a decoded differential signal;

adding the prediction signal to the decoded differential signal to generate a reproduced image, the adding being connected, at a post-stage thereof, to the storage unit storing the reproduced image; and outputting at least the encoded differential signal and the frequency characteristic-related information, wherein generating the prediction signal includes selecting, from at least two types of prediction signal generation methods, a method of generating a prediction signal corresponding to the frequency characteristic-related information, to generate the prediction signal from the reference image, and the frequency characteristic-related information contains information on the method of generating the prediction signal.

30. A non-transitory computer-readable medium including a moving image encoding program for causing a computer to execute:

input processing of inputting a target image to be encoded, from among a plurality of images configuring a moving image;

storage processing of storing in a storage unit a reference image that is used for generating a prediction signal for the target image;

frequency characteristic analyzing processing of measuring a frequency characteristic of the target image and a frequency characteristic of the reference image, and generating frequency characteristic-related information that represents information indicating a correlation between the frequency characteristic of the target image and the frequency characteristic of the reference image;

prediction signal generation processing of generating the prediction signal such that the signal matches the frequency characteristic of the target image, from the reference image, on the basis of the frequency characteristic-related information;

difference processing of obtaining a difference between the target image and the prediction signal to generate a differential signal;

encoding processing of encoding the differential signal to generate an encoded differential signal;

decoding processing of decoding the encoded differential signal to generate a decoded differential signal;

adding processing of adding the prediction signal to the decoded differential signal to generate a reproduced image, the adding processing being connected, at a post-stage thereof, to the storage storing the reproduced image; and output processing of outputting at least the encoded differential signal and the frequency characteristic-related information, wherein generating the prediction signal generation processing includes selecting, from at least two types of prediction signal generation methods, a method of generating a prediction signal corresponding to the frequency characteristic-related information, to generate the prediction signal from the reference image, and the frequency characteristic-related information contains information on the method of generating the prediction signal.

31. A moving image encoding method, comprising:

inputting a target image to be encoded, from among a plurality of images configuring a moving image;

storing in a storage unit a reference image that is used for generating a prediction signal for the target image;

measuring a frequency characteristic of the target image and a frequency characteristic of the reference image, and generating frequency characteristic-related information that represents information indicating a correlation between the frequency characteristic of the target image and the frequency characteristic of the reference image;

generating the prediction signal such that the signal matches the frequency characteristic of the target image, from the reference image, on the basis of the frequency characteristic-related information;

obtaining a difference between the target image and the prediction signal to generate a differential signal;

encoding the differential signal to generate an encoded differential signal;

decoding the encoded differential signal to generate a decoded differential signal;

adding the prediction signal to the decoded differential signal to generate a reproduced image, the adding being connected, at a post-stage thereof, to the storage unit storing the reproduced image;

outputting at least the encoded differential signal and the frequency characteristic-related information; and storing frequency characteristic information that is measured when processing the reference image as the target image, instead of when measuring the frequency characteristic of the reference image, wherein the prediction signal is generated based on the frequency characteristic of the target image and the stored frequency characteristic information.

32. A non-transitory computer-readable medium including a moving image encoding program for causing a computer to execute:

input processing of inputting a target image to be encoded, from among a plurality of images configuring a moving image;

storage processing of storing in a storage unit a reference image that is used for generating a prediction signal for the target image;

frequency characteristic analyzing processing of measuring a frequency characteristic of the target image and a frequency characteristic of the reference image, and generating frequency characteristic-related information that represents information indicating a correlation between the frequency characteristic of the target image and the frequency characteristic of the reference image;

prediction signal generation processing of generating the prediction signal such that the signal matches the frequency characteristic of the target image, from the reference image, on the basis of the frequency characteristic-related information;

difference processing of obtaining a difference between the target image and the prediction signal to generate a differential signal;

encoding processing of encoding the differential signal to generate an encoded differential signal;

decoding processing of decoding the encoded differential signal to generate a decoded differential signal;

adding processing of adding the prediction signal to the decoded differential signal to generate a reproduced image, the adding processing being connected, at a post-stage thereof, to the storage storing the reproduced image;

output processing of outputting at least the encoded differential signal and the frequency characteristic-related information; and storing frequency characteristic information that is measured when processing the reference image as the target image, instead of when measuring the frequency characteristic of the reference image, wherein the prediction signal is generated based on the frequency characteristic of the target image and the stored frequency characteristic information.

33. A moving image decoding method, comprising:

inputting compressed data that contains an encoded differential signal obtained by predictively encoding a moving image and frequency characteristic-related information;

decoding the encoded differential signal to generate a decoded differential signal;

generating a prediction signal for the decoded differential signal;

adding the prediction signal to the decoded differential signal to generate a reproduced image; and storing in a storage unit a reference image that is used for generating the prediction signal, wherein the frequency characteristic-related information represents information indicating a correlation between a frequency characteristic of the reproduced image and a frequency characteristic of the reference image, in the prediction signal generating the prediction signal is generated such that the signal matches a frequency characteristic of a target image to be decoded, from the reference image, on the basis of the frequency characteristic-related information, and the frequency characteristic-related information contains prediction signal generation-related information that is related to a method of generating the prediction signal, and the prediction signal generating includes selecting, from at least two types of prediction signal generation methods, a method of generating the prediction signal, on the basis of the prediction signal generation-related information, and generates the prediction signal from the reference image.

34. A non-transitory computer-readable medium including a moving image decoding program for causing a computer to execute:

input processing of inputting compressed data that contains an encoded differential signal obtained by predictively encoding a moving image and frequency characteristic-related information;

decoding processing of decoding the encoded differential signal to generate a decoded differential signal;

prediction signal generation processing of generating a prediction signal for the decoded differential signal;

adding processing of adding the prediction signal to the decoded differential signal to generate a reproduced image; and storage processing of storing in a storage unit a reference image that is used for generating the prediction signal, wherein the frequency characteristic-related information represents information indicating a correlation between a frequency characteristic of the reproduced image and a frequency characteristic of the reference image, in the prediction signal generation processing the prediction signal is generated such that the signal matches a frequency characteristic of a target image to be decoded, from the reference image, on the basis of the frequency characteristic-related information, and the frequency characteristic-related information contains prediction signal generation-related information that is related to a method of generating the prediction signal, and the prediction signal generation processing includes selecting, from at least two types of prediction signal generation methods, a method of generating the prediction signal, on the basis of the prediction signal generation-related information, and generates the prediction signal from the reference image.

35. A moving image decoding method, comprising:

inputting compressed data that contains an encoded differential signal obtained by predictively encoding a moving image and frequency characteristic-related information;

decoding the encoded differential signal to generate a decoded differential signal;

generating a prediction signal for the decoded differential signal;

adding the prediction signal to the decoded differential signal to generate a reproduced image; and storing in a storage unit a reference image that is used for generating the prediction signal, wherein the frequency characteristic-related information represents information indicating a correlation between a frequency characteristic of the reproduced image and a frequency characteristic of the reference image, in the prediction signal generating the prediction signal is generated such that the signal matches a frequency characteristic of a target image to be decoded, from the reference image, on the basis of the frequency characteristic-related information, and the frequency characteristic-related information contains prediction signal generation-related information that is related to a method of generating the prediction signal, and the generating the prediction signal includes selecting, from at least two types of prediction signal generation methods that are prepared in advance, a method of generating the prediction signal, on the basis of the prediction signal generation-related information, and generates the prediction signal from the reference image.

36. A non-transitory computer-readable medium including a moving image decoding program for causing a computer to execute:

input processing of inputting compressed data that contains an encoded differential signal obtained by predictively encoding a moving image and frequency characteristic-related information;

decoding processing of decoding the encoded differential signal to generate a decoded differential signal;

prediction signal generation processing of generating a prediction signal for the decoded differential signal;

adding processing of adding the prediction signal to the decoded differential signal to generate a reproduced image; and storage processing of storing in a storage unit a reference image that is used for generating the prediction signal, wherein the frequency characteristic-related information represents information indicating a correlation between a frequency characteristic of the reproduced image and a frequency characteristic of the reference image, in the prediction signal generation processing the prediction signal is generated such that the signal matches a frequency characteristic of a target image to be decoded, from the reference image, on the basis of the frequency characteristic-related information, and the frequency characteristic-related information contains prediction signal generation-related information that is related to a method of generating the prediction signal, and the prediction signal generation processing includes selecting, from at least two types of prediction signal generation methods that are prepared in advance, a method of generating the prediction signal, on the basis of the prediction signal generation-related information, and generates the prediction signal from the reference image.

* * * * *